(12) United States Patent
Lamport

(10) Patent No.: US 7,620,680 B1
(45) Date of Patent: Nov. 17, 2009

(54) FAST BYZANTINE PAXOS

(75) Inventor: Leslie Lamport, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 2122 days.

(21) Appl. No.: 10/219,106

(22) Filed: Aug. 15, 2002

(51) Int. Cl.
*G06F 15/16* (2006.01)
(52) U.S. Cl. .................. 709/201; 709/202; 709/248
(58) Field of Classification Search .......... 709/201, 709/202, 248
See application file for complete search history.

(56) References Cited

U.S. PATENT DOCUMENTS

| | | | |
|---|---|---|---|
| 5,261,085 A | 11/1993 | Lamport | |
| 6,202,067 B1 | 3/2001 | Blood et al. | |
| 6,216,150 B1 * | 4/2001 | Badovinatz et al. | 718/106 |
| 6,351,811 B1 | 2/2002 | Groshon et al. | |
| 6,567,927 B1 * | 5/2003 | Brinkmann | 714/10 |
| 6,587,860 B1 | 7/2003 | Chandra et al. | |
| 6,671,821 B1 | 12/2003 | Castro et al. | |
| 6,704,887 B2 | 3/2004 | Kwiat et al. | |
| 6,754,845 B2 * | 6/2004 | Kursawe et al. | 714/4 |
| 6,826,601 B2 | 11/2004 | Jacobs et al. | |
| 6,931,431 B2 | 8/2005 | Cachin et al. | |
| 2001/0025351 A1 * | 9/2001 | Kursawe et al. | 714/4 |
| 2002/0116611 A1 * | 8/2002 | Zhou et al. | 713/156 |
| 2009/0089358 A1 * | 4/2009 | Beckwith et al. | 709/201 |

OTHER PUBLICATIONS

Anceaume et al., "Converging Toward Decision Conditions" *6th International Conference on Principles of Distributed Systems*, France, pp. 53-63 (Dec. 11-13, 2002).
Mostefaoui et al., "IRISA Research Report No. 1355" (Oct. 2000).
Brasileiro et al., "IRISA Research Report No. 1321" (Apr. 2000).
Keidar, Idit, et al.; On the Cost of Fault-Tolerant Consensus When There Are No Faults—A Tutorial; SIGACT News 32(2), Distributed Computing column, pp. 45-63; Jun. 2001.

(Continued)

*Primary Examiner*—Nathan J Flynn
*Assistant Examiner*—Mohamed Wasel
(74) *Attorney, Agent, or Firm*—Lee & Hayes, PLLC

(57) ABSTRACT

A distributed computing system can operate in the face of malicious failures on the part of some of its constituent devices, and provide a minimum of message delays between receiving a client request and providing a response, when each device within the system verifies the sender of any message it receives, and the propriety of the message. The sender can be verified through message authentication schemes or digital signature schemes. The propriety of a message can be verified by receiving a sufficiently large number of equivalent, properly authenticated messages. If the number of malicious devices is represented by the variable "M", a sufficient number of equivalent, properly authenticated messages to verify that the message is true can be any number of messages greater than M. Furthermore, to verify that a leader device is not maliciously submitting different proposals to different devices using the same proposal number, a quorum of devices can be required to select a proposal, where a quorum is a sufficiently large number of devices such that any other quorum has, as a majority of its devices, non-malicious devices from the first quorum. Therefore, the distributed computing system can operate properly with M number of malicious failures and F number of total failures, and with a minimum of message delays, if the number of constituent devices in the distributed computing system is greater than 3F+2M. Additionally, if the distributed computing system can revert to a more traditional algorithm if too many devices fail or become malicious, it can use a message-delay-reducing algorithm while having as few as 2Q+F+2M+1 constituent devices, where Q is the number of devices that can fail and still allow the system to use a message-delay-reducing algorithm.

15 Claims, 45 Drawing Sheets

OTHER PUBLICATIONS

Dwork, Cynthia, et al.; Consensus in the Presence Of Partial Synchrony; *Journal of the ACM*, 35(2):288-323, Apr. 1988.

Lampson, Butler W.; How to Build a Highly Available System Using Consensus; http://www.research.microsoft.com.

Lamport, Leslie; The Implementation of Reliable Distributed Multiprocess Systems; *Computer Networks*, 2:95-114,1978.

Lamport, Leslie, et al.; The Byzantine Generals Problem; ACM Transactions on Programming Languages and Systems, vol. 4, No. 3, Jul. 1982, pp. 382-401.

Brasileiro et al, "Consensus in One Communication Step", IRISA, Universite de Rennes 1, France, 9 pages.

Lamport, Leslie, "Time, Clocks, and the Ordering of Events in a Distributed System", *Communication of the ACM*, 21(7):558-565, Jul. 1978.

Lamport, Leslie, "The Part-Time Parliament", *ACM Transactions on Computer Systems 16*, 2 (May 1998), pp. 133-169. Also appeared as SRC Research Report 49.

Lamport, Leslie, "Paxos Made Simple", *ACM SIGACT* News (Distributed Computing Column), 32,4 (Whole No. 121, Dec. 2001) pp. 18-25.

Lampson, Butler W., "The ABCD's of Paxos", Presented at *Principles of Distributed Computing*, 2001, as one of the papers celebrating Leslie Lamport's $60^{th}$ Birthday, retrieved from http://research.microsoft.com/lampson/65-ABCDPaxos/Acrobat.pdf.

Castro, Miguel, et al., "Practical Byzantine Fault Tolerance", appears in *Proceedings of the Third-Symposium on Operating Design and Implementation*, New Orleans, USA, Feb. 1999, pp. 1-14.

Castro, Miguel, et al., "Proactive Recovery in a Byzantine-Fault-Tolerant System", appears in the *Proceedings of the Fourth Symposium on Operating Systems Design and Implementation* (OSDI '00), San Diego, USA, Oct. 2000, pp. 1-15.

Huang, Yennun, et al., "Software Rejuvenation: Analysis, Module and Applications", *Proc. International Symposium on Fault Tolerant Computing*, pp. 381-390, (1995).

Bracha, Gabriel, "An asynchronous $\lfloor(\eta -1)/3\rfloor$-resilient consensus protocol" this paper was presented at the *ACM Symposium on Principles of Distributed Computing* 1984, pp. 154-162.

Keidar, Idit, et al., "Moshe: A Group Membership Service for WANs" to appear in *ACM Transactions on Computer Systems (TOCS)*, Aug. 2002, pp. 1-47.

Khazan, Roger, I., "A One-Round Algorithm for Virtually Synchronous Group Communication in Wide Area Networks", PH.D. dissertation, Department of Electrical Engineering and Computer Science. MIT., May 22, 2002. Thesis Supervisors: Prof. Nancy A. Lynch and Dr. Idit Keidar. Retrieved from http://theroy.1cs.mit.edu/~ roger/Research/Papers /khazan-phd.pdf.

Schneider, F.; Implementing Fault-tolerant Services Using the State Machine Approach: A Tutorial; *Computing Surveys*, 22(3):299-319, Sep. 1990.

Deswarte, Y. et al; Intrusion Tolerance in Distributed Computing Systems; *Proceedings of the 1991 IEEE Symposium on Research in Security and Privacy*; pp. 110-121, May 1991.

Canetti, R. et al.; Fast asynchronous Byzantine agreement with optimal resilience; *Proc. 25th Annual ACM Symposium on Theory of Computing (STOC)*, pp. 42-51, 1993.

Reiter, M; How to Securely Replicate Services; *ACM Transactions on Programming Languages and Systems*, vol. 16, No. 3, pp. 986-1009, May 1994.

Reiter, M. K.; Secure Agreement Protocols: Reliable and Atomic Group Multicast in Rampart; *Proceedings of the 2nd ACM Conference on Computer and Communications Security*, pp. 68-80, Fairfax, Virginia, Nov. 1994.

Gong, L. et al.; Byzantine Agreement With Authentication: Observations and Applications in Tolerating Hybrid and Link Faults; *Dependable Computing for Critical Applications*—5, pp. 79-90, IFIP WG 10.4, preliminary proceedings, 1995.

Reiter, M. K.; The Rampart toolkit for building high-integrity services; *Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110, 1995.

Reiter, M. K.; Distributing Trust With the Rampart Toolkit; *Communications of the ACM*; 39, 4 pp. 71-74, Apr. 1996.

Malkhi, D. et al.; A High-Throughput Secure Reliable Multicast Protocol; *Proceedings of the 9th Computer Security Foundations Workshop*, Kenmore, Ireland, pp. 9-17, Jun. 1996.

Malkhi, D. et al.; A High-Throughput Secure Reliable Multicast Protocol; *Journal of Computer Security*. Also in *Proceedings of the $9^{th}$ IEEE Computer Security Foundations Workshop*, pp. 9-17, Jun. 1996.

Malkhi, D. et al.; Byzantine Quorum Systems; *Proceedings of the 29th ACM Symposium on Theory of Computing*, May 1997.

Malkhi, D. et al.; The Load and Availability of Byzantine Quorum Systems; *Proceedings $16^{th}$ ACM Symposium on Principles of Distributed Computing (PODC)*, pp. 249-257, Aug. 1997.

Kihlstrom, K. P. et al.; Solving Consensus in a Byzantine Environment Using an Unreliable Fault Detector; *Proceedings of the International Conference on Principles of Distributed Systems (OPODIS'97)*, Hermes, Chantilly, France, 61-76, 1997.

Kihlstrom, K. P. et al.; The SecureRing Protocols for Securing Group Communication; *Proceedings of the 31st Hawaii International Conference on System Sciences*, vol. 3, pp. 317-326, Jan. 1998.

Malkhi, D. et al.; Secure and Scalable Replication in Phalanx; *Proceedings of the 17th IEEE Symposium on Reliable Distributed Systems*; p. 51-58, West Lafayette, Indiana, USA, Oct. 1998.

Malkhi, D. et al.; Byzantine Quorum Systems; *Distributed Computing*; vol. 11, No. 4, p. 203-213, 1998.

Goldberg, A. et al.; Towards an Archival Intermemory; *International Forum on Research and Technology Advances in Digital Libraries*; IEEE, pp. 147-156, 1998.

Hartman, J.H. et al.; The Swarm Scalable Storage System; *19th ICDCS*; pp. 74-81, 1999.

Guerraoui, Rachid et al.; *Reducing the Cost for Non-Blocking in Atomic Commitment*; Département d'Informatique, Ecole Polytechnique Federale de Lausanne, pp. 1-11, May 1996.

Hayashibara, Noahiro et al.; *Performance Comparison Between the Paxos and Chandra-Toueg Consensus Algorithms*; Département d'Informatique, Ecole Polytechnique Federale de Lausanne; Technical Report IC-2002-61, pp. 1-11, Aug. 2002.

Awerbuch, Baruch et al.; *Maintaining Database Consistency in Peer to Peer Networks*; Department of Computer Science, John Hopkins University; Technical Report CNDS-2002-1, pp. 1-14, Feb. 6, 2002.

Birrell, Andrew D. et al.; *The Echo Distributed File System*; Digital Equipment Corp. Systems Research Center; Technical Report 111, pp. 1-22, Sep. 10, 1993.

Liskov, Barbara et al.; *Replication in the Harp File System*; Proceedings of the $13^{th}$ Symposium on Operating System Principles, 13 pp., Oct. 1991.

Hisgen, Andy et al.; *New-Value Logging in the Echo Replicated File System*; Digital Equipment Corp. Systems Research Center, Research Report 104, pp. 1-39, Jun. 1993.

Long, Darrell D.E. et al.; *Voting with Regenerable Volatile Witnesses*; University of California Computer and Information Sciences; Technical Report, pp. 1-20, Apr. 1990.

Swart, Garret et al.; *Availability in the Echo File System*; Digital Equipment Corp. Systems Research Center, Research Report 112, pp. 1-43, Sep. 1993.

Adya, A., et al.; *FARSITE: Federated, Available, and Reliable Storage for an Incompletely Trusted Environment.; In Proc. $5^{th}$ OSDI*, Boston, MA, pp. 1-14, Dec. 2002.

Castro, M., *Practical Byzantine Fault Tolerance*; Ph.D. Thesis Technical Report MIT-LCS-TR-817, MIT, Jan. 2001.

Chockler, G. V., et al., *Group Communication Specifications: A Comprehensive Study; ACM Computing Surveys*, pp. 33(4):427-469, Dec. 2001.

Deprisco, R., et al., *Revisiting the Paxos Algorithm; In Proc. $11^{th}$ Int'l Workshop on Distributed Algorithms*, pp. 111-125, Sep. 1997.

Lamport, L., Using Time Instead of Timeout for Fault Tolerance in Distributed Systems; *ACM Transactions on Programming Languages and Systems (TOPLAS)*, pp. 6(2):264-280, Apr. 1984.

Lamport, L, et al., Cheap Paxos; *In Proc. International Conference on Dependable Systems and Networks (DSN)*, Florence, Italy, 2004.

Lynch, N., et al., RAMBO: A Reconfigurable Atomic Memory Service for Dynamic Networks; *In Proc. 16th International Symposium on Distributed Computing*, Toulouse, France, pp. 173-190, Oct. 2002.

Narasimhan, P., et al., *Replica Consistency of CORBA Objects in Partitionable Distributed Systems*, 1997.

Oki, B. M., *Viewstamped Replication for Highly Available Distributed Systems*; Ph.D. Thesis Technical Report MIT/LCS/TR-423, MIT, Aug. 1988.

Oki, B.M., et al., Viewstamped Replication: A New Primary Copy Method to Support Highly-Available Distributed Systems; *In Proc. 7th Symposium on Principles of Distributed Computing*, Aug. 1988, pp. 8-17.

Rodrigues, R., et al., BASE: Using Abstractions to Improve Fault Tolerance; *In Proc. 18th ACM Symposium on Operating System Principles*, Bantt, Canada, pp. 15-28, Oct. 2001.

Schneider, F.B., Synchronization in Distributed Programs; ACM Transactions on Programming Languages and Systems (TOPLAS; pp. 4(2):125-148.), Apr. 1982.

Yu, H., et al., *Consistent and Automatic Replica Regeneration; In Proc. 1st NSDI*, San Francisco, CA, pp. 323-236, 2004.

Pedone, F., et al., Handling Message Semantics with Generic Broadcast Protocols, *Distributed Computing 15*, pp. 97-107, 2002.

Cukier, M., et al., AQuA: An Adaptive Architecture that Provides Dependable Distributed Objects, *In Proc. 17th Symposium on Reliable Distributed Systems*, pp. 245-253, West Lafayette, IN, Oct. 1998.

Cukier, M., et al., AQuA: An Adaptive Architecture that Provides Dependable Distributed Objects, *IEEE Transactions on Computers*, vol. 52, No. 1, pp. 31-50, Jan. 2003.

Charron-Bost, Bernadette, et al., Uniform Consensus is Harder than Consensus (extended abstract), *Technical Report DSC/2000/028*, Switzerland, May 2000.

DePrisco, Robert, et al., Revisiting the PAXOS Algorithm, *Theroretical Computer Science*, 243:35-91, 2000.

Fischer, Michael J., et al., Impossibility of Distributed Consensus with One Faulty Process, *Journal of the ACM*, 32(2):374-382, Apr. 1985.

Lamport, Leslie, Lower Bounds for Asynchronous Consensus, in *Future Distributed Computing, vol. 2584 of Lecture Notes in Computer Science*, pp. 22-23, Spring, 2003.

Mazurkiewicz, A., *Semantics of Concurrent Systems; A Modular Fixed-Point Trace Approach*; Institute of Computer Science, Poland, pp. 353-375.

* cited by examiner

FAST BYZANTINE PAXOS

RELATED APPLICATIONS

This application is related to U.S. application Ser. No. 10/184,773, filed on Jun. 28, 2002.

TECHNICAL FIELD

This invention relates generally to distributed computing and, more particularly, relates to fault tolerant distributed computing.

BACKGROUND OF THE INVENTION

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to perform tasks and maintain data.

A distributed computing system can utilize a number of interconnected computing devices to achieve the performance and storage capabilities of a larger, more-expensive computing device. Thus, while each personal computing device may only have a few gigabytes of usable storage space, a distributed computing system comprising a number of such devices, can aggregate the available storage space on each individual device and present to a user a terabyte or more of useable storage space. Similarly, a distributed computing system can present to a user a large amount of useable processing power by dividing the user's tasks into smaller segments and transmitting the segments to the individual devices for processing in parallel.

To effectively derive value from the unused capabilities of modern personal computing devices, a distributed computing system should not interfere with the individual use of each personal computing device. By allowing individual users to retain control of the devices, however, the reliability of each device is greatly decreased. To compensate for the increased risk that the individual computing device may become disconnected from the network, turned off, suffer a system malfunction, or otherwise become unusable to the distributing computing system, redundancy can be used to allow the distributed computing system to remain operational. Thus, the information stored on any one personal computing device can be redundantly stored on at least one additional similar personal computing device, allowing the information to remain accessible, even if one of the personal computing devices fails.

Alternatively, a distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system. Such a corporation might use a number of high performance server computing devices, rather than less powerful personal computing devices, because each individual computing device would be required to service many users within that geographic region. The individual high performance devices can each perform identical tasks and store identical data, allowing users who merely seek to access the data to obtain such access from a high performance device located in a convenient location for that user.

However, distributed computing systems can be difficult to maintain due to the complexity of properly synchronizing the individual devices that comprise the system. Because timekeeping across individual processes can be difficult at best, a state machine approach is often used to coordinate activity among the individual devices. A state machine can be described by a set of states, a set of commands, a set of responses, and functions that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose that a given function be executed by every device in the system as the command to be performed for a given step. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given function be executed by the devices, using the proposal number suggested in the earlier message. Each device can, at that stage, determine whether to vote for the action or reject it. A device should only reject an action if it has responded to another leader's suggestion of a different proposal number. If a sufficient number of devices, known as a quorum, vote for the proposal, the proposed action is said to have been agreed upon, and each device performs the action and transmits the results. In such a manner, an agreed upon command can be determined to be performed for a given step, maintaining the same state among all of the devices.

Generally, the Paxos algorithm can be though of in two phases, with an initial phase that allows a leader to learn of prior proposals that were voted on by the devices, as described above, and a second phase in which the leader can propose functions for execution. Once the leader has learned of prior proposals, it need not continually repeat the first phase. Instead, the leader can continually repeat the second phase, proposing a series of functions, that can be executed by the distributed computing system in multiple steps. In such a manner, while each function performed by the distributed computing system for each step can be thought of as one instance of the Paxos algorithm, the leader need not wait for the devices to vote on a proposed function for a given step before proposing another function for the next step.

The Paxos algorithm, described above, assumes that a faulty device will simply cease communication and will not act upon any data. However, a device experiencing a "Byzantine" fault exhibits malicious behavior that is unpredictable and may appear to be functioning properly. The Paxos algorithm can be changed to operate properly even in the face of such malicious devices. Each message sent by a device can contain a proof of the message's authenticity, such as through the use of message authenticators, and can contain a proof that the information contained in the message is proper in light of the requirements of the Paxos algorithm. The requisite proof of propriety can be provided by adding two additional steps to the algorithm described generally above.

Byzantine faults can occur in two general varieties. Either a malicious device can spoof a message, such as by intercepting and changing a message between two properly functioning devices, or the malicious device can transmit false messages. Thus, to avoid messages from malicious devices, a properly functioning device receiving a message can seek to verify both that the message is unchanged and that the message is proper. Tampering or editing a message in transit can be detected through the use of message authenticators. Because messages between two devices may need to be forwarded onto other devices, the sending device can include authenticators of the message directed to both the initial destination device and the forwarded destination device. The authenticator of the message that is directed to the initial destination device can authenticate both the message itself and the authenticator of the message that is directed to the forwarded destination device.

The propriety of a message can be proven by illustrating that a sufficient number of devices within the system have agreed to the message. If a number of devices within a distributed computing system are malicious, those devices can work together and agree upon the transmission of false messages in an effort to deceive properly functioning devices. However, if a device receives the same information from more devices than there are malicious devices, then the information must be true because, even if all of the malicious devices participated, at least one of the messages must have come from a properly functioning device, and can therefore be trusted. More broadly, defining the variable "M" to represent the number of malicious devices within a distributed computing system, any device can trust information which it has received from at least M+1 different devices. A transmitting device can prove the propriety of a message by sending, with the message, a sufficiently large collection of messages originally sent to that transmitting device that indicate the information contained in the message is true. However, a message sent by a malicious device could be properly authenticated for the transmitting device, yet may not be properly authenticated for the receiving device. Thus, the transmitting device, upon receiving M+1 messages containing the same information, may properly believe that the information is true, but if it seeks to forward those messages onto a receiving device, it is possible that only one of them will be properly authenticated for the receiving device. However, the receiving device, like any other device, requires that M+1 equivalent properly authenticated messages assert the information before it can believe that the information contained in the messages is true. Therefore, to ensure that the receiving device receives at least those M+1 messages, the transmitting device can forward a collection of messages having at least M+1+M or 2M+1 messages. Such a collection is sufficiently large that, even if a message from every malicious device was included, M+1 equivalent properly authenticated messages would still be received by the receiving device. Therefore, the receipt of M+1 equivalent properly authenticated messages by any device enables that device to trust the information contained in the message. Furthermore, if 2M+1 equivalent properly authenticated messages are received, the receiving device can forward those messages along to prove to the device receiving the forwarded messages that the information contained in the messages is true.

A transmitting device can, therefore, prove the propriety of a message by sending, with the message, a sufficiently large collection of messages originally sent to that transmitting device that indicate the information contained in the message is true. Like the Paxos algorithm, the modified Paxos algorithm which operates properly with malicious devices can be conceptually divided into a first phase in which the leader learns of prior, "safe" proposals, and a second phase in which the leader proposes functions for execution by the distributed computing system. An additional step can be added to the first phase of the Paxos algorithm that allows each of the recipient devices to transmit, to the other devices in response to a message suggesting a proposal number from the leader, the most recent proposal for which that recipient device has voted together with a proof that the device was allowed to vote for that proposal, as will be described below. Once each device receives the messages from the other recipient devices, each can independently determine safe proposals, or proposals not submitted by malicious devices which other, also non-malicious, devices had already voted for. Such safe proposals can be determined by finding proposals for which messages were received from a sufficient number of devices indicating that those devices had voted for that proposal. The determined safe proposals can then be transmitted to the leader, together with the messages from the other devices as proof that the determined safe proposals are, in fact, safe.

Proposals can be submitted by the leader for voting, using the messages transmitting the determined safe proposals as a proof of the safety of the proposal. An additional step can then be added to the second phase of the Paxos algorithm that allows each of the devices to send a message to each other indicating that the current proposal is the only proposal with that proposal number for which the device will vote. A device will accept a proposal submitted for voting, so long as that device received such messages from a quorum of devices and so long as that device has not responded to another message, such as from another leader, suggesting a different proposal number. If a device accepts the proposal, it can send a message to the leader, as before, signaling its acceptance. Additionally, the devices can save the messages from the quorum of devices indicating that the proposal is the only proposal with that proposal number for which those devices will vote in order to provide proof of the appropriateness of casting the vote when the device sends an indication of the last proposal it voted for, as stated above.

Upon receipt of messages from a quorum of devices accepting the proposal, the leader can transmit a message to all of the devices requesting that they execute the function contained in the proposal, together with proof that the leader is performing properly in making such a request, which comprises the quorum of messages received from the devices. The leader can also attach to the success message another proposal for which voting is solicited, increasing the efficiency of the algorithm. Additionally, as described above, once the leader has learned of all of the safe proposals for current and future steps of the system, it can continue to propose functions for future steps prior to receiving a vote from the devices on the proposed function for the current step.

However, as can be seen, the modified Paxos algorithm that can accommodate Byzantine failures can add message delays such that at least three message delays exist between the transmission of a request by a client of the distributed computing system and the receipt, by the client, of a response to the client's request. For example, once a client's request is received by a leader device, one message delay can be required to transmit the request, as a proposal, to the devices for a vote. A second message delay can be introduced when each of the devices send, to one another, a message indicating that the received proposal is the only proposal with that proposal number for which those devices will vote. Finally, a third message delay can be required to transmit the devices' votes to the leader device. After receiving the votes and determining the result, the leader can inform the client of the result. Depending on the type of network used, and the proximity of the devices, such message delays can cause a noticeable slowness in the overall system. As a result, it is desirable to reduce the number of message delays required between the receipt of a client's request, and the response to the client.

SUMMARY OF THE INVENTION

By increasing the number of computing devices used in a distributed computing system, fewer messages can be used to maintain proper operation of the distributed computing system in the face of a pre-determined number of Byzantine failures. The proper behavior of the system, despite the presence of malicious devices, can be enabled by using message authenticators to ensure that the message was not modified in transit, and by transmitting a proof that whatever claim is made by a device in the message is a true claim. Additionally, fewer messages can be used by requiring a sufficiently large quorum such that even if a leader is malicious and sends different proposals to different devices, a proposal selected by a previous quorum can be singularly identified by another quorum. The larger quorum can result in fewer message delays because a leader can obtain a sufficient number of messages from devices indicating safe proposal values that the leader can forward the messages and still convince the recipient devices of the propriety of the leader's proposal.

The use of message authenticators, instead of digital signatures, to protect a message can result in computational efficiencies when both transmitting and receiving the message. Additional efficiencies can also be realized because the existence of a sufficient number of computing devices can allow for a pre-determined number of malicious devices and still enable individual devices to obtain a transmittable proof that a given claim is true simply by virtue of the number of devices agreeing upon the claim.

As with the algorithms described generally above, a reduced-message delay Paxos algorithm that can operate properly with malicious devices can be conceptually divided into a first phase in which the leader learns of prior, "safe" proposals, and a second phase in which the leader proposes functions for execution by the distributed computing system. Also as before, once the leader has learned of the safe proposals for each step of the system, it can proceed to propose functions for execution without repeating the first phase of the algorithm, and the leader need not wait for the devices to vote or accept a proposal prior to proposing another proposal for a subsequent step.

Any device can act as a leader and solicit votes for a proposal by initially suggesting, to at least a quorum of devices, a proposal number that the leader will use to submit its proposal for a vote. Upon receiving a suggestion of a proposal number, each of the recipient devices can transmit to the other devices the most recent proposal for which that recipient device has voted together with a proof that the proposal was safe, as will be described below. As with the original Paxos algorithm, each proposal can be assigned a number by the leader submitting the proposal. The proposal with the largest proposal number can be considered to be the most recent proposal. Consequently, a device can ignore a proposal that is later in time, yet has a smaller proposal number than a proposal the device has already received, because that larger numbered proposal that was already received is, by definition, no longer the most recent one.

Once each recipient device receives the messages from the other recipient devices, each recipient device can independently determine safe proposals, or proposals, not submitted by malicious devices, which other, also non-malicious, devices had already voted for. By selecting a quorum to be a sufficiently large number of devices, such that any quorum has, as at least a majority of its devices, non-malicious devices that were part of another quorum, a safe value can be determined even if a previous leader was malicious and submitted for voting more than one value for a single proposal number. Such safe proposals can be determined by identifying proposals for which a majority of the quorum of devices had voted. The determined safe proposals can then be transmitted to the leader, together with the quorum messages as proof that the determined safe proposals are, in fact, safe. Alternatively, the devices can simply forward to the leader the received messages, and allow the leader to determine the safe proposals.

To enable the leader to provide proof of safety to the recipient devices when the leader submits a proposal for voting that is sufficient for the recipient devices to forward on, the leader can receive at least 3M+1 messages in response to the leader's suggestion for a proposal number. Once the leader has received the responses from the devices, it can determine a safe value to propose and an appropriate proposal number, and it can transmit the proposal to a quorum of devices for voting. Additionally, the leader can forward the collection of at least 3M+1 messages as proof of the safety of the selected value.

A device will accept a proposal submitted for voting, so long as the device receives a properly authenticated indication from at least 2M+1 devices that the proposal is safe and the device has not responded to another message, such as from another leader, suggesting a different proposal number. Because the leader can forward a collection of 3M+1 messages with the proposal, at least 2M+1 of those messages can be properly authenticated for the recipient device, providing the device with 2M+1 messages that the device can save. Subsequently, the at least 2M+1 properly authenticated messages can be forwarded by the device, when the device sends an indication of the last proposal it voted for, in order to provide proof of safety of the value for which the device voted.

If a device determines that it can accept a proposal, it can send a message to the leader indicating its acceptance. However, because each of the devices do not send a message indicating the proposal for which they can vote to each other, a device cannot independently determine if the leader is malicious and is sending different proposals to different devices, using the same proposal number. Nevertheless, as described briefly above, because of the size of the quorum needed to accept a proposal, an accepted proposal will have been voted for by a collection of non-malicious devices that comprise a majority of the devices of any other quorum. Therefore, it is not necessary for the devices to independently verify that the leader has submitted the same proposed value to each of the devices of the quorum prior to voting. Because the devices need not communicate with one another prior to voting, the proof of the propriety of the device's vote can be provided by at least 3M+1 messages forwarded by the leader with the proposal.

Upon receipt of messages from a quorum of devices accepting the proposal, the leader can transmit a message to all of the devices requesting that they execute the function contained in the proposal, together with proof that the leader is performing properly in making such a request, which comprises the quorum of messages received from the devices. The leader can also attach to the success message another proposal for which voting is solicited, increasing the efficiency of the algorithm. Additionally, as described above, once the leader has learned of all of the safe proposals for current and future steps of the system, it can continue to propose functions for future steps prior to receiving a vote from the devices on the proposed function for the current step.

In addition, a system with fewer devices can implement the message-delay-reducing algorithm described above if the system can transition to a more conventional algorithm, such as the modified Paxos algorithm, also described above. Such a system can operate using the message-delay algorithm described above so long as a sufficient number of devices remain operational and non-malicious. If additional devices fail or become malicious, such that the sufficiently large quorum, described above, can no longer be maintained, the system can revert to prior algorithms that may require additional message delays but can operate properly with quorums of fewer devices. Thus, if a leader does not receive responses from a sufficient number of devices, it can determine that the system can no longer operate with the message-delay-reducing algorithm, and can request that the system implement a more conventional algorithm.

Additional advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 6*a-l* generally illustrate the operation of a more efficient multi-step algorithm contemplated by the present invention;

DETAILED DESCRIPTION OF THE INVENTION

Figure 1:
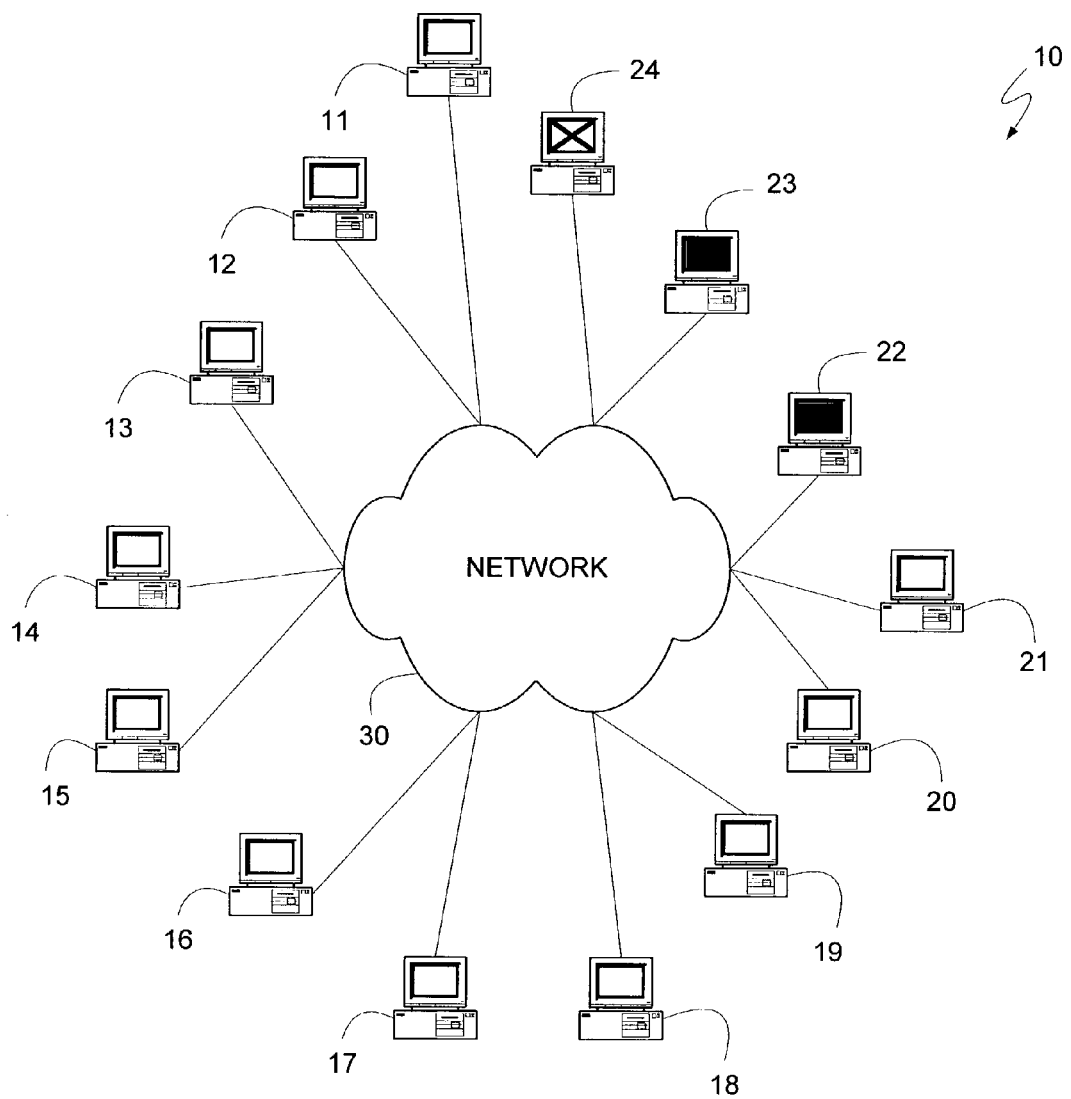
FIG. 1 is a block diagram generally illustrating an exemplary distributed computing system with which the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server device that can act as a central storage repository for various forms of information. Such a distributed system seeks to replicate the central store on all of its constituent devices so that every client seeking to communicate with the central storage can find a convenient and efficient device with which to communicate.

The distributed computing system can be thought of as a state machine, with the future state of the machine completely defined by the current state and the action to be taken. Each constituent device of the distributed computing system can then independently execute the state machine of the overall system. The state-machine approach can be implemented asynchronously such that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of all of the functions that were executed. In such a manner, every device can have the same state and if a device fails it need only determine the last function it executed, identify, from the list, any functions that have been agreed upon since that last function, and execute those functions.

Such a distributed computing system acting as a server can be especially useful for serving a large amount of information to a diverse set of clients, such as a central database for a multi-national corporation, or a popular World Wide Web site. In such situations, a large number of clients can request information from the distributed computing system acting as a server. By implementing the server functionality across multiple devices, more clients can be serviced in parallel increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the proposal having the largest proposal number for which that device has voted or an indication that the device has not voted for any previous proposals. Once the leader receives the responses from the other devices, it can determine which function to propose and request a vote for a proposed function. each device will vote for the proposal unless it has, some time after the initial transmission of the proposal and prior to the requested vote, responded to a suggestion for a different proposal number. If a quorum of devices votes for the proposal, then the proposal is accepted, and the leader can transmit a message to all of the devices requesting that they execute the agreed upon function.

The Paxos algorithm, however, assumes that if a device fails, it merely stops acting and responding. Malicious failures, also known as Byzantine failures, may not be properly handled by the original Paxos algorithm. A malicious failure can generally result in a device that appears to be functioning properly, and yet the results produced by the device are incorrect. To allow the distributed computing system to operate properly even if some of the constituent devices exhibit malicious failures, a modified Paxos algorithm can require that each message from another device be authenticated and that the propriety of the information contained in the message be proven. Messages can be authenticated through the use of message authenticators, which can indicate if a message was modified in transit and can, thereby, verify the message. Proof of the propriety of information contained within a message can be achieved through a collection of messages, each with the same information, from a number of sources greater than the number of devices suffering malicious faults. In such a case, because at least one of those messages came from a properly functioning device, the information contained in the messages is proper.

A modified Paxos algorithm that can accommodate malicious devices can differ slightly from the standard Paxos algorithm by adding two additional messages. One added message can be sent by each device receiving the initial suggestion for a proposal number from the leader. Each of these recipient devices can transmit, to every other device, a message containing the proposal with the largest proposal number for which that device had previously voted, together with a proof of the correctness of that vote, in the form of a collection of forwarded messages indicating that the proposal was safe to vote for. Each recipient device can then forward the messages it receives from the other recipient devices to the leader, providing the leader with a sufficient collection of messages with which to prove the propriety of the leader's proposal. A second added message to account for the presence of malicious devices can be sent by each device receiving a proposal from the leader, to the other devices, indicating that, if the device can vote for the proposal, then the received proposal is the only proposal with the received proposal number for which that device will vote. Each device can then vote for the proposal if it receives a collection of such messages from a quorum of devices. These messages can also be saved to act as the proof of the correctness of the vote used in the first added message.

At least one of these additional messages can be eliminated, resulting in a system that can respond to client requests with one fewer message delay, if the number of devices in the distributed computing system is increased and the number of devices needed for a quorum is also increased. As will be explained below, once a leader has learned of all of the previously voted for proposals for every future step of the system, it need not repeat the first phase of the algorithm, and can proceed to process client requests performing only the second phase. Therefore, an optimization of the second phase can result in the greatest perceived efficiency increase. Specifically, if the leader can obtain a sufficiently large collection of messages that it can forward together with its proposal, then the devices receiving the proposal need not send messages to one another, but can use the collection of messages from the leader as a proof of the correctness of voting for the leader's proposal. However, because a malicious leader can send different proposals to different devices using the same proposal number, a quorum of devices needed to select a proposal can be sufficiently large that any quorum has, as a majority of its devices, non-malicious devices from a previous quorum. In such a manner, even if the leader was malicious, a previously selected proposal can be uniquely determined by any future quorum. Consequently, the devices receiving a proposal from a leader can respond directly to the leader with their votes, and need not send messages to one another prior to responding. As will be shown, by avoiding the intermediate messages, at least one message delay can be removed from the second phase of the modified Paxos algorithm.

Distributed Computing System

Turning to the drawings, wherein like reference numerals refer to like elements, the invention is illustrated as being implemented in a distributed computing system, such as the exemplary distributed computing system 10 shown in FIG. 1. For ease of presentation only, the present invention will be described with reference to distributed computer system 10, comprising computing devices 11 through 28 all interconnected through network 30. In the particular embodiment shown in FIG. 1, devices 26 and 27 are illustrated as malicious, and device 28 is illustrated as a failed, but non-malicious device. As will be understood by those skilled in the art, the present invention is applicable to all distributed computing environments and is not intended to be limited in any way by the exemplary distributed computing system of FIG. 1, which has been simplified for presentation purposes. As will also be understood by those skilled in the art, the present invention does not require any foreknowledge of which devices are malicious or failed devices. Thus, while devices 26-28 are presented as malicious or failed devices, such knowledge is provided to the reader for presentation purposes only. As will be illustrated, the operation of the invention does not depend on knowledge of the operation of any particular device.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
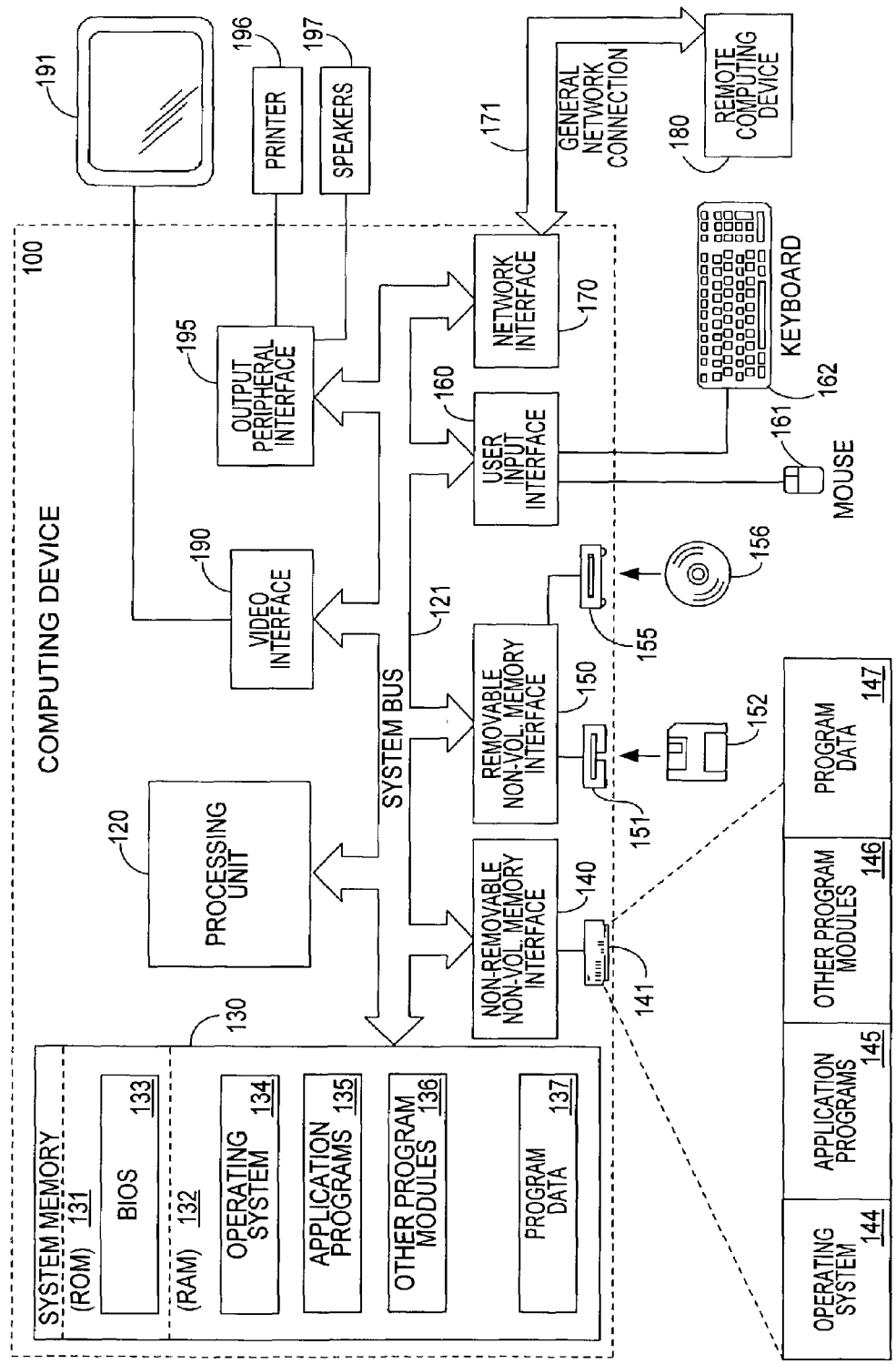
FIG. 2 is a block diagram generally illustrating an exemplary computing device with which the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not equivalent to any of the computing devices 10-28 illustrated in FIG. 1. The exemplary computing device 100 can implement one or more of the computing devices 10-28, such as through memory partitions, virtual machines, or similar programming techniques allowing one physical computing structure to perform the actions described below as attributed to multiple structures. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 operates in a networked environment, such as that shown in FIG. 1, using logical connections to one or more remote computers. FIG. 2 illustrates a general network connection 171 to a remote computing device 180. The general network connection 171, and the network 30 illustrated in FIG. 1, can be any of various different types of networks and network connections, including a Local Area Network (LAN), a Wide-Area Network (WAN), networks conforming to the Ethernet protocol, the Token-Ring protocol, or other logical or physical networks such as the Internet or the World Wide Web.

When used in a networking environment, the computing device 100 is connected to the general network connection 171 through a network interface or adapter 170, which can be a network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a computing device in a distributed computing system can act as a leader and propose that a specific function be executed by the distributed computing system. If the device was not the leader which proposed the immediately prior agreed upon function, the device can initially seek to learn of pending proposals by suggesting a proposal number that it intends to use. This suggestion of a proposal number can be sent to at least a quorum of devices in the distributed computing system. Each receiving device can send a response to the other receiving devices, indicating the most recent proposal for which the receiving device previously voted. Each device can then, based on the messages it has received from the other devices, independently determine safe proposals. A safe proposal is either the proposal with the largest proposal number for which at least a majority of the devices of the quorum have previously voted, or if no such proposal exists, all proposals are safe. The determined safe proposals can then be sent to the leader that initiated the proposal, together with the messages from each device indicating the most recent proposal for which that device voted, as a proof that the safe proposals are indeed safe. Alternatively, the devices can simply forward the received messages to the leader and allow the leader to determine which proposals are safe.

The leader device can select a safe proposal and submit that proposed function for a vote to a quorum of devices. The leader can also forward along, as a proof of the safety of the selected proposal, the messages received in response to the leader's suggestion of a proposal number. The number of messages forwarded along can be sufficient to allow the devices receiving the proposal to be able to use the messages as a proof of the safety if they vote for the proposal. Upon receiving a request to vote on a proposed function, a recipient device can vote for the proposal as long as the device has not subsequently responded to a suggestion for a different proposal number, such as from a different leader. In addition, a voting device can store the forwarded messages received from the leader, as proof that the device's vote was proper. Upon receipt of messages voting for the proposed function from a quorum of devices, the leader can determine that the function has been agreed upon, and can transmit a message to all of the devices requesting that they execute the agreed upon function, and attaching the messages from the quorum of devices as proof that the leader is performing properly in requesting the execution of the agreed upon function.

State Machines

In a distributed environment, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the remaining functions from the ordered list. Such a state machine approach was initially proposed in the article "Time, Clocks, and the Ordering of Events in a Distributed System," by Leslie Lamport published in *The Communications of the ACM*, Volume 21, Number 7, July 1978, the contents of which are hereby incorporated by reference in their entirety.

Paxos Algorithm

By using a state machine approach, the synchronization of the constituent devices 11 through 28 of the distributed computing system 10 becomes a problem of agreeing on the functions to be performed and the order in which to perform them. One method for agreeing upon a function to be performed is known as the Paxos algorithm. The Paxos algorithm allows the system 10 to operate properly even in the face of non-malicious failures, where devices can stop operating without advanced warning. The Paxos algorithm requires that at least a quorum of devices agree to a function before the system as a whole performs that function. With the Paxos algorithm, a quorum can be a simple majority, or it can include more devices than that, depending upon the particular requirements of the system. However defined, a quorum can be sufficiently large such that any two quorums have at least one properly functioning, non-malicious device in common.

To maintain consistency, the system 10 can limit the performance of functions to a single function per step. Therefore, it can be desirable to select only a single function for a given step. Since any two quorums have at least one properly functioning, non-malicious device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multi-step process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader soliciting the votes the highest proposal number, that is less than the current proposal number, for which the device has previously promised to vote for. In such a manner the leader can always learn of previous proposals.

Figure 3A:
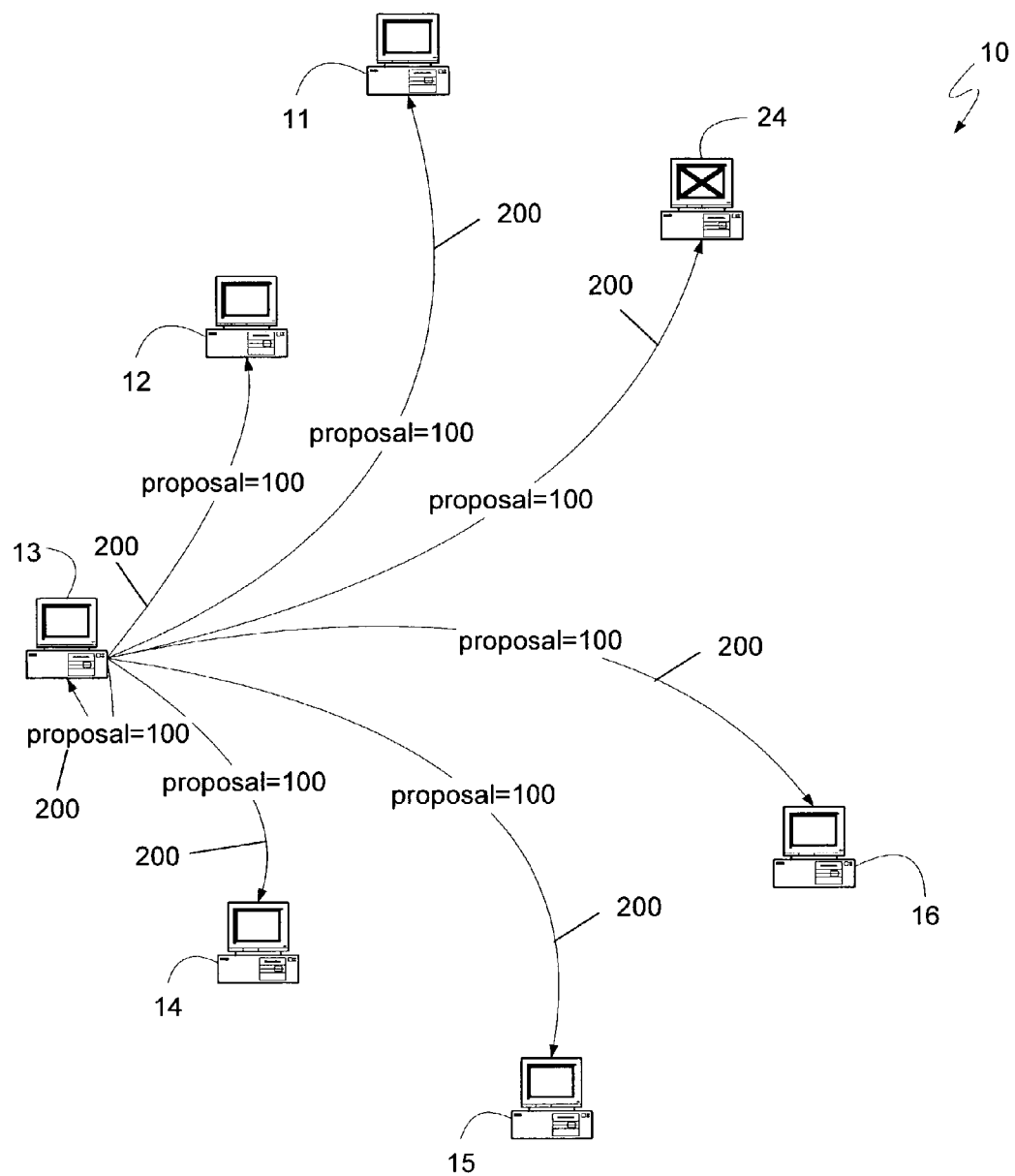
FIGS. 3*a-e* generally illustrate the operation of a consensus algorithm contemplated by the present invention.

Turning to FIG. 3a, the Paxos algorithm is explained in greater detail using the exemplary distributed computing system 10. For simplicity, the present description will treat the distributed computing system 10 as comprising seven devices: devices 11 through 16 and failed device 24. In such an environment, a quorum can be defined as any group of four or more devices because such a definition will ensure that every quorum has at least one device in common. As shown in FIG. 3a, device 13 can assume a leadership position and transmit message 200 to devices 11-16, and 24, suggesting a proposal number for a proposal that the system execute a given function. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Because proposals can be ordered based on their proposal numbers, efficiencies can be gained by preventing two or more devices using the same proposal number for two or more different proposals. Therefore, proposal numbers can be selected by devices using mechanisms based on unique device properties, such as a Media Access Control (MAC) address of the device sending the proposal. Alternatively, proposal numbers can be partitioned among the devices, requiring each device to select proposal numbers only from among its partition. One method for partitioning the proposal numbers would be to grant to the "$i^{th}$" device proposal numbers congruent to "i" modulo the number of devices in the system.

Because, as will be shown, the Paxos algorithm can operate even if a number of devices act as leaders, the mechanism by which a device assumes a leadership position is not important. Nevertheless, a mechanism that minimizes the chances that different devices can simultaneously believe they are the leader can increase the efficiency of the system. For example, mechanisms based on unique device properties, such as a MAC address, can reduce the chance of having more than one simultaneous leader. One such mechanism could simply select a properly functioning device with the smallest MAC address to be the next leader. In addition, a leader selection mechanism could prevent a device from attempting to become a leader if the device has already received a message from another device acting as a leader within a pre-determined amount of time, to prevent a constant changing of the leadership device. Such constant leadership change can introduce inefficiencies into the operation of the system.

Figure 3B:
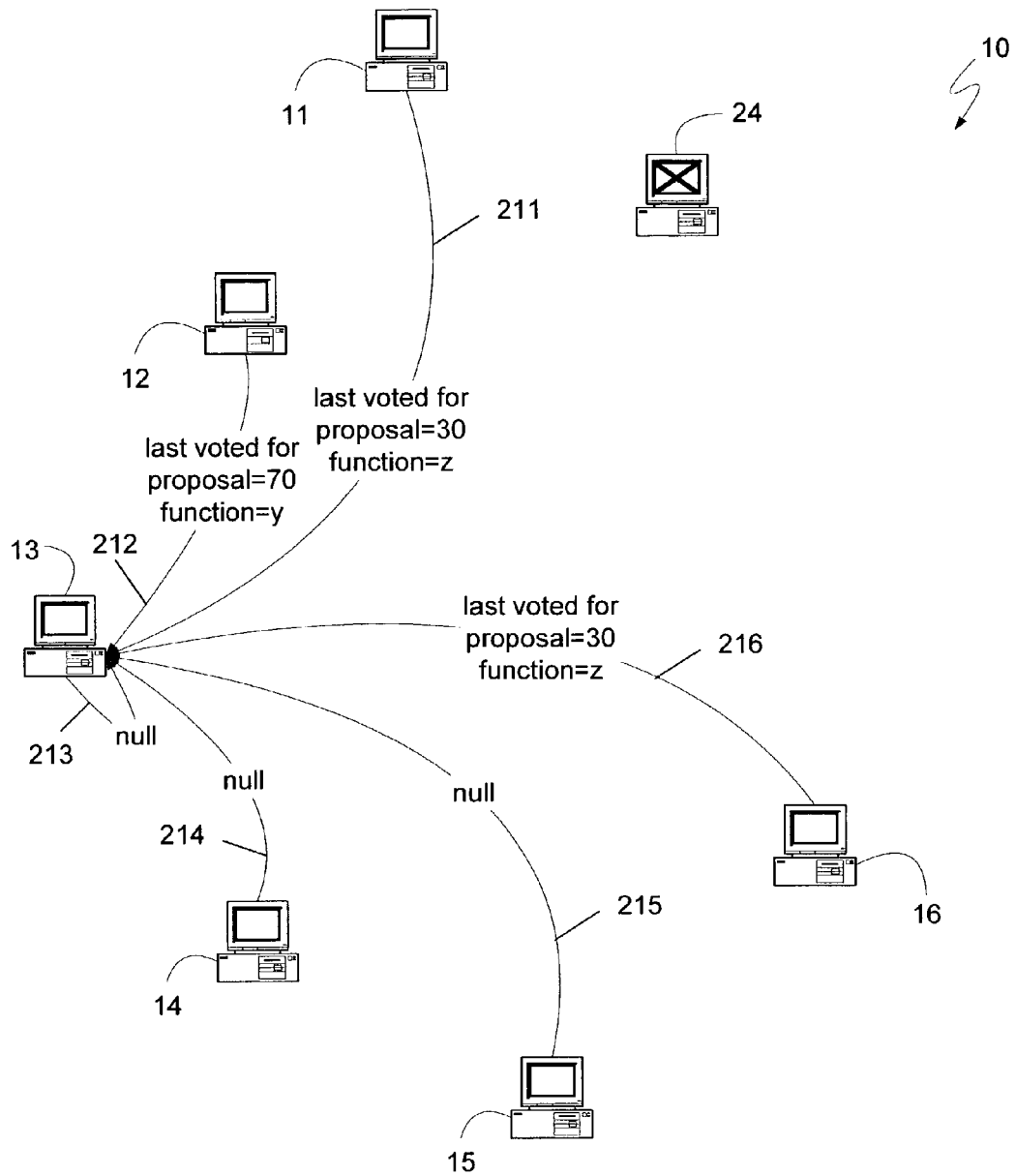

Turning to FIG. 3b, upon receipt of a message, such as message 200, suggesting a new proposal number, each device 11-16 can respond with message indicating the largest proposal number, that is still less than the proposal number suggested by message 200, and the function proposed by it, for which that device has cast a vote. If the device has cast a vote for a proposal number that is greater than the proposal number used by the leader, the device can ignore the message from the leader, or, as will be explained below, the device can respond with the last vote information despite the larger proposal number. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, devices 11 and 16 previously voted for proposal number 30, which had proposed that the system 10 execute a function identified by the variable "z". Messages 211 and 216 can, therefore, convey this last vote information of devices 11 and 16 back to device 13. Devices 13-15 may not have received any proposals and have, therefore, not previously cast a vote for any proposal. They can, therefore return a null response, as indicated by messages 213-215. Again, as above, messages sent from device 13 to itself can be handled internally by device 13, but are illustrated for explanatory purposes. Also, because device 24 may be experiencing a fault, such as a connection problem, it may not respond to message 200.

Figure 3C:
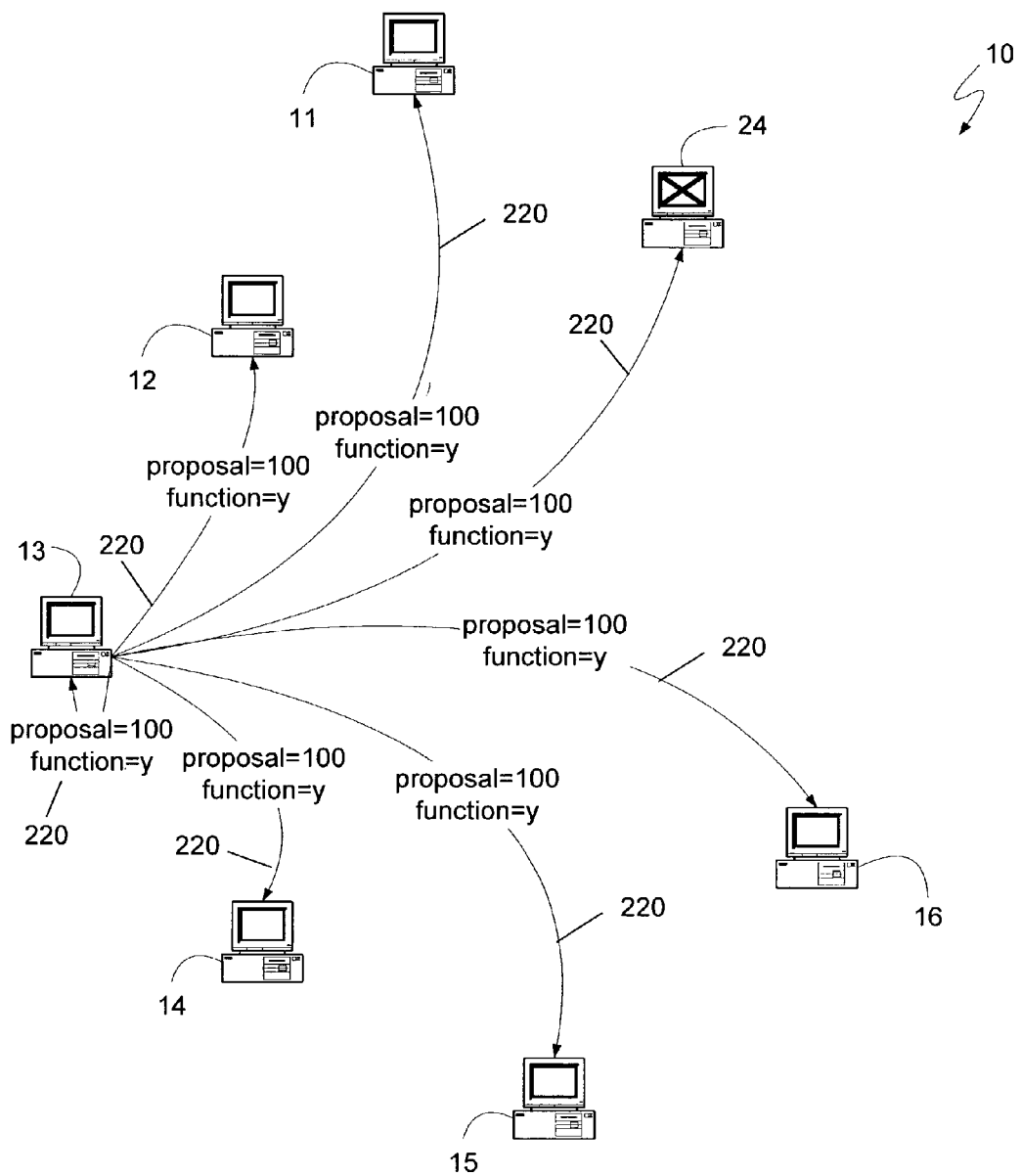

Turning to FIG. 3c, when the leader 13 receives messages 211-216, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-216 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains 7 devices, including at most one device suffering a failure, a quorum can be as few as four devices. Thus, it is sufficient for the leader 13 to solicit votes for a proposal from devices 11 and 13-15 only. In such a case, the leader 13 need not propose the function "y" because device 12 is not a member of the selected quorum. Instead, the leader 13 can propose the function "z" as that function was voted for by devices 11 and 16 as part of proposal number 30. Because proposal number 30 is the largest proposal number voted on by devices in the quorum, the leader can select function "z" to be submitted to a vote.

Because the message 200, suggesting a proposal number, acts as a mechanism by which the leader 13 can determine an appropriate proposal number to select, and can learn of all lower numbered proposals that were previously proposed, it can be necessary for the leader 13 to send multiple messages, such as message 200, increasingly suggesting larger proposal numbers if the devices do not respond to earlier messages having too small a proposal number. Rather than requiring the leader to send a multitude of messages, each device can respond with the largest numbered proposal for which it has voted irrespective of whether the proposal number suggested by the leader is larger or smaller than the previously voted for proposal. In such a manner, the leader 13 can more efficiently learn of previous votes and can more accurately select a proposal number with which to propose a function.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-16 had received and responded to another suggestion for a new proposal, having a proposal number greater than 100, prior to leader 13 sending message 220 as shown in FIG. 3c, then that device may not vote for the function for which a vote was solicited by message 220.

Figure 3D:
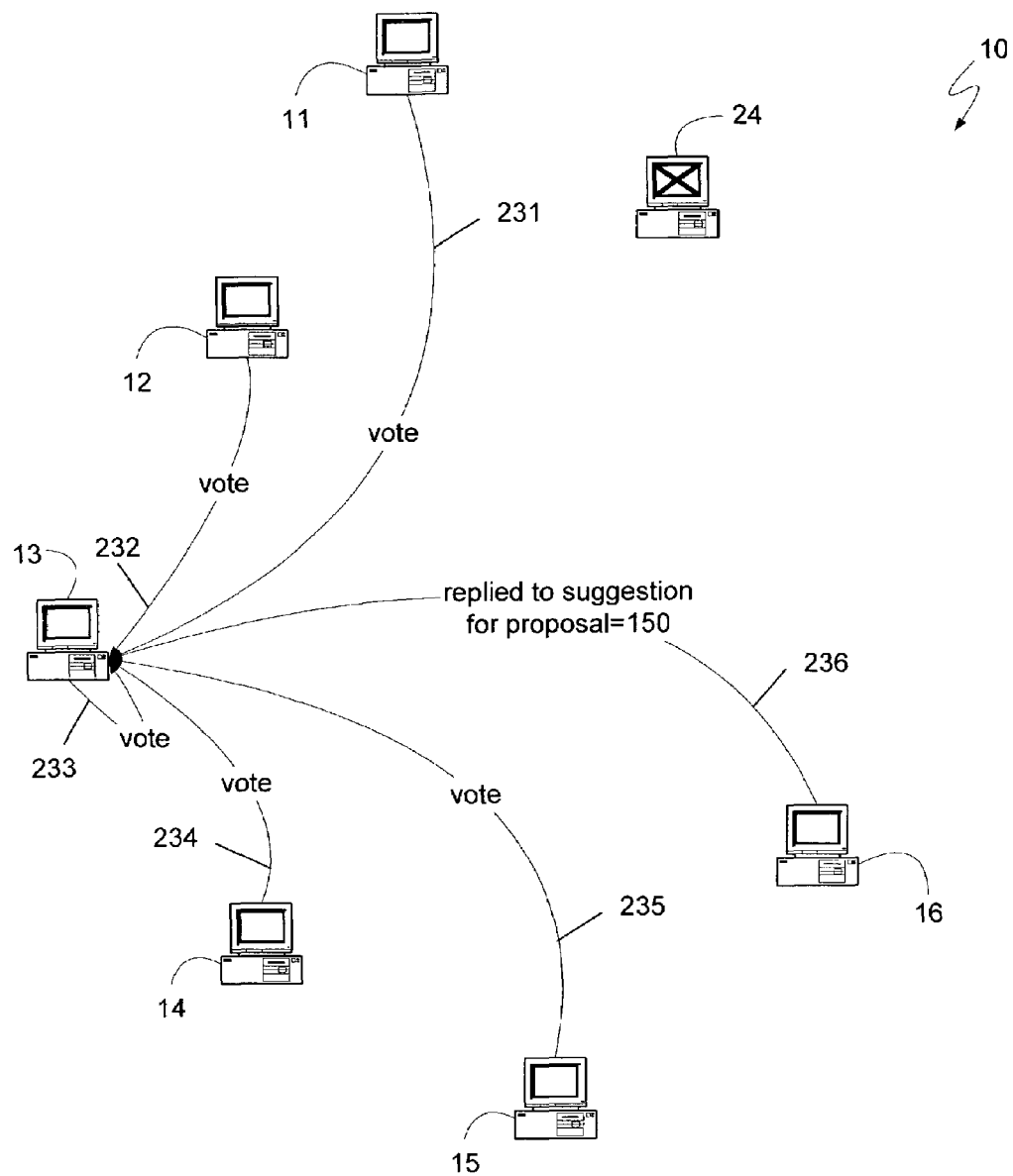

Turning to FIG. 3d, each of the devices 11-15 has independently determined that they have replied to no other suggestions for new proposals with proposal numbers greater than 100. Therefore, because the last suggestion for a new proposal to which they responded is not for a proposal with a larger number than the current proposal, devices 11-14 vote for the proposal and indicate their votes in messages 231-234, respectively. As before, message 233 is shown for illustration purposes, and could be handled internally to device 13. Device 16, however, may have, sometime prior to the transmission of message 220, received and responded to a suggestion for a new proposal with a proposal number greater than 100. Therefore, upon receipt of message 220, device 16 determined that it had already responded to a suggestion for a new proposal with a number greater than 100 and could not, therefore, vote for proposal 100. As a result, as shown in FIG. 3d, device 16 responds with message 236 informing the leader 13 that it has responded to suggestion for a proposal with a proposal number of 150. If leader 13 determines that it needs the vote of device 16, it can send another message, similar to message 220, except with a proposal number greater than 150. Alternatively, device 16 need not respond to message 220, and device 13 can, if it needs device 16's vote, attempt another vote with a proposal with an arbitrarily large proposal number. As can be seen, if device 16 does not indicate the larger proposal number to leader 13, the leader may have to guess and could waste resources guessing, through multiple messages, an appropriately large proposal number.

Figure 3E:
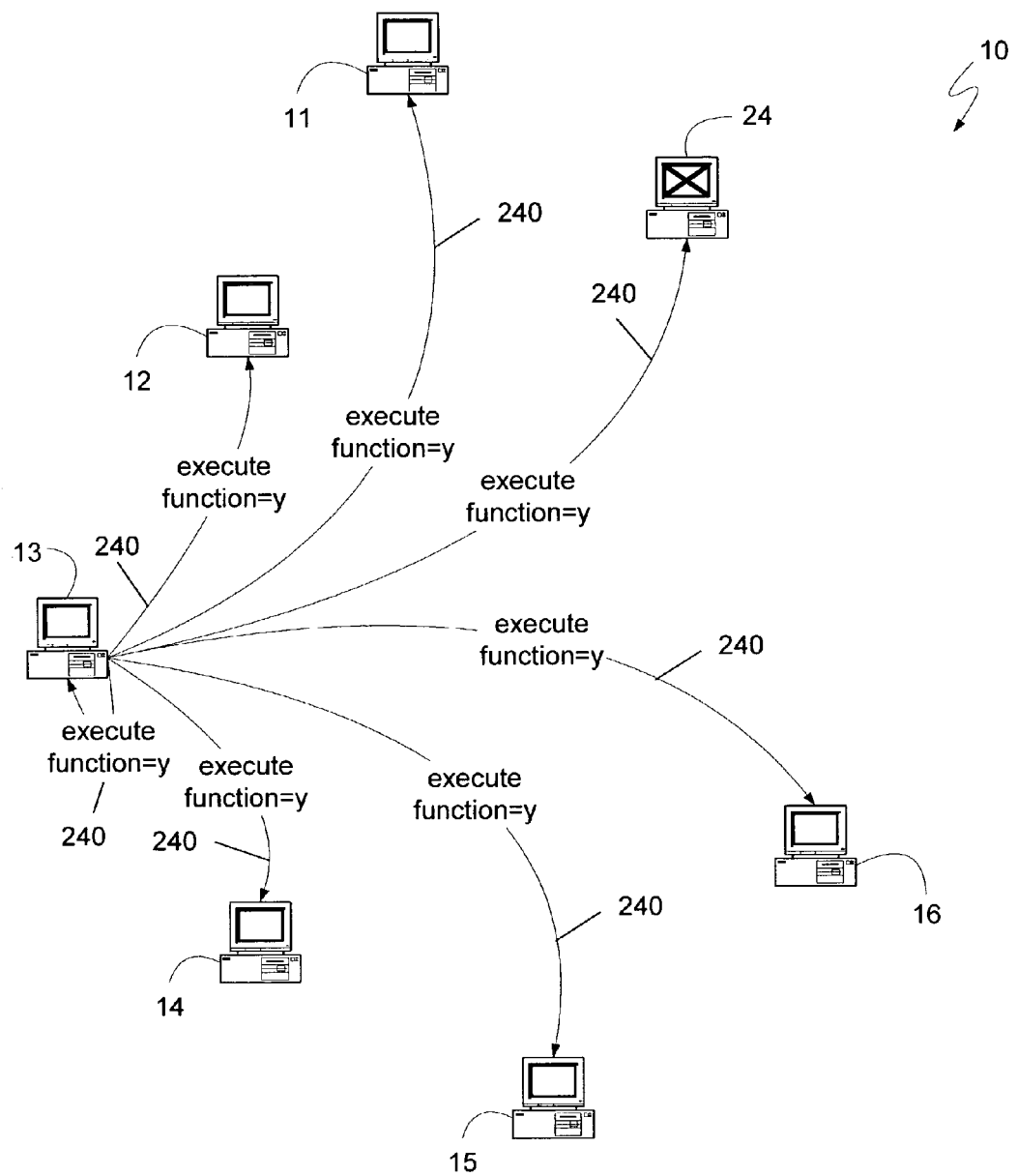

However, because devices 11-14 are sufficient to constitute a quorum, the leader 13 can determine that the proposal has been accepted, even without the vote of device 16, and can request, with message 240 as shown in FIG. 3e, that each of the devices 11-16 execute function "y". While devices 11-14 do constitute a quorum, it is not the same quorum to which leader 13 submitted the proposal to a vote, which included devices 15 and 16. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation. For example, if another device that was previously non-operational, such as device 24, became operational and re-joined the system 10, it might try to propose a function different from "y" for the same step for which the system had selected and executed "y". If device 24 sent a proposal with a proposal number less than 100, it could be ignored by each of the devices 11-16, since they had already voted on proposal number 100 as shown in FIG. 3d. If device 24 sent a proposal with a proposal number greater than 100, such as proposal number 130, each of the devices 11-15 would return a message indicating that they had voted for function "y" in proposal number 100. Device 16, because it may not have voted, as illustrated in FIG. 3d, might respond with message 216, indicating that it had voted for function "z" in proposal number 30.

Device 24 could then select the largest proposal among a quorum, which, by definition would include at least some of the devices 11-15, and submit the function proposed in that proposal for voting. Thus, for proposal 130, device 24 would submit function "y" for a vote. Each device could then vote on proposal 130 following the algorithm set forth above. Either proposal 130 would be selected, which would not change the prior decision to execute the function "y" for the particular step, or proposal 130 would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

The application of the Paxos algorithm, described above, can enable a distributed computing system to select a function to execute for a given step. By repeating the steps described above, a distributed computing system can agree upon a series of functions to be performed as a series of steps, and can thereby form a continuously operating system. In such a case, each of the messages described above can contain, in addition to the information illustrated in FIGS. 3a-3e, an indication of the step of the system to which the message applies. Thus, for example, each of the messages shown in FIGS. 3a-3e could have indicated that they applied to a given step of the system, such as step 25. Upon the selection of function "y" for execution in step 25, the algorithm could be repeated for step 26, with each of the messages indicating step 26.

The application of the Paxos algorithm described above can be conceptually divided into a first phase, illustrated by FIGS. 3a and 3b, in which a leader learns of previous proposals, and a second phase, illustrated by FIGS. 3c-3e, in which the leader selects an appropriate proposal, known as a safe proposal, such as the proposal having the largest proposal number voted for by one of the devices in the quorum, and submits the proposal to the devices for a vote. Rather than repeating each phase for each step of the system, phase 1 could be performed simultaneously for all future steps of the system. In such a case, the leader would then know the safe proposals for all future steps and could simply perform the second phase repeatedly, providing a more efficient algorithm.

For example, message 200 shown in FIG. 3*a* could be a suggestion for a proposal number, not only for the current step, but for all future steps as well. In such a case, the responses 211-216 shown in FIG. 3*b* could contain information regarding the largest numbered proposal voted for by each of the devices for each of the current and future steps. Alternatively, if a device has been instructed to perform a function, and therefore knows that a function was selected for one of the current or future steps, it can inform the leader in the response messages 211-216 of the previously selected function and the step for which it was selected. Consequently, the leader 13 could execute the previously selected functions for the steps indicated, if any, and then select a safe proposal for the current step, or the first step for which a function has not already been selected, and exchange messages with the devices, such as the messages shown in FIGS. 3*c*-3*e*, with each message specifying the first step for which a function has not been selected. The leader could then select a safe proposal for a subsequent step, and again exchange messages with the devices, such as the messages shown in FIGS. 3*c*-3*e*, with each message specifying that subsequent step. In such a manner the leader could repeatedly perform the second phase of the algorithm, so long as a different device did not attempt to become a leader and cause some devices to not vote for the proposals from device 13. In such a case, device 13 would need to revert back to the first phase of the algorithm.

Because the current state of a state machine may depend, not only on the functions that were executed, but on the order in which those functions were executed, if a device does not know which function was executed for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were executed for a step that the device missed, such as by requesting the information from the leader if the leader suggests a proposal number for a larger numbered step than the step for which the requesting device is not aware of the function to execute. By requesting the information, each device in the system can more quickly become synchronized with the remaining devices.

However, if a device has missed too many steps, it can be more efficient to simply inform the device of the current state rather than transmitting all of the functions for all of the steps it has missed. One mechanism for ensuring that a device does not miss too many steps is to enable each device, or a collection of devices to periodically take a snapshot of the various parts of the state, or the whole sate. The state of another device could, therefore, be updated by sending it the appropriate snapshot together with the functions that were executed since the latest snapshot. Additionally, by using checksums of individual parts of the state, the state of another device could be updated by just sending that other device the parts of the state that differ from its current copy.

The devices implementing the steps described above can maintain variables storing information used in the algorithms. For example, for each step for which the devices does not know which function was chosen, the device can store the proposal number of the proposal with the largest proposal number for which that device has responded to, the proposal number of the proposal with the largest proposal number that device has voted for, the value proposed by the proposal with the largest proposal number for which that device has voted, and, if the device is a leader, it can additionally store the proposal number for the last proposal it issued. Additionally, devices can record which function was selected for all of the steps for which they have such information. Alternatively, as described above, a device could store a snapshot of its state at a given time, and the functions executed only since that time. Such variables can be stored in either volatile storage 130 or non-volatile storage, such as hard disk 141, floppy disk 152, or optical disk 156, shown in FIG. 2.

Additional information regarding the Paxos algorithm can be found in the paper entitled "The Part-Time Parliament" by Leslie Lamport, published in *ACM Transactions on Computer Systems*, volume 16, number 2 on pages 133-169, dated May 1998, which is hereby incorporated by reference in its entirety.

Accounting for Malicious Devices

The algorithms described above do require specific behavior of the devices of a distributed computing system and cannot, therefore, operate properly if some of the constituent devices are malicious. Such malicious failures, or Byzantine failures, can be appropriately handled through algorithms similar to those described above, with additional messages and requirements that allow each device to verify the authenticity of a message and the propriety of the message.

Figure 4A:
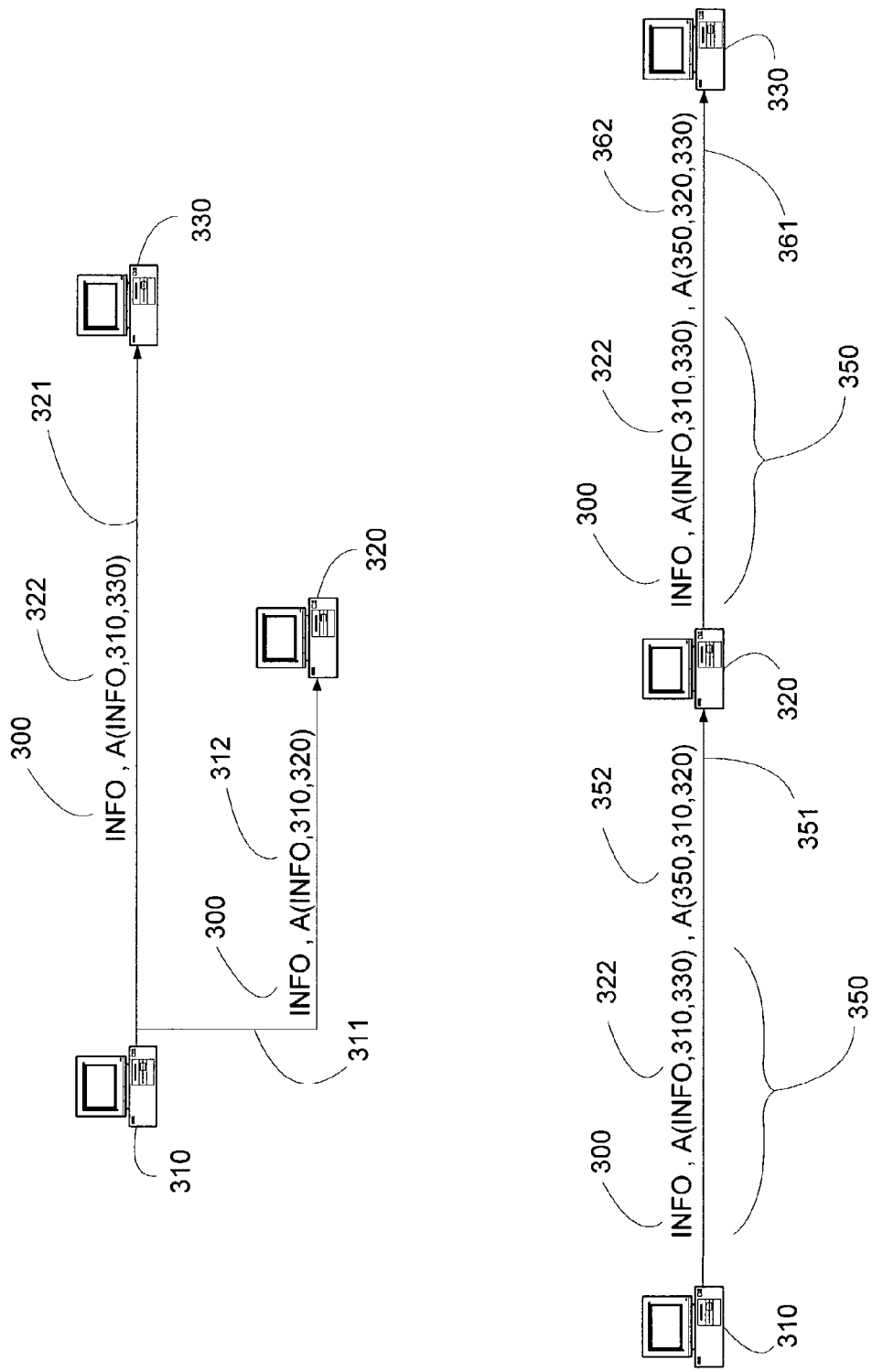
FIGS. 4*a-b* generally illustrate a mechanism of authentication and verification contemplated by the present invention.

Turning to FIG. 4*a*, one mechanism for allowing devices to verify the authenticity of a message is illustrated. Device 310 can seek to transmit an element of information 300, such as a proposal, a vote, or other inter-device message, to devices 320 and 330. Device 310 can protect information 300 through the use of various encryption processes. For example, using public key encryption, device 310 could encrypt information 300 such that a publicly known decryption key could be used by devices 320 and 330 to decrypt the information. In such a manner, device 310 could broadcast the information to devices 320 and 330, yet the information could not be modified in transit. Alternatively, public key encryption can be used to send a digital signature, which can enable a device to authenticate a message in a way that the message can be forwarded.

However, the use of digital signatures, and similar mechanisms that require the use of public key cryptography, can require a significant amount of processing resources. As a result, the use of such encryption algorithms can decrease the performance of the overall distributed computing system. An alternative, a less computationally expensive, mechanism contemplated by the present invention is the use of message authenticators to verify that a message was not modified in transit. As will be known by those skilled in the art, message authenticators rely on shared-key encryption, which can be faster and less computationally expensive. Generally, a cryptographic key is shared between a sender and a receiver pair and is used to encrypt a message and then decrypt it after transmission. In such a manner the receiving device can determine if any part of the message has been changed or deleted, or if any new information was added to the message. Thus, message authenticators protect against modification to the message while it is in transit. A properly authenticated message is a message that contains the same information when it is received as it had when it was sent.

Because message authenticators are designed to provide information only to a specific destination device, they may not provide for the multicasting of a single message to multiple destinations as could be performed with public key cryptography. Nevertheless, the efficiencies gained through the use of message authenticators can outweigh any inefficiencies inherent in the point-to-point transmission of messages.

FIG. 4a illustrates one mechanism for using message authenticators to verify the authenticity of a message contemplated by the present invention. Device 310 seeks to send information 300 to devices 320 and 330. One solution would be to send information 300 directly to device 320 in message 311 and directly to device 330 in message 321, together with message authenticators 312 and 322 that can authenticate the transmission from device 310 to device 320 and device 330, respectively. An alternative solution allows device 310 to send a message 351 to device 320, which can both verify the message for itself and can forward the message along, as message 361, to device 330. To verify that the information 300 contained in message 361 was not tampered with in transit, device 330 can look for an authenticator 322 authenticating the transmission of information 300 from device 310 to device 330. However, for the authenticator 322 to be included in the forwarded message 361 from device 320 to device 330, device 320 can receive the authenticator 322 from device 310 in message 351. Therefore, message 351 can include the information 300 and the authenticator 322 that can authenticate the information 300 being sent from device 310 to device 330. Message 351 can also include authenticator 352 that authenticates the information 300 and the authenticator 322, collectively 350, from device 310 to device 320. In this way device 320 can verify that both the information 300 and the authenticator 322 were not modified in transmission between device 310 and 320. Similarly, when forwarding the collection 350, consisting of the information 300 and the authenticator 322, onto device 330, device 320 can include authenticator 362 authenticating collection 350 from device 320 to device 330. In such a manner, message authenticators can be used to verify a message even when the message is forwarded from one receiving device to another.

Extrapolating the above mechanism, a message can be authenticated for transmission through any number of intermediate devices. If a message is to be authenticated for transmission from device d(n) to d(1) through devices d(n-1), d(n-2), and all the way through device d(2); device d(n) can send, to device d(n-1), a message in the form of: (i, A1, A2, ..., A(n-1)), where "i" can represent the information being transmitted, "A1" is an authenticator authenticating i from d(n) to d(1), "A2" is an authenticator authenticating i and A1 from d(n) to d(2), and so on. Device d(n-1) can then send a message in the form of: ((i, A1, A2, ..., A(n-2), AA1), where AA1 is an authenticator authenticating the message (i, A1, A2, ... A(n-2)) from device d(n-1) to device d(n-2). As can be seen, the above messages can be expressed elegantly using recursion. Therefore, mathematically, if an authenticator of a message containing information "i" sent from device "a" to device "b" can be represented as $\Sigma(i, a, b)$, then information "i" can be "k-authenticated," such that it can be forwarded k times, by sending a (k+1)-tuple of the form: <i, A1, A2, ..., Ak>, where each Aj is an array such that Aj[a,b]=$\Sigma$(<i, A1, A2, ..., A(j-1)>, a, b). Therefore, the use of message authenticators can allow the verification of a message even if the message will be forwarded along by a chain of intermediate devices.

The above method works well if the information were only being sent via a single path to a single recipient. However, in practice, the same information may be sent via many paths to many different recipients, and some paths may branch off of other paths. While a brute force approach of calculating the above messages for each path could be employed, the creation of authenticators can require computing resources. Therefore, to minimize the burden on the computing devices of the system 10, a single authenticator can be used for any particular device on any path. The number of authenticators that an information transmitting device needs to determine can be limited to the number of unique devices through which the information may be transmitted on any given path. For example, transmissions that share the same path between a few devices, and then branch off in different directions to reach other devices can share the same authenticator for the shared path between two devices.

Figure 4B:
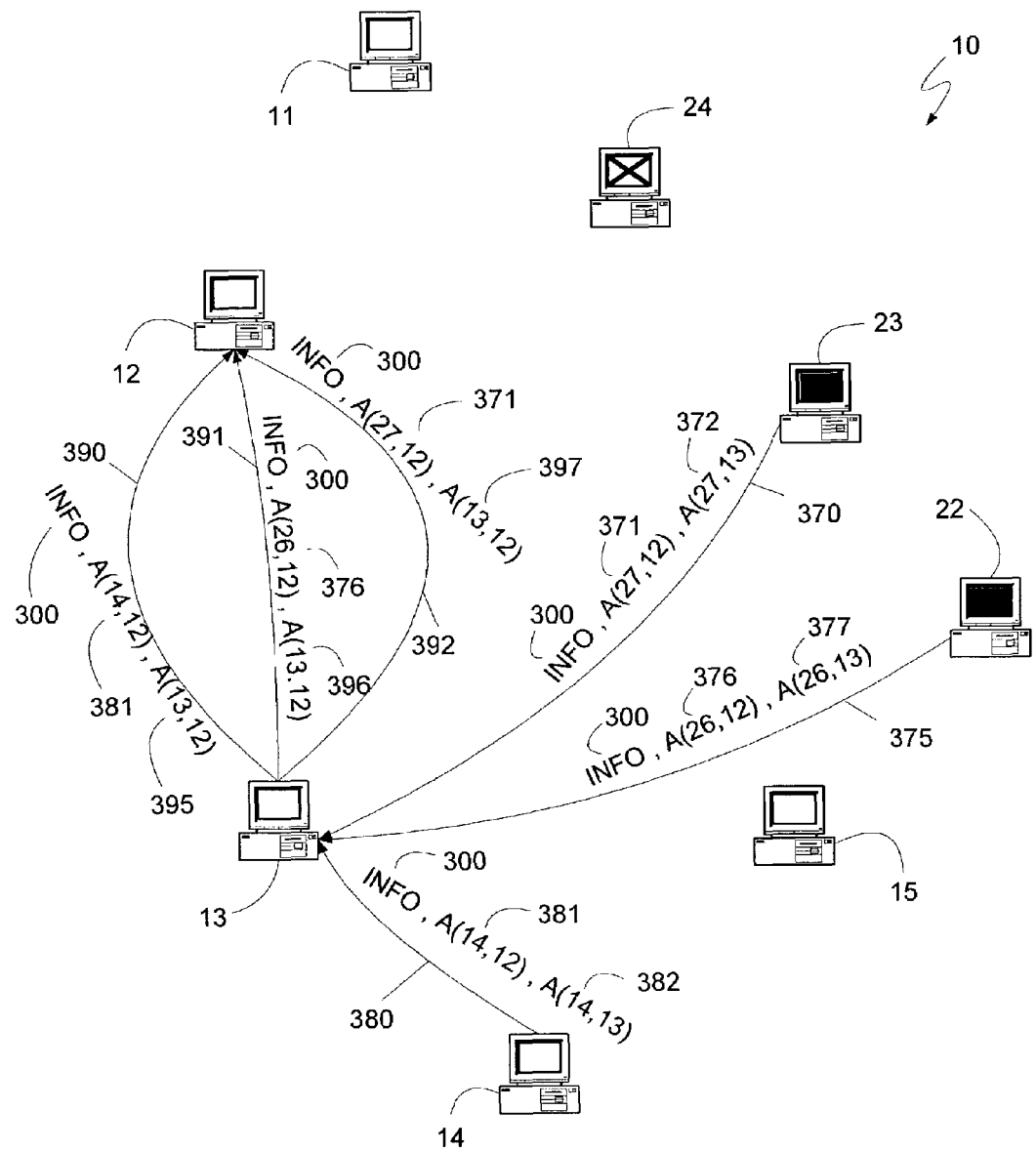

Authenticating the message, however, merely indicates that the message was not intercepted and modified by a malicious device during transmission, not that the message was sent by a properly functioning device. For example, a malicious device could send a false message that arrives unchanged and, therefore, properly authenticated. To remove the influence of devices experiencing malicious failures, the recipient device can both verify the authenticity of the message and the propriety of the message. Turning to FIG. 4b, a mechanism contemplated by the present invention for verifying that a message is proper is illustrated. Device 13 of the illustrative distributed computing system 10 can receive messages 370, 375, and 380 from devices 27, 26, and 15, respectively. Devices 26 and 27 are indicated as experiencing malicious failures, though, as will be shown, the algorithm is equally applicable to any number of malicious devices, provided the distributed computing system has a sufficiently large number of constituent devices. Furthermore, while devices 26 and 27 are shown as experiencing malicious failures, it is not required that any device know which particular devices are experiencing malicious failures. Rather, the only consideration is the number of malicious devices that may exist within the system. For example, in exemplary distributed computing system 10 shown in FIG. 4b, the number of malicious devices can be, at most, a set of any two devices. In the particular example shown in FIG. 4b, two malicious devices do, in fact exist; devices 26 and 27.

In a distributed computing system with a given number of devices experiencing malicious failures, a device can verify that a message is proper if it receives messages with equivalent information from more devices than there are malicious devices. Therefore, considering the illustrative system 10, if any device receives three or more messages, each asserting the same information, then the device can trust that the information asserted is proper because at most two of the messages came from malicious devices, leaving at least one message from a properly functioning device. As shown in FIG. 4b, messages 370, 375, and 380 each carry the same information 300. Furthermore, each of the messages 370, 375, and 380 is properly authenticated for device 13. Authenticators 372, 377, and 382, authenticate both the information 300 and the authentication of that information to device 12 by authenticators 371, 376, and 381, respectively, in the manner described above.

Because device 13 has received three independent, and properly authenticated, messages, it can verify that information 300 is proper because device 13 can know that at least one of the messages 370, 375, and 380 is from a properly functioning device which, by definition, only transmits proper messages. A proper message can be any message that, given a set of conditions, is allowed or required by the algorithms described. Since each of the messages 370, 375, and 380 contains the same information 300, it is not necessary for device 13 to identify which message is from the properly functioning device. If device 13 had only received messages 370 and 375, it could not determine that the information 300 was proper, because each of those messages could have been sent by a malicious device. Therefore, in a distributed computing system having at most M malicious devices, a device can verify the propriety of information contained in a message by receiving at least M+1 properly authenticated messages from M+1 different devices, each containing the same information.

However, if device 13 of FIG. 4b attempts to forward the messages 370, 375, and 380 to device 12, device 12 may not be able to verify that the messages are proper. Message 390, for example, contains the information 300, an authenticator 381, authenticating the information from device 14 to device 12, and an authenticator 395, authenticating the information 300 and the authenticator 381 from device 13 to device 12. Authenticator 382 of message 380 was used to authenticate the information 300 and the authenticator 381 to device 13, and need not be included by device 13 when forwarding the message onto device 12. Similarly, messages 391 and 392 contain information 300, authenticators for that information from devices 26 and 27, respectively, to device 12, and authenticators 396 and 397 authenticating the information 300 and the authenticators 392 and 393, from device 13 to device 12. The authenticators 371 and 376 may be invalid, however, not because the message may have been changed in transit, but because devices 26 and 27 are malicious and may have purposefully attached invalid authenticators. Furthermore, device 12 cannot determine whether the authenticators 371 and 376 are invalid because they were originally sent by malicious devices 26 and 27, or because the messages 391 and 392 are phony messages created by malicious device 13. As a result, the only properly authenticated message device 12 could receive is message 390. However, device 12 cannot independently determine whether device 14 is a properly functioning device. Therefore, because device 12 has received only one properly authenticated message, and there are as many as two known malicious devices in system 10, device 12 cannot verify the propriety of the information 300 and cannot, therefore, rely on it.

To allow for the possibility that up to two messages of the messages 390-392 that were forwarded to device 12 have improper authenticators, device 13 would need to collect and forward five messages. With five forwarded messages, at most two of which could have improper authenticators, device 12 can still receive the at least three properly authenticated messages to verify the veracity of information 300. For example, if devices 11 and 15 similarly sent properly authenticated messages to device 13, and device 13 forwarded those messages together with messages 390-392, device 12 would receive five messages, of which at most two, specifically messages 391 and 392, could have improper authenticators. However, device 12 would still receive at least three properly authenticated messages, each delivering the same information 300. Device 12 could then trust that information 300 was proper because, of the three messages, at most two could have been sent by malicious devices, leaving at least one message that was sent by a properly functioning device.

In a distributed computing system with at most M malicious devices, a collection of M+1 properly authenticated messages, each with the same information, can verify, to the recipient device, that the information contained in those messages is proper and can be relied upon. However, the device will not be able to forward the messages onto another device, and convince that second device that the information contained in the messages is proper. To forward messages and convince the device to which they are being forwarded of the propriety of the contained information, at least 2M+1 properly authenticated messages, each with the same information, are necessary. If the second device seeks to forward the messages onto a third device, and convince the third device of the propriety of the information, the first device will need to receive and forward onto the second device 3M+1 properly authenticated messages, each with the same information. More generally, in a distributed system having at most M malicious devices, a device can forward a collection of messages, and know that the recipient device can determine the information contained in the messages to be proper, if there are at least (k+1)M+1 properly authenticated messages received by the first device, where k indicates the number of times the messages can be forwarded, with each further receiving device believing the information contained in the messages to be true.

Modified Paxos Algorithm

As described above, the use of message authenticators can allow a device to determine if a message was modified in transit, even if the message is a forwarded message. Furthermore, a sufficiently large collection of messages, each with the same information, can allow a device to determine if the information is proper. Therefore, the application of these mechanisms to the above described Paxos algorithms can enable a modified Paxos algorithm to operate properly in the presence of malicious devices. Essentially, such a modified Paxos algorithm can add two messages to the above described algorithms, in a manner to be described below, that enable the use of the above described mechanisms for operating in the face of malicious devices.

Figure 5A:
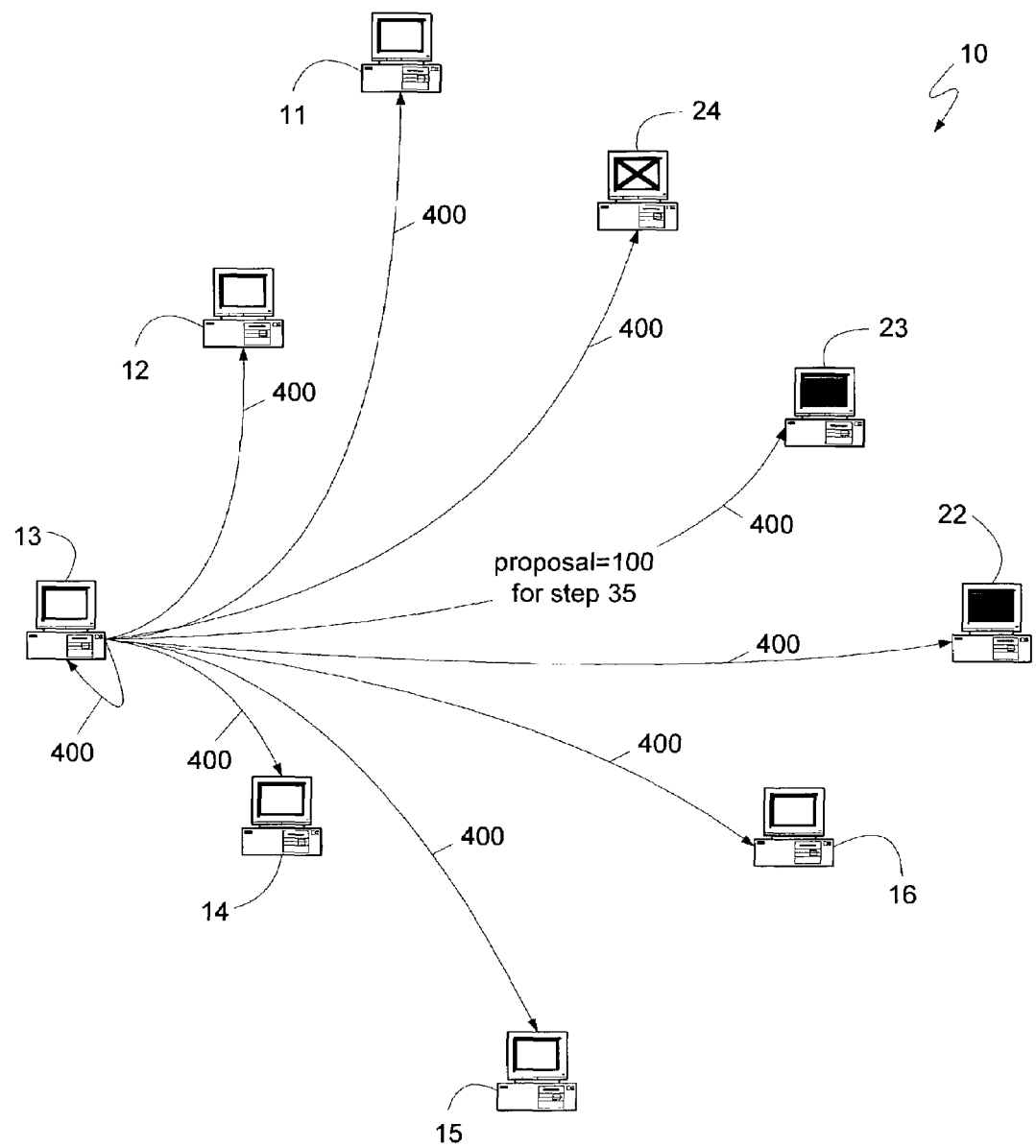
FIGS. 5*a-g* generally illustrate the operation of a multi-step consensus algorithm contemplated by the present invention.

Turning to FIG. 5a, the exemplary distributed computing system 10 of FIG. 1 is shown, having two malicious devices 22 and 23 and further failed, but non-malicious, device 24, which can have failed due to a software failure, hardware failure, a network connectivity failure, or the like. In the mechanisms described above, by requiring a majority to vote for a proposal, synchronization was ensured because any two collections of devices, each of which constituted a majority, shared at least one device. That shared device's last vote information could be used to ensure that the devices from one collection, constituting a majority, voted for the same proposal as did the devices from the other collection, also constituting a majority, as provided for by the mechanisms described above. In FIG. 5a, however, one majority could consist of devices 11, 12, 13, 22 and 23 and another majority could consist of devices 14, 15, 16, 22 and 23. As can be seen, the two majorities share only malicious devices 22 and 23, and it cannot be guaranteed that they would provide, to a leader, the necessary last vote information to allow the leader to learn of the function already selected by the first majority. Therefore, a modified Paxos algorithm can require a quorum to be a sufficiently large grouping of devices such that any two quorums share at least one non-malicious device. In the exemplary system shown in FIG. 5a, because of malicious devices 22 and 23, a quorum can be any grouping of at least six devices. In such a manner, any two groupings having at least a quorum of devices share at least three devices. Because at most two of those three shared devices can be malicious, at least one will not, allowing the algorithm to function properly.

As above, device 13, acting as a leader can send message 400, as shown in FIG. 5a, suggesting the use of proposal number 100 to propose a function for what device 13 perceives to be the current step 35. To simplify the explanation, in the current example device 13 is assumed to know all of the executed functions through step 34. However, if such were not the case, the procedures described above could be used to update all of the devices, including the leader 13. Also for simplicity, message 400 is assigned one number in the figure to indicate that the information contained within the message is the same for all of the messages 400 shown. However, the device 13 would provide authenticators to each of the individual devices for each message, as described above, which would technically render each message unique.

Because device 13 can act as both a leader and a device, for purposes of voting for a proposal, device 13 is illustrated in FIG. 5a as sending itself a message 400. As before, such communication would generally be performed internally but it could be transmitted through network hardware and return to the device if so desired. Alternatively, device 13 could act as only a leader, much as it could for all of the previously described algorithms. In such a case, however, device 13 could not be used to satisfy the requirements for the number of devices, described further below, needed to ensure proper operation of the system.

Figure 5B:
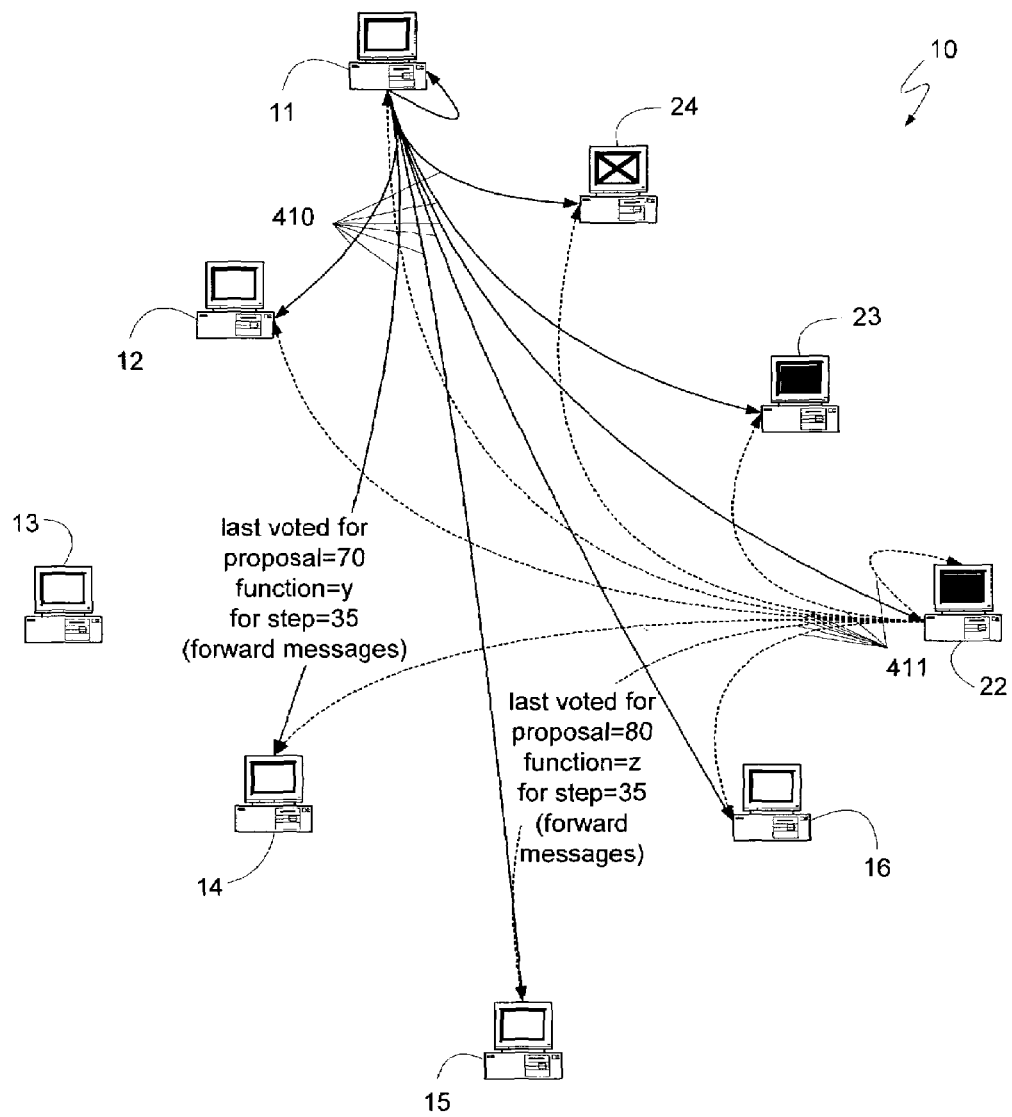

Turning to FIG. 5b, in response to message 400, each of the devices 11-16 and 22-23 can send a message containing the largest numbered proposal less than 100 that each device has voted for in all steps greater than, or equal to, step 35. Alternatively, to provide greater efficiency, the devices 11-16 and 22-23 can send messages containing the largest numbered proposal they have voted for, whether or not it is less than 100, such that the leader 13 can efficiently learn of higher numbered proposals that have been voted for, and can adjust the suggestion for its proposal number accordingly, as described above. However, in order to provide the leader 13 with the ability to prove to other devices that it did, in fact, receive responses from devices 11-16 and 22-23, each device can send its response to every other device in the quorum, including itself. As will be explained, this can provide the leader 13 with the ability to prove to the devices of whichever quorum the leader selects to submit its proposals to that the proposals are proper in light of the messages sent by devices 11-16 and 22-23, and that devices 11-16 and 22-23, in fact, sent those messages and that leader 13 did not maliciously manufacture them.

For simplicity, FIG. 5b illustrates only two such messages sent among the devices 11-16 and 22-23, namely message 410, sent by device 11 and message 411 sent by device 22. As above, while a single number is used to indicate that the information contained in all of the messages indicators shown, each of the messages would contain authenticators to their destination devices, rendering each message unique. Furthermore, because messages such as messages 410 and 411 will be forwarded by each of the devices 11-16 and 22-23, back to the leader 13, messages 410 and 411 additionally may have authenticators to allow them to be forwarded, as described above. The messages, such as messages 410 and 411, are one of the two additional messages that can be added to allow the modified Paxos algorithm to accommodate malicious devices.

Because each device will send a message, such as messages 410 or 411, devices 11-16 and 22-23 will each receive seven such messages from other devices and one additional message from themselves for a total of eight messages. While device 13 is the leader, it can still perform these steps because it may not be possible for device 13, acting as a leader, to determine that device 13, acting as a voting device, is not malicious. By transmitting its last vote information as shown in FIG. 5b, the device 13 can provide the leader 13 with the necessary proofs, as will be described. Furthermore, device 24 is shown as suffering a non-malicious failure and will likely not send any messages.

To provide a mechanism by which the last vote messages, such as messages 410 and 411, can be verified to be proper, each device transmitting such a message can forward a series of messages from other devices proving that it was proper for that device to vote as indicated in messages, such as messages 410 and 411. For example, message 410 indicates that device 11 last voted for proposal number 70, which proposed the execution of function "y". However, each of the devices 12-16 and 22-24 will receive only one message, namely message 410, indicating that device 11 voted for proposal 70. With only the singular messages, devices 12-16 and 22-24 cannot tell whether device 11 actually did, in fact, vote for proposal 70, and if it did, whether it was proper for it to do so. To address these issues, device 11 can, as part of message 410, include messages from a quorum of devices indicating that proposal 70 proposes a safe value and that it is proper to vote for the proposal. The quorum of messages can be obtained from the second of the two added messages that enable the modified Paxos algorithm to accommodate malicious devices, which can be sent as part of the voting process, to be described in further detail below. As will be also be described in detail below, a quorum of messages from a quorum of devices can be forwarded once and still prove safety to the device to which it is forwarded. Therefore, device 11 can, as part of message 410, include the quorum of messages, proving to the devices receiving message 410 that it was proper for device 11 to vote for proposal 70.

Figure 5C:
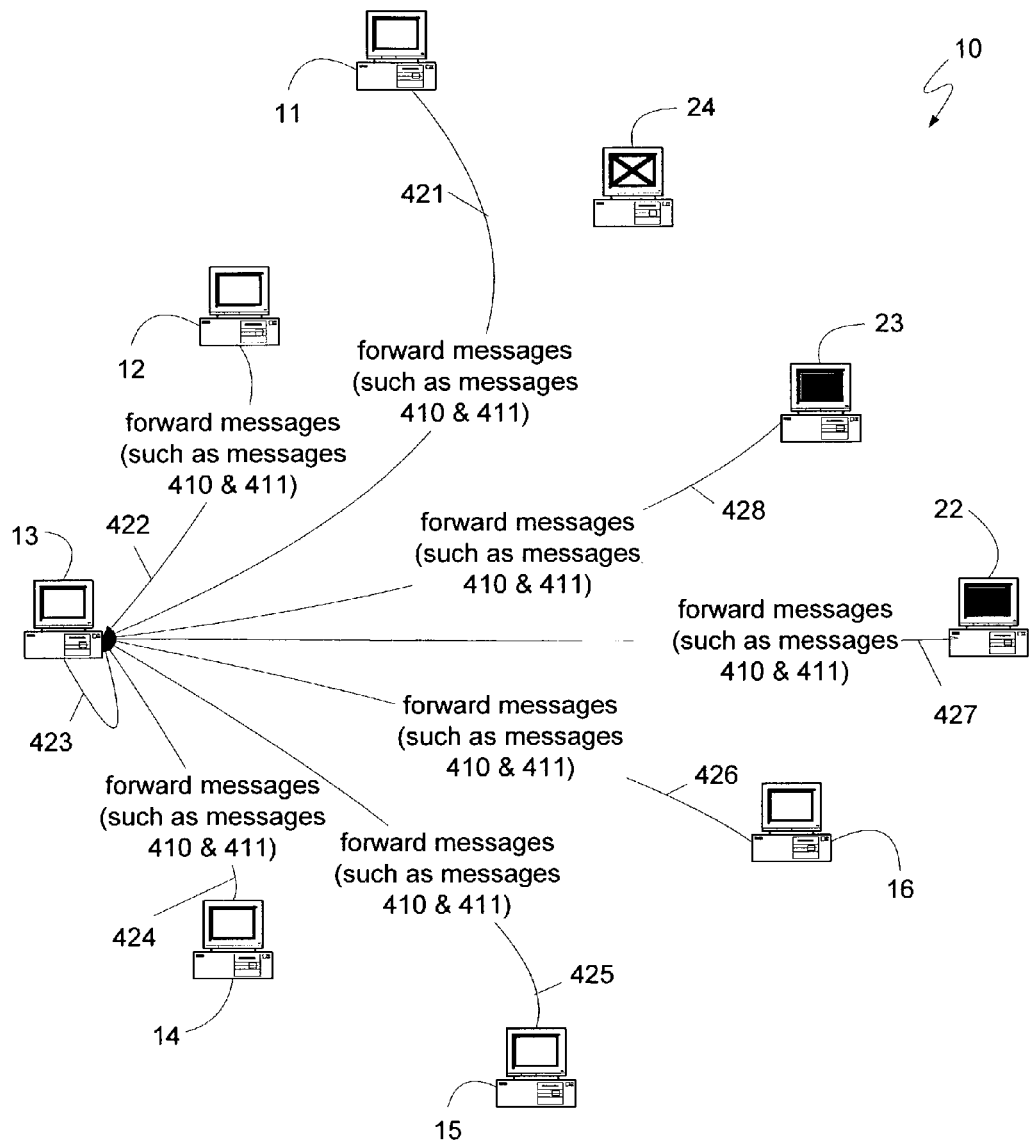

Turning to FIG. 5c, each of the devices 11-16 and 22-23 can send properly authenticated messages 421-428, respectively to the leader 13 which are a forwarding of the previously exchanged last vote messages, such as messages 410 and 411. In the manner explained above, each forwarded message can also be properly authenticated for each device, as the leader can ultimately forward the messages back to the devices as proof of the propriety of the leader's selection for a function to be voted upon. With messages 421-428, the leader 13 receives eight copies of a last vote message, such as message 410 and 411, sent by each device 11-16 and 22-23. However, because there are at most two malicious devices in the exemplary system 10, there are at least six properly forwarded copies of the last vote messages. The six proper copies of message 410 received by leader 13 constitute a quorum of messages that the leader 13 can forward onto another device. Of those six messages, at most two can be from a malicious device. Therefore, when forwarding the six messages onto another device, the leader 13 can expect that the other device will receive at least four properly authenticated copies of message 410. Of the four properly authenticated copies received by the other device, at most two can be from malicious devices, leaving at least two messages from properly functioning devices. Because the device received too many copies of message 411 for it to be a false message sent by malicious devices, the device can determine that message 411 was sent; namely that device 11 did, in fact, send message 610 to leader 13 and that leader 13 did not maliciously fabricate its existence. As a result, the forwarded copies of messages, such as messages 410 and 411, can be used by the leader to prove to other devices that messages, such as messages 410 and 411 were, in fact, sent. The leader can also prove, based on the contents of the messages, such as messages 410 and 411, that the proposal the leader is submitting, is proper.

To avoid the effects of last vote messages from malicious devices, such as message 411, the leader can select not to forward last vote messages which were deemed improper by devices 11-16 and 22-23 when sending messages 421-428. For example, as explained above, when transmitting last vote message 411, the malicious device 22 can forward a quorum of messages indicating that its vote was proper. Upon receipt of message 411, each of the devices can check the forwarded quorum of messages. A malicious device can forward a quorum of messages that does not support its last vote message, or it can seek to modify the quorum of messages, causing the message authentication of the messages in that quorum to become improper. In either case, each device can determine that the last vote information contained in message 411 is not proper and can so indicate to the leader 13 when forwarding message 411 in messages 421-428. If message 411 is not proper, device 22 need not be considered as part of the quorum needed to identify safe proposals to the leader 13. Instead, because the remaining, properly functioning devices can constitute a quorum, the leader 13 can use that quorum of messages as the quorum of messages that provides the leader 13 with the proof of propriety that the leader 13 can forward onto the devices when requesting a vote, as will be shown below. Of course, it is possible that message 411, even though it is from a malicious device, is proper, in which case the devices can so indicate, and device 22 can be part of the quorum. As can be seen, the proper operation of the algorithm is assured by providing a sufficient number of messages that at least one must be proper. Therefore, the proper operation of the algorithm does not require identifying the malicious devices.

As an alternative, devices 11-16 and 22-23 can independently, based on messages such as messages 410 and 411, determine a set of functions which are safe for the leader to propose. As above, each of the last vote messages, such as messages 410 and 411 can be sent with a forwarded quorum of messages proving the propriety of the vote. As a result, the devices can determine the set of safe functions only from those last vote messages that are proper. The devices can then transmit that set as messages 421-428. Leader 13 will, therefore, receive eight messages, 421-428, containing a set of safe functions that can be proposed. While at most two of those messages can be from malicious devices, at least six are from properly functioning devices and should, therefore, identify the same set of functions. Such a quorum of messages can be forwarded onto the devices when the leader selects a proposal to submit for voting, as proof of the propriety of the proposal. Of the at least six messages, at most two can be from malicious devices and improperly authenticated for the devices onto which they are being forwarded. Nevertheless, leader 13 can rely that at least 4 properly authenticated messages, each identifying the same set of functions as safe to propose will be received by the devices onto which the leader forwards the messages. Because only at most two of those messages could be false, the devices can determine that the safe set identified in the forwarded messages is correct, and can rely on it to determine that the function proposed by the leader is proper.

Figure 5D:
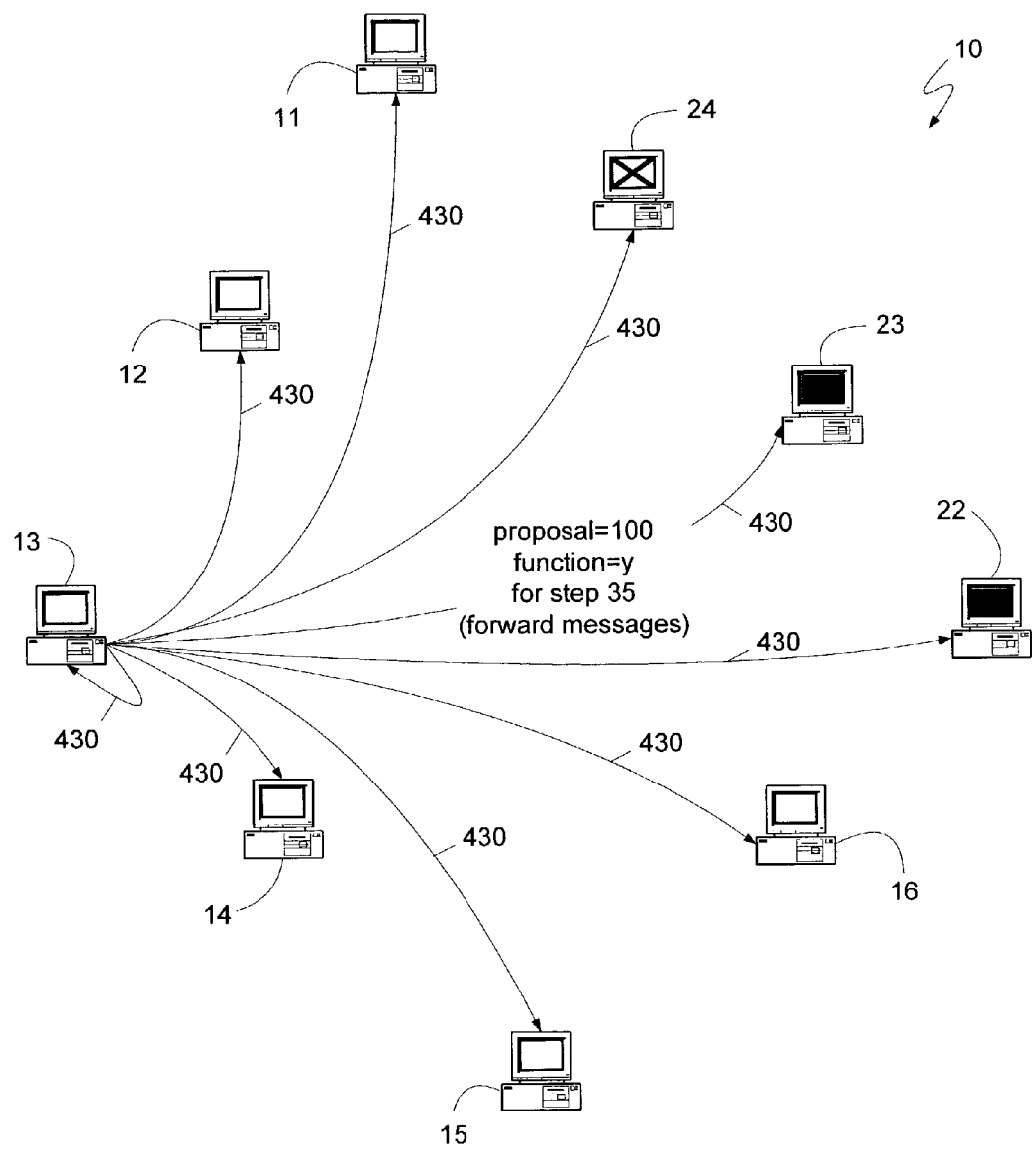

Turning to FIG. 5d, based on the information provided in messages 421-428, the leader 13 can determine that function "y" should be proposed and put to a vote, and it can solicit votes with message 430, as shown. As explained above, the proposed function z indicated in message 411 may be maliciously incorrect, and as a result, message 411 and device 22 may not be considered part of the quorum relied on by leader 13 to identify safe functions to propose. Consequently, the leader 13 can propose function "y", even though, device 22 claims to have voted for a proposal with a larger proposal number. Also, as before, each of the message indicators drawn in FIG. 5d is labeled 430, though each message will be unique because of the device-specific authenticators used for each message. In addition to the proposed function "y", the leader 13 can seek to prove that function "y" is indeed the proper function for which to solicit a vote by forwarding messages 421-428 to the devices 11-16 and 22-24.

Figure 5E:
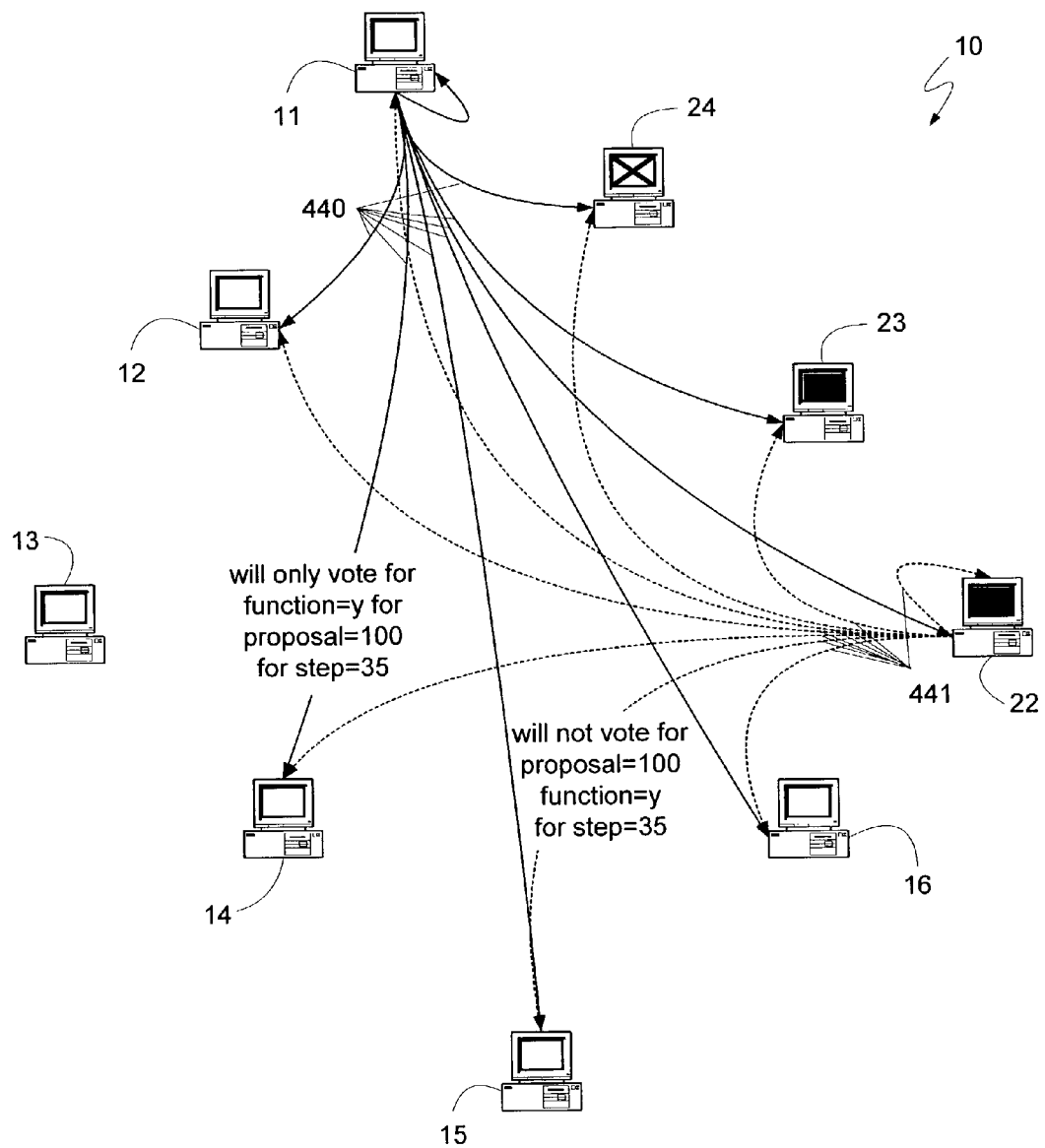

Once the devices 11-16 and 22-24 have received the message 430 and have verified the propriety of the proposal contained therein, each of the devices 11-16 and 22-24 can determine whether to vote for the proposal. As explained in detail, above, if a device has not responded to another suggested proposal with a larger proposal number, it can vote for the current proposal, numbered 100 as shown in FIG. 5d. Prior to voting for the proposal, however, each of the devices can send a message to each of the other devices announcing that they will only vote for proposal 100 if it proposes function "y". As mentioned above, this is the second of the two added messages that allow the Paxos algorithm to take advantage of the above described mechanisms for accommodating a distributed computing system with malicious devices. Turning to FIG. 5e, the messages informing other devices of another device's intentions are illustrated, though for simplicity, only messages from devices 11 and 22 are illustrated. As with the messages indicating the largest numbered proposal for which a device had voted, such as messages 410 and 411 described above, each of the messages transmitting a device's intention to vote, such as messages 440 and 441, can be authenticated for their destination devices and for forwarding onto the other devices in the system 10. As a result, while a single number is used to denote the messages from a single device in FIG. 5e, each message will be unique due to the authenticators.

As a result of the intention messages, such as messages 440 and 441, each device will receive eight messages, much in the same manner as described above with the last vote messages. In a similar manner, if any six of those eight message are properly authenticated and each indicating that the sending device will only vote for the execution of function "y" for proposal number 100, the device can verify that the leader 13 sent a proposal numbered 100, proposing function "y" to all of the devices. If such a check was not performed, a malicious leader could send different proposals, each with the same number but each proposing a different function to different devices. Each device could then vote for the proposal, and a new leader would not be determine which function to suggest, as the devices would each provide a different function for the same proposal number. However, when a device receives a quorum of properly authenticated messages indicating that the sending devices will only vote for one function for a given proposal number, it can ensure that the same function was sent to each of the devices.

Figure 5F:
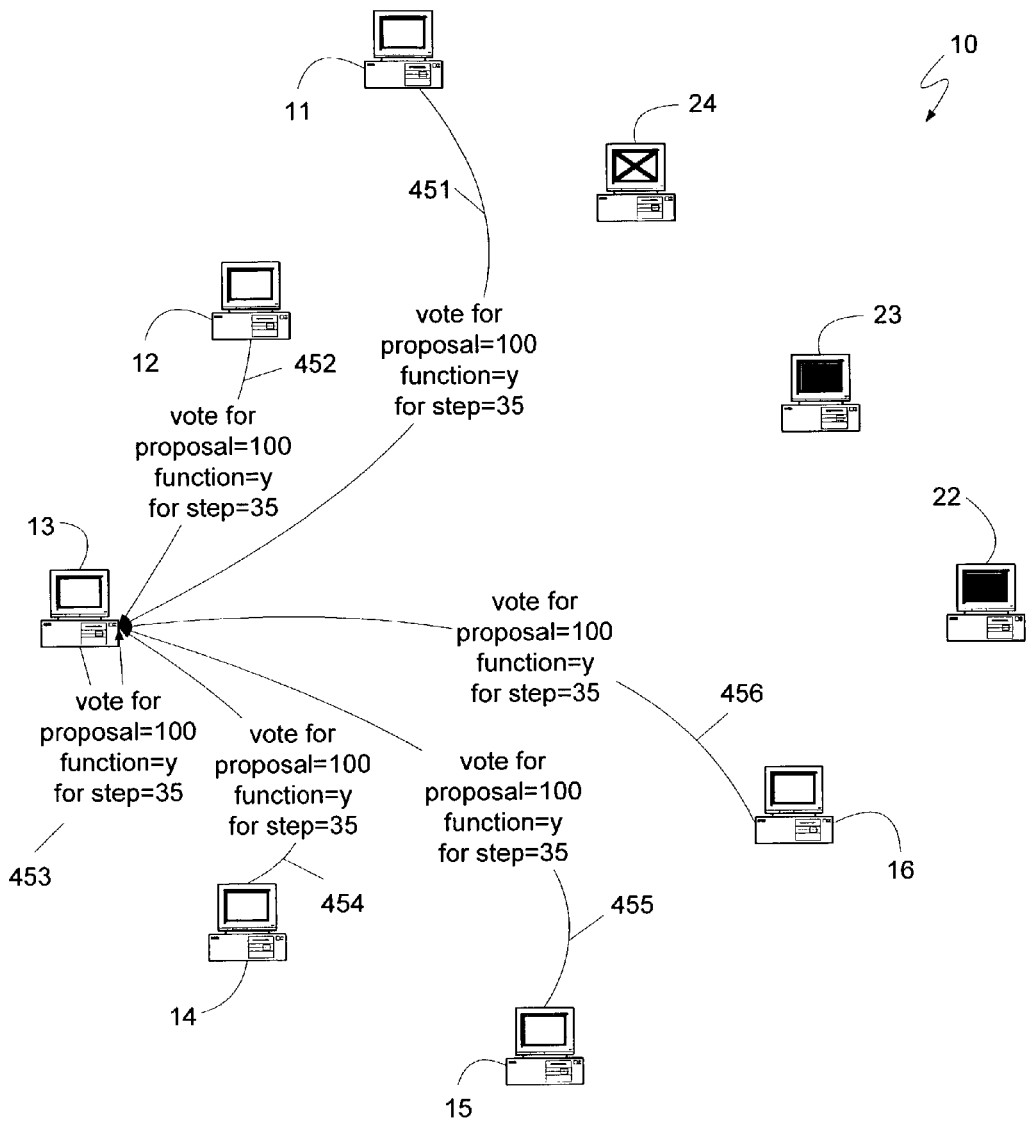

Turning to FIG. 5f, the devices 11-16 can send properly authenticated messages 450-454 indicating that they are voting for the execution of function "y". If at least six devices vote for the proposal, the leader 13 can determine that the proposal has been accepted because six devices are sufficient to ensure that the system may not select a different function for step 35. For example, in the illustrative system 10, given any six devices that could have voted for proposal 100 proposing function "y", such as devices 13-16 and 22-23, a quorum of devices cannot exist within the system 10 that does not include at least three of the devices 13-16 and 22-23. As such, even if two of the three devices are malicious, such as devices 22 and 23 and change their votes, at least one non-malicious device, such as one of devices 13-16, remains and, based on the operation of the algorithms described above, that one non-malicious device can ensure that the system 10 does not vote for any function for step 35 other than function "y". As a result, the function "y" is considered accepted when six devices, or a quorum, vote for it.

Figure 5G:
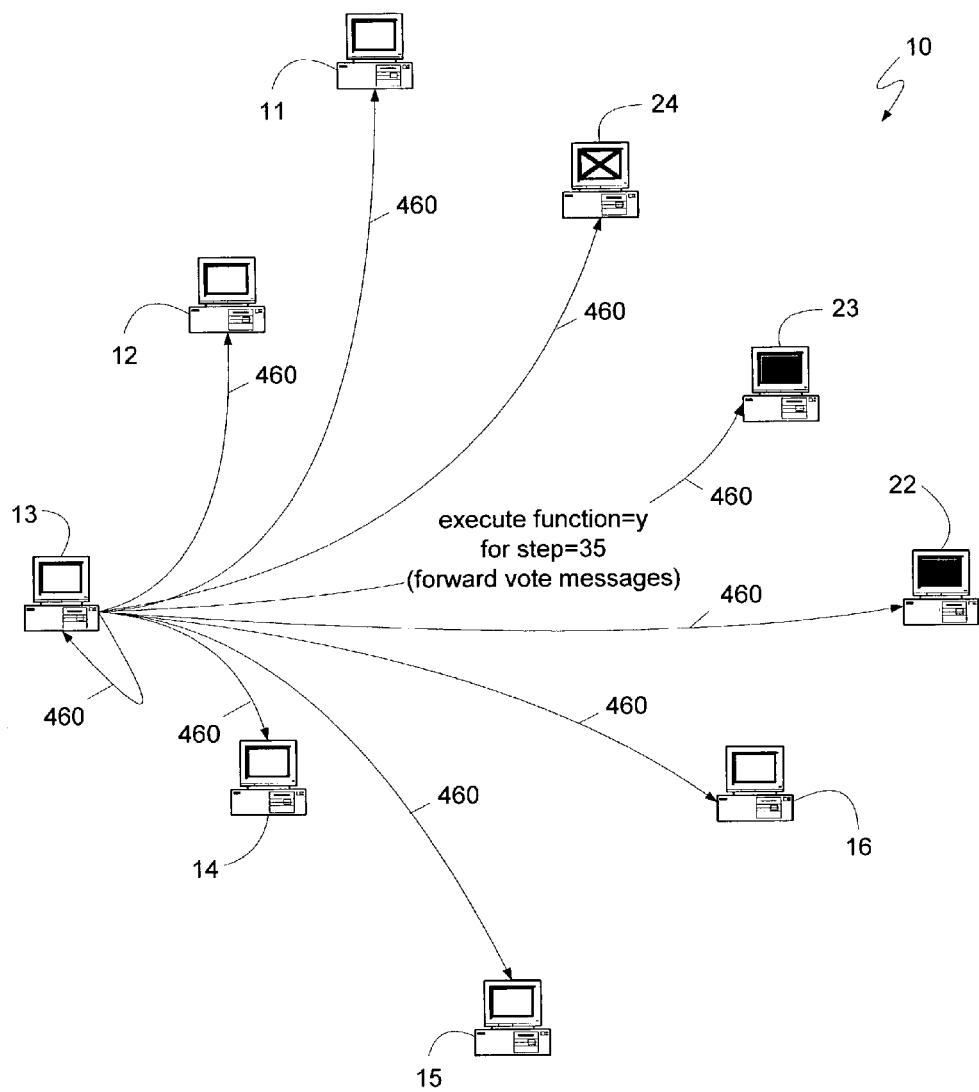

Turning to FIG. 5g, the leader 13 can send properly authenticated message 460 to the devices 11-16 and 22-24 requesting that they execute function "y". In addition, the leader 13 can forward the collection of messages 451-456 as proof that the proposal was accepted and that function "y" should be executed. For greater efficiency, the leader 13 can send, with message 460, a proposal to be voted on for the next step, avoiding the need to send two messages. Alternatively, as described above, the leader need not wait for the collection of message 451-456 before proposing a proposal for the next step. In such a manner, the system can operate asynchronously and achieve even greater efficiencies. As also described above, the system 10 can be more efficient by retaining a leader for more than one step, because the current leader is already aware of all of the largest numbered proposals voted on by the devices for all steps greater than the current one. As a result, the current leader can directly submit proposals for voting, avoiding the first phase of the algorithm. The system can then select and execute a series of functions for a series of steps, with each function for each step selected by performing only the second phase of the algorithm, as illustrated by FIGS. 5d-5g.

Returning to FIG. 5b, each of the messages, such as messages 410 and 411, transmitted by the devices 11-16 and 22-24 provide information regarding the largest numbered proposal less than the current proposal number for which the devices voted. As a proof that the vote for a proposal was appropriate, the devices can retain intention messages, such as messages 440 and 441 illustrated in FIG. 5e. By forwarding along this quorum of messages when sending the vote information messages, such as messages 410 and 411, the devices can verify that the vote cast was appropriate, in the manner described above.

As the above examples indicate, a quorum can be any set of devices that has a sufficient number of devices such that any two quorums share at least one non-malicious, properly functioning device. Consequently, a quorum can be defined as any set of devices that contains a majority of the non-malicious devices in a system, because any two sets of the majority of non-malicious devices will share at least one non-malicious device. If the system has N devices, and M of them are malicious, the non-malicious devices number N−M. Of these devices, any collection of more than (N−M)/2 of them is a majority of the non-malicious devices. Therefore, any set of more than (N−M)/2+M devices from the system contains a majority of the non-malicious devices in the system, even if every malicious device is included in the set. A quorum is, therefore, any set having more than (N−M)/2+M devices or, more simply, more than (N+M)/2 devices.

Furthermore, to provide progress, such that functions are selected and executed, the members of the quorum may not be devices that are experiencing malicious or non-malicious failures. Defining the variable F to indicate the number of devices experiencing either malicious or non-malicious failures, the number of properly functioning devices in the system can be found by subtracting F from the total number of the devices in the system, N. Therefore, if a quorum can have only properly functioning devices in order for the system to progress, (N+M)/2 can be no larger than the total number of properly functioning devices in the system, namely: N−F. Multiplying both sides by 2, and consolidating the variable N on the same side of the equation yields the result that N is greater than 2F+M. Therefore, using the above modified Paxos algorithm, a system having more devices than twice the maximum number of failed devices plus the maximum number of malicious devices will be able to continue to function properly and provide progress.

Reduced-Message-Delay Modified Paxos Algorithm

As can be seen from the above description, a distributed computing system having as few as twice the number of failed and malicious devices plus the number of malicious devices, can operate properly with malicious and failed devices. However, even if a leader device has already performed the first phase of the algorithm, the distributed computing system can still introduce at least three message delays between the receipt of a client request and the execution of that request by the system. For example, returning to FIG. 5d, a leader device that has already learned of previously voted for proposals, and has advanced the system to a step at which none of the devices has previously voted for any proposal, can propose the execution of a function requested by the client as soon as it receives the client's request. Therefore, in message 430, for example, the proposed function "y" can be in response to a client's request. The transmission of message 430 can add one message delay. Another message delay can be introduced by messages, such as messages 440 and 441, illustrated in FIG. 5e, and a third message delay can be introduced by messages 451-456 shown in FIG. 5f. Thus, by the time the leader 13 receives the vote information from the devices, at which point the leader can determine that the function was selected and can inform the client, at least three message delays have been introduced.

Figure 6A:
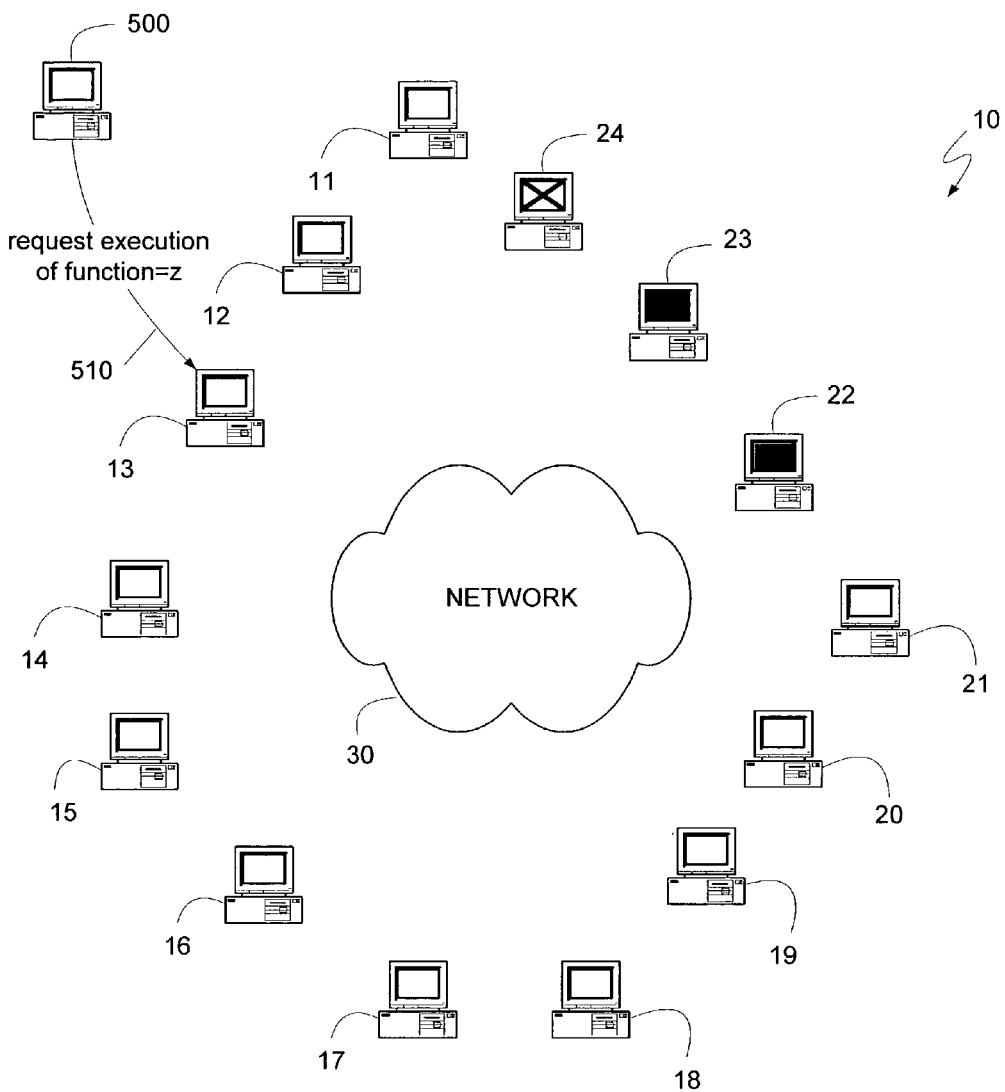

The present invention allows for the reduction of the intermediate message delays between the receipt of a client request and the transmission of a response by the distributed computing system, in part through the use of a larger quorum of devices and a distributed computing system having more than 2F+M devices. Turning to FIG. 6a, the distributed computing system 10 of FIG. 1 is shown with a client 500 transmitting a request 510, that the system execute function "z", to a device 13 that is a member of the system 10. The system 10 comprises fourteen devices, including two devices, 22 and 23, suffering malicious failures, and device 24, suffering a non-malicious failure.

Throughout the description that follows devices 22 and 23 will be referred to, and illustrated as, particular malicious devices. The present invention, however, does not require, or otherwise depend on, an identification of which devices are malicious. As will be shown, malicious devices can be accounted for in the aggregate by the mechanisms described below. Therefore, the identification of particular devices and messages as malicious is strictly for clarity in describing the invention. Additionally, throughout the description that follows, device 24 will be referred to, and illustrated as, a particular device. However, the present invention contemplates the proper operation of the distributed computing system regardless of which particular device fails, so long as there are no more than a given number of failed devices at any moment. Thus, while device 24 remains in a failed state throughout the description that follows, the functions described are equally applicable to a system in which device 24 resume functioning properly at any time. Additionally, if device 24 recovers from its failure, the present invention contemplates algorithms which can accommodate a non-malicious failure by any other device at any time after device 24 has resumed functioning properly.

Figure 6B:
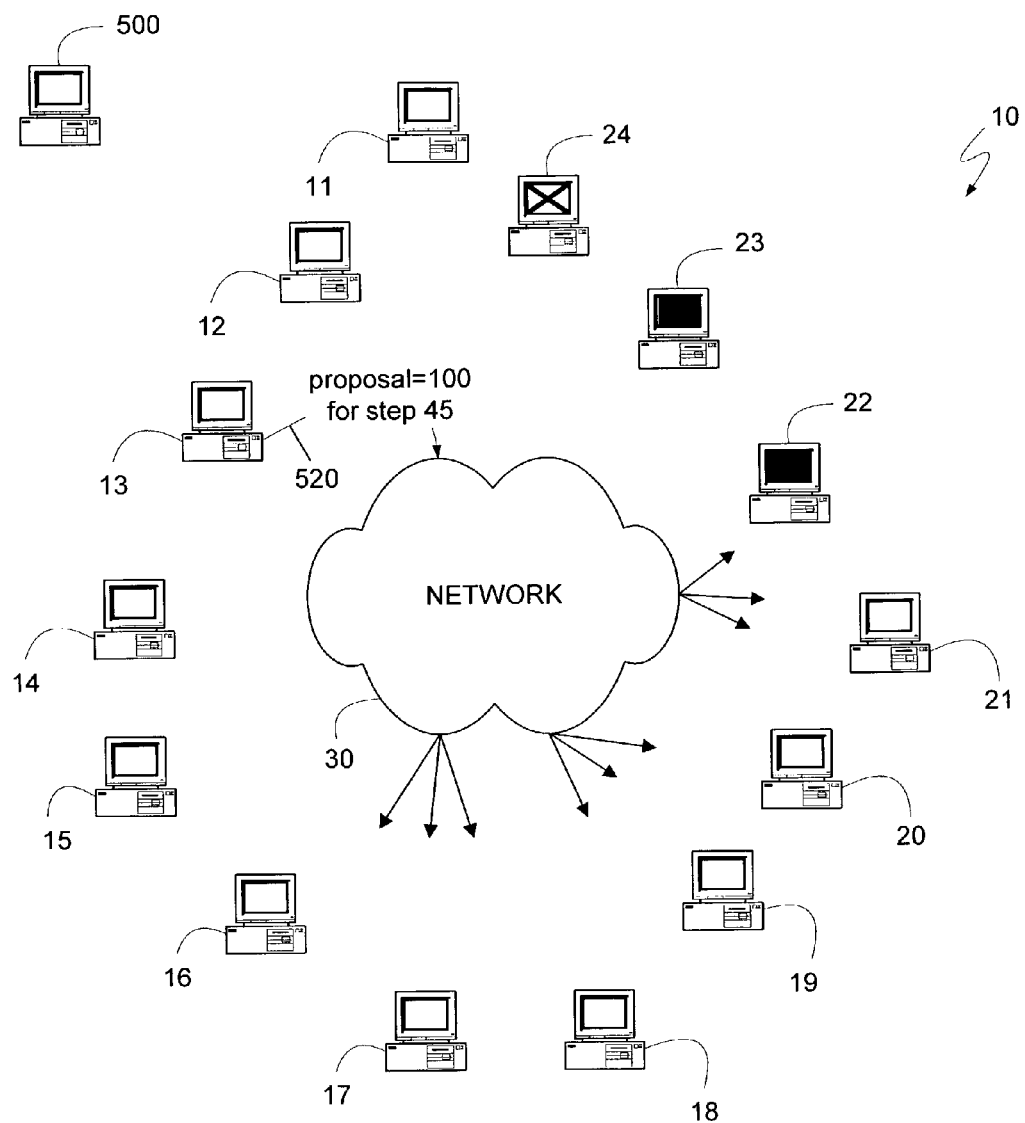

Turning to FIG. 6b, device 13, upon receipt of client request 510, can act as a leader device and, in a manner similar to that described above, suggest a proposal number for all steps greater than or equal to the step perceived by device 13 as the current step. Thus, in the exemplary illustration shown in FIG. 6b, device 13 can send a message 520 suggesting proposal number 100 for all steps greater than or equal to step 45. For simplicity, FIG. 6b only illustrates message 520 as being transmitted to the network 30, though, as before, message 520 can be transmitted to each device in the system 10, or to a quorum of devices selected by the leader 13. For purposes of the present example, the quorum of devices selected by the leader 13 can be all of the devices 11-24 in the system 10.

Figure 6C:
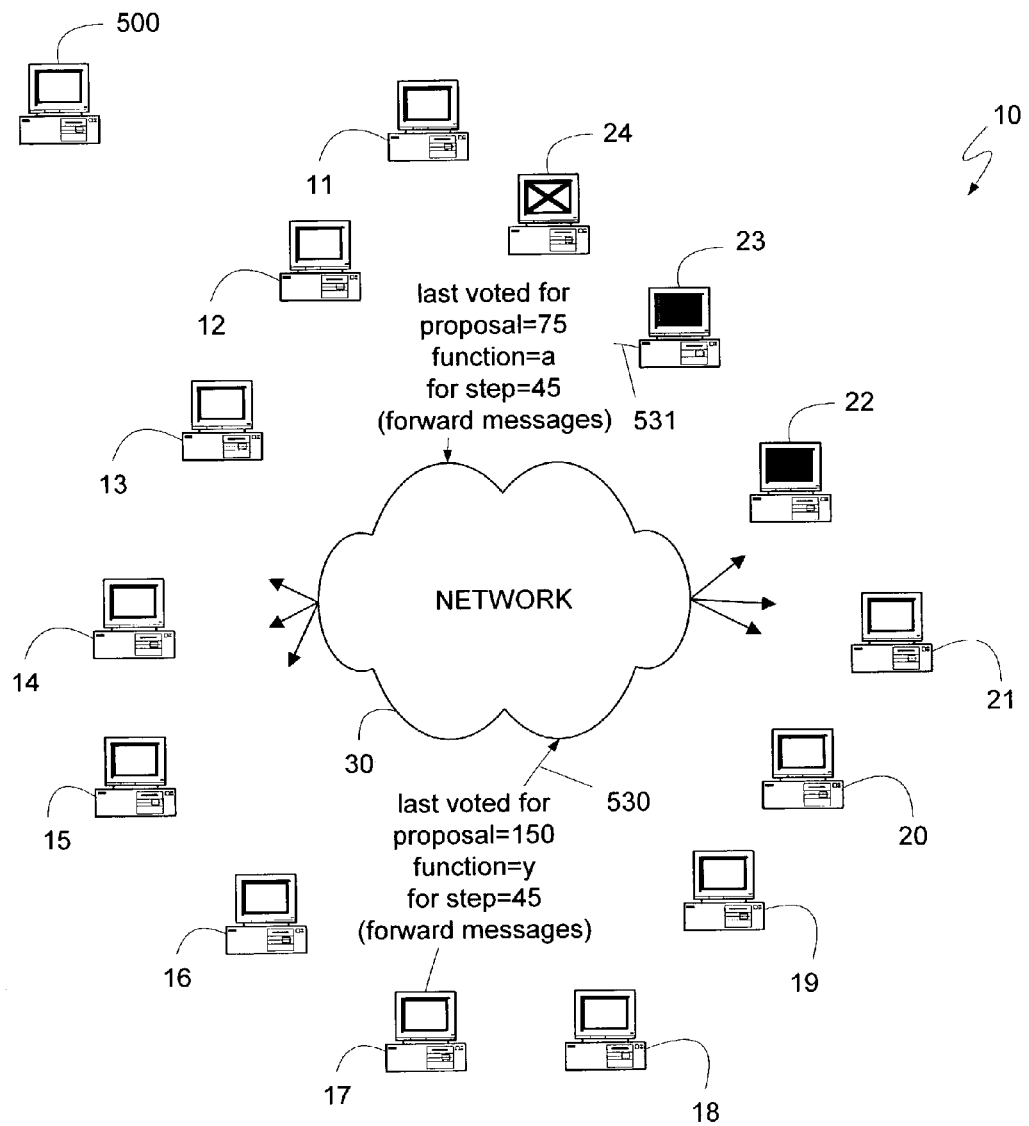

Upon receipt of message 520, each of the devices receiving the message can send all of the other recipient devices a message indicating the largest numbered proposal less than 100 for which each particular device voted for all steps greater than or equal to step 45, in a manner similar to that described above. Alternatively, as described above, to avoid the need for device 13 to resend suggestion message 520, the recipient devices can respond with the largest numbered proposal, even if it is greater than the proposal number suggested by the leader, for which that device voted for all steps greater than or equal to step 45. FIG. 6c illustrates the transmission of exemplary prior vote messages 530 and 531 from devices 17 and 23, respectively, in response to the leader's message 520. As before, for simplicity, only two messages are shown, though each of the recipient devices can transmit prior vote messages such as messages 530 and 531. Exemplary messages 530 and 531 contain information indicating that, for example, device 17 has previously not cast any votes for any steps greater than or equal to step 45, with the exception of step 45, for which it voted for a proposal numbered 150, proposing the execution of function "y" and that device 23 has only voted for proposal 75, proposing function "a" for step 45. To maintain proper operation in the presence of malicious devices, each message, such as messages 530 and 531, can also forward a collection of messages, in a manner similar to that described above, to prove to the recipient devices that the vote which the devices claim they previously cast was proper.

As represented by FIG. 6c, each of the devices 11-24 can receive seventeen prior vote messages, such as messages 530 and 531, receiving one prior vote message from each of the devices 11-23. Because device 24 is illustrated as having a non-malicious failure, it may not provide any prior vote messages unless its failure is corrected. Based on the received prior vote messages, each of the devices 11-23 can independently determine a safe proposal for each step of the system 10, in a manner to be described below, and can transmit that safe proposal to the leader 13. In addition, the devices 11-23 can each forward the received prior vote messages, such as messages 530 and 531, to the leader 13 as proof of the correctness of the determined safe proposal values. Alternatively, each of the devices 11-23 can simply forward along to leader 13 the seventeen received messages, such as messages 530 and 531, and allow the leader to determine a safe proposal on which to request a vote.

Figure 6D:
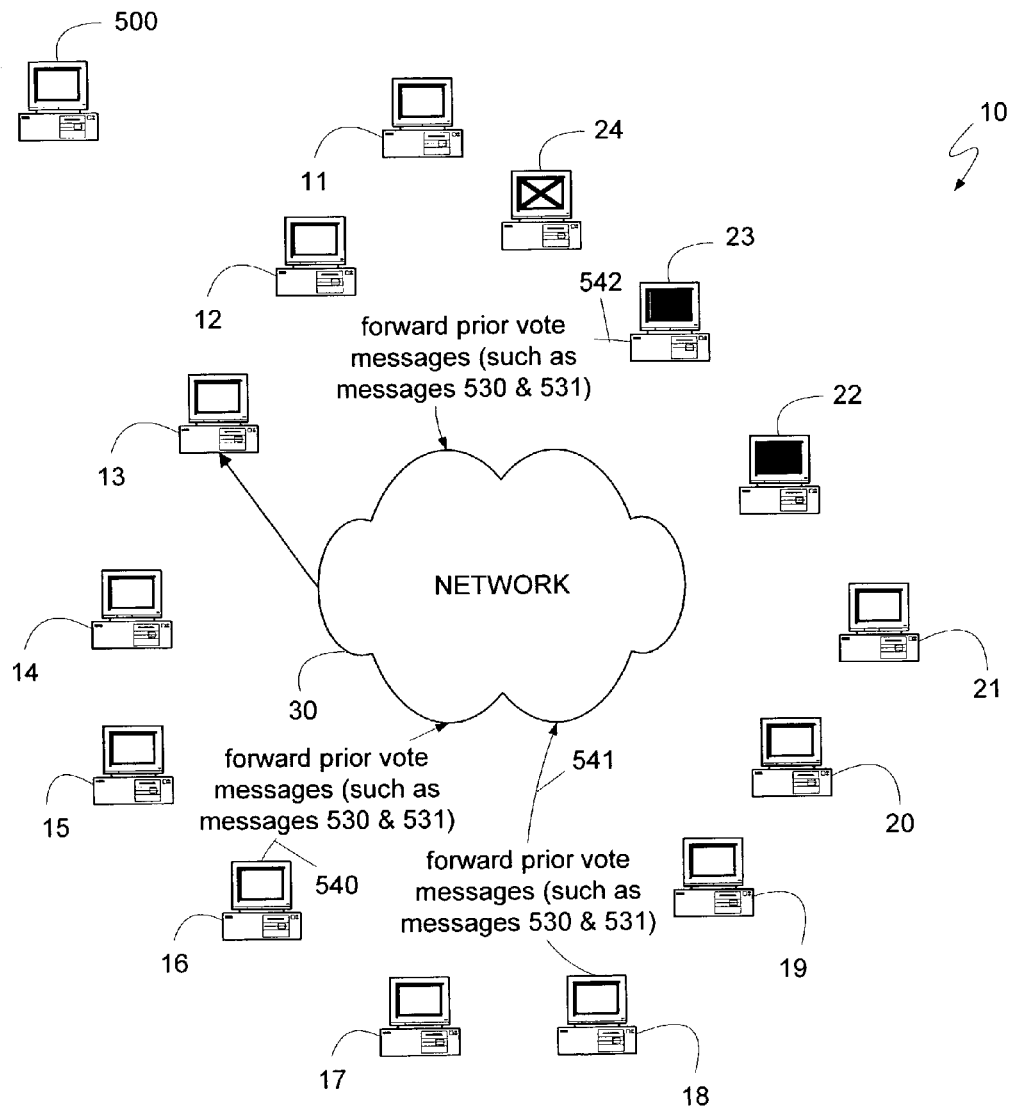

Turning to FIG. 6d, exemplary messages 540-542 are shown, forwarding the prior vote messages, such as messages 530 and 531, from devices 16, 18, and 23, respectively. As described above, each of the devices 11-23 of the quorum can forward the prior vote messages they received to the leader 13, though, for simplicity, FIG. 6d only illustrates three such messages. In addition, if the devices individually determined safe proposals, based on the prior vote messages, such as messages 530 and 531, those values could be transmitted as part of the messages sent to the leader 13, such as messages 540-542.

As previously described, in a system having M malicious devices, a collection of at least M+1 messages, each indicating the same information, can prove to a device that the indicated information is proper; and a collection of at least 2M+1 such messages can both prove the propriety of the information to the receiving device and provide the device with a sufficient number of messages to forward once and convince another device of the propriety of the information. Therefore, if each of the devices 11-23 had transmitted its prior vote message to the leader 13 directly, the leader would only receive one message asserting specific information, namely the last vote of the transmitting device, and would not be able to confirm the propriety of the information. However, the transmission of messages, such as messages 540-542 can both provide the leader with a proof of the devices' prior vote messages, such as messages 530 and 531, and can provide the leader with a sufficient number of messages to prove that the prior vote messages were, in fact, sent by the devices 11-23.

When determining a value to submit for a vote to a quorum of devices, improper votes, such as those by malicious devices, can be detected through the use of the information contained in the forwarded messages proving the propriety of the prior vote and their message authenticators in the manner described above. Consequently, such improper votes can be disregarded, both by the individual devices 11-23 or by the leader 13.

Figure 6E:
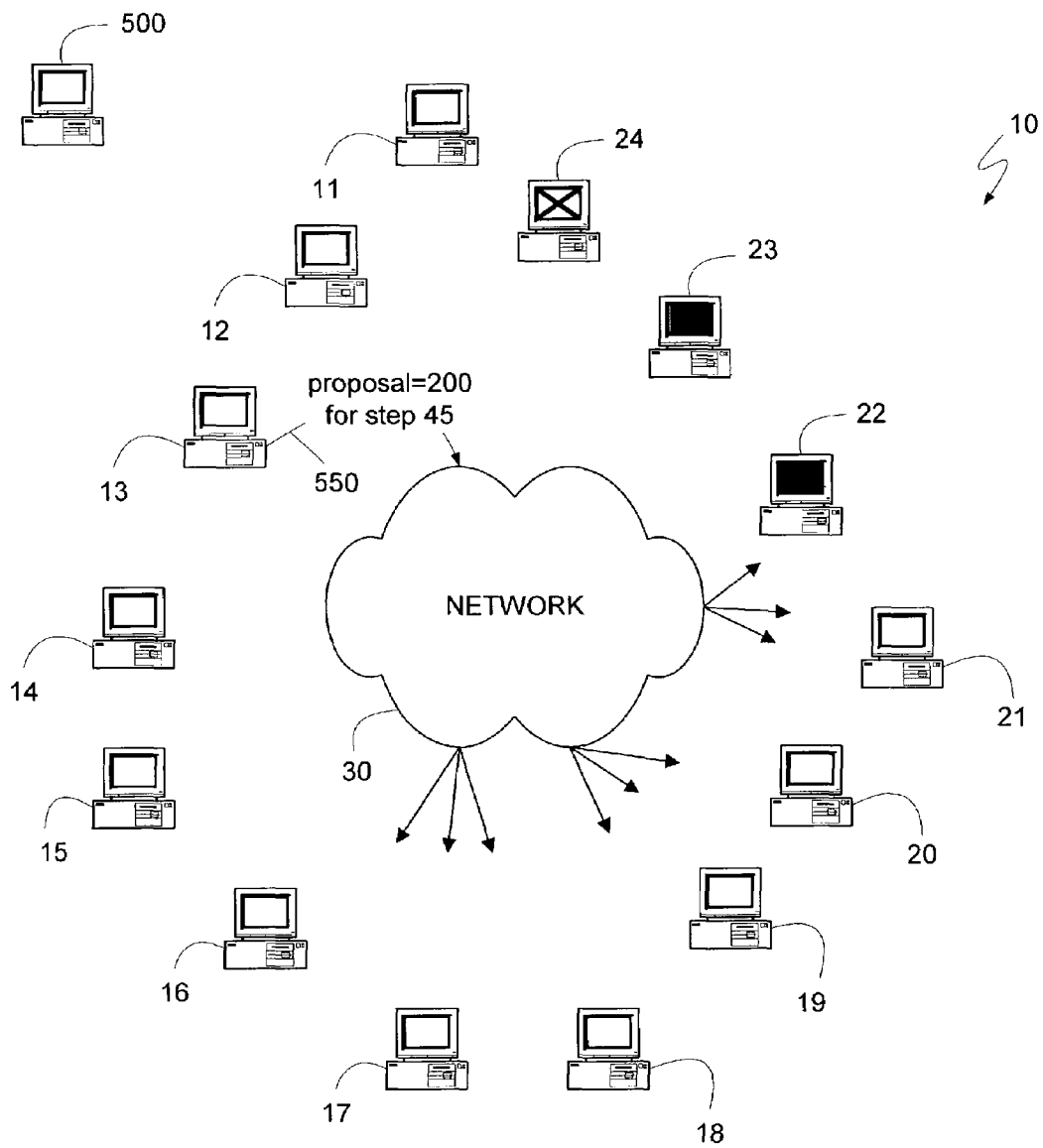
Figure 6F:
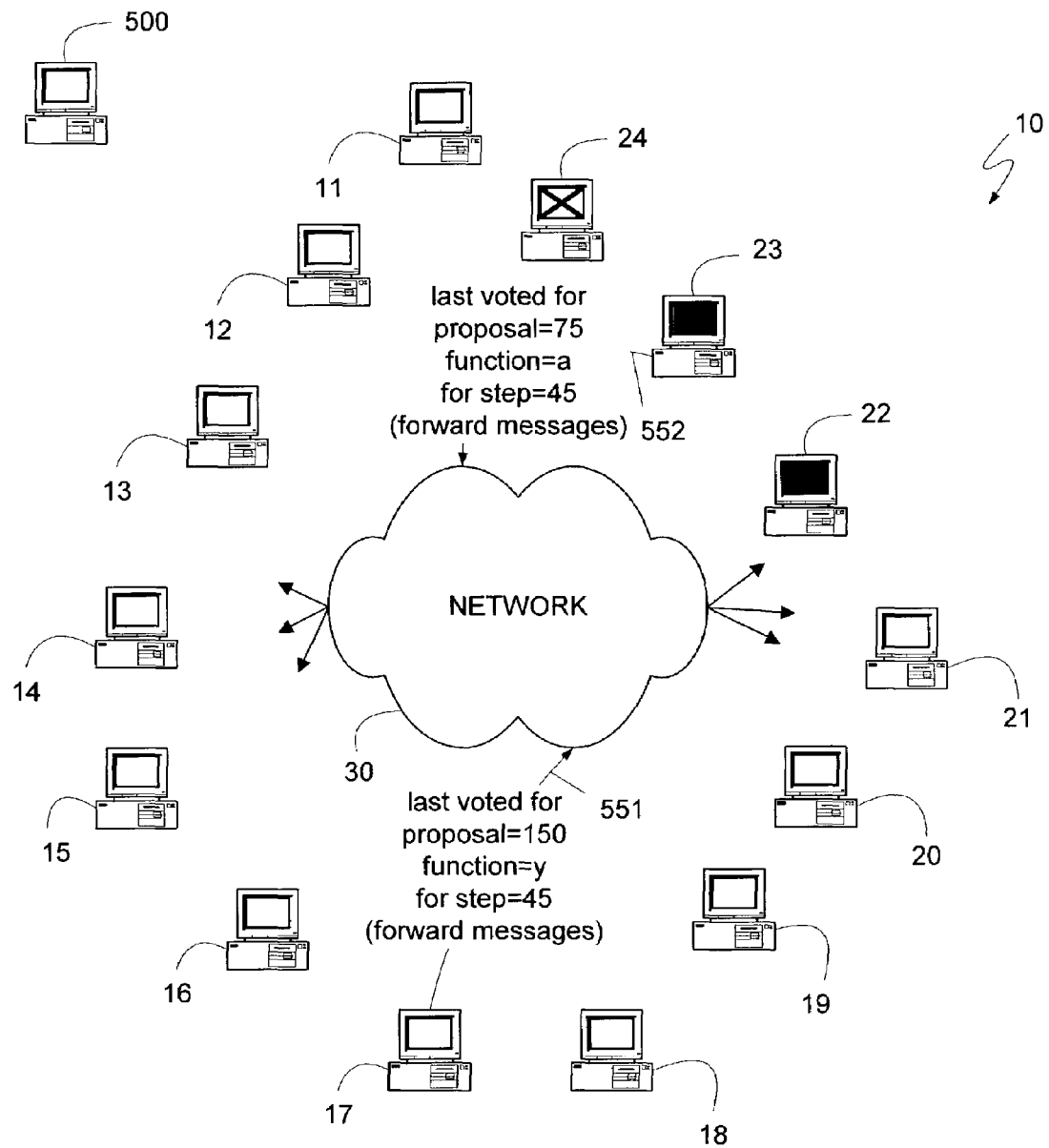
Figure 6G:
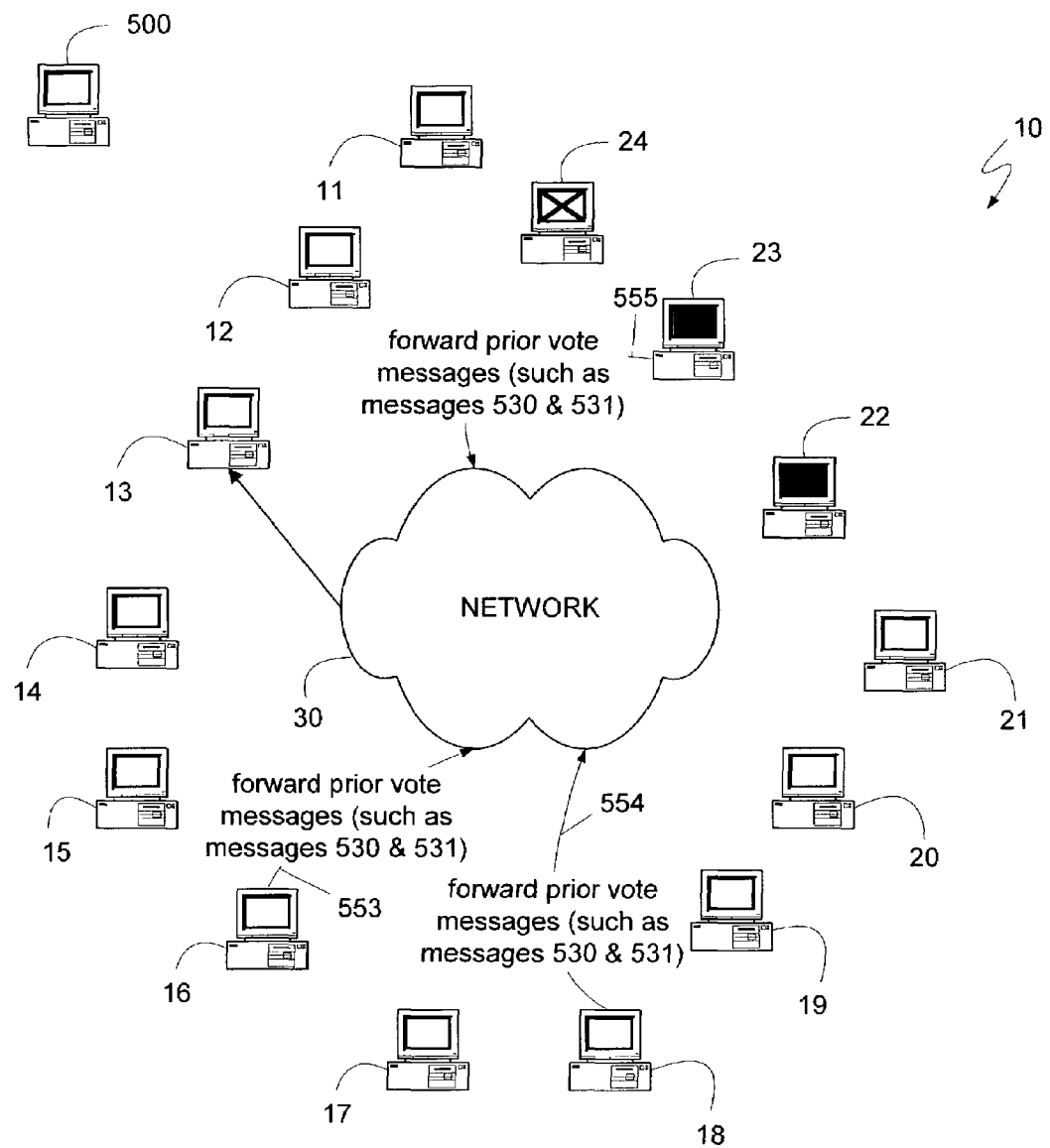

Once the leader 13 receives the forwarded messages, such as messages 540-542, the leader can learn that at least one device has voted for a proposal having a larger number than that suggested by the leader 13 in message 520, and consequently the leader can first send another suggested proposal number, larger than any previously voted for proposal the leader is aware of. Therefore, because, in the exemplary system shown in FIG. 6c, device 17 had previously voted for a proposal numbered 150, the leader can select a larger proposal number and send another suggestion message to the devices 11-24. Turning to FIG. 6e, the leader suggests the use of proposal number 200 for step 45. In a manner analogous to that described above in connection with FIGS. 6c and 6d, FIGS. 6f and 6g illustrate the transmission of prior vote messages and the forwarding of those messages to the leader 13.

Having established that no device has voted for any proposals numbered greater than 200 for any steps larger than or equal to step 45, the leader 13 can select a safe proposal value to submit to the quorum of devices for a vote. As described above, if any device, that is part of the quorum selected by the leader 13, has previously voted for a proposal for the step for which the leader 13 is attempting to select a function to execute, then a safe value can be the function proposed by the proposal having the largest proposal number of any proposal previously voted for by any device in the quorum. If no device in the quorum has previously voted for any proposal for the step for which the leader 13 is attempting to select a function to execute, then all values are safe. Additionally, as will be described further below, if more than one value was proposed having the same proposal number, a safe value can be the value previously voted for by a majority of the quorum or, if no such majority exists, then any of the values previously voted for are safe.

Figure 6H:
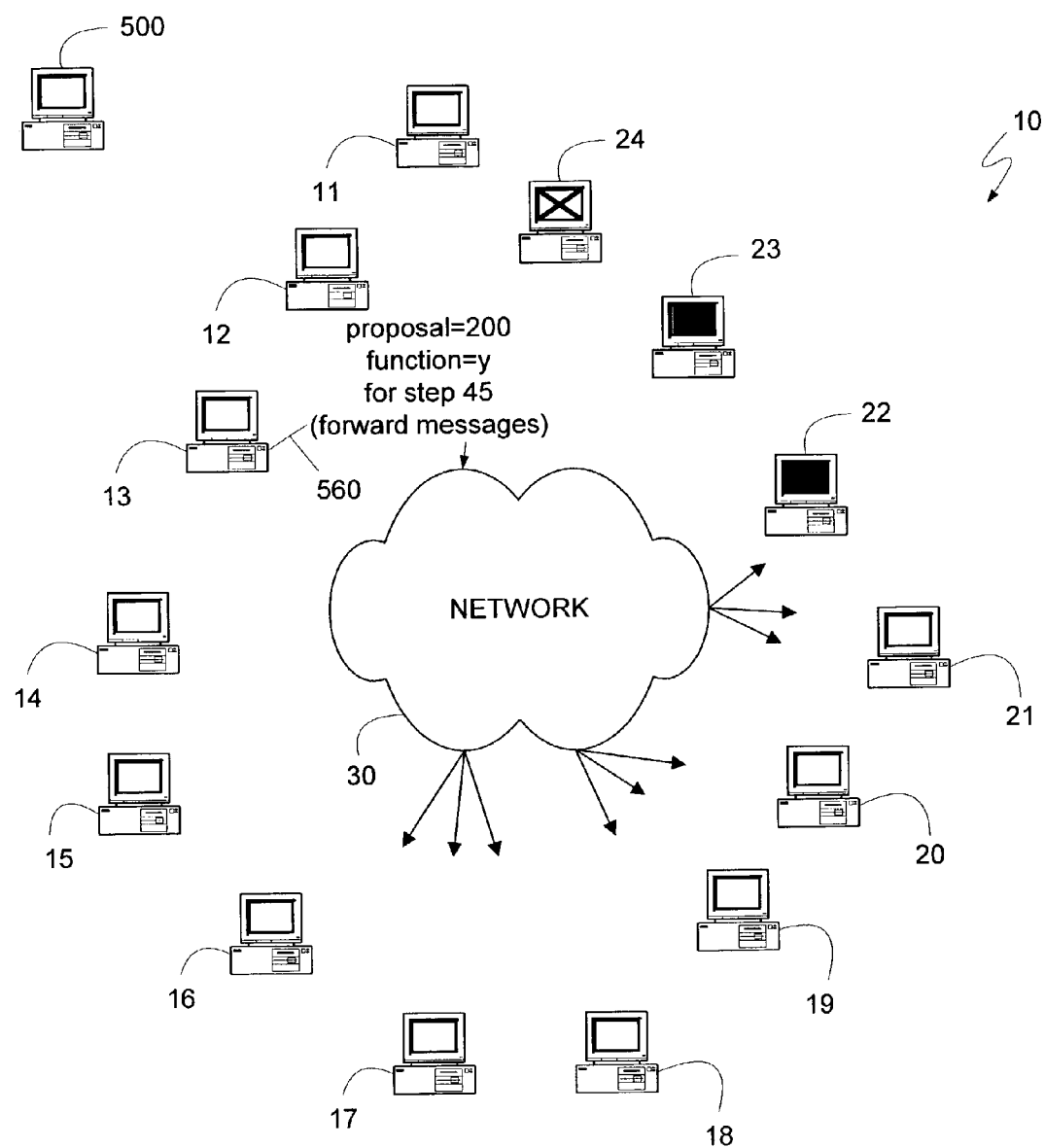

Turning to FIG. 6h, once the leader has determined an appropriate function to propose, the leader can propose the function, using an appropriate proposal number. For example, as shown in FIG. 6h, message 560 can be a proposal from the leader 13, using the same proposal number of 200 previously suggested in message 550, and proposing that the system 10 execute the function "y" for step 45. The leader 13 could have determined that function "y" was a safe value to propose due to messages such as message 551 from device 17. In addition to the proposed function, the leader can forward to the devices to which the leader is submitting the proposal, as part of message 560, the messages it received from devices 11-23, such as messages 553-555 shown in FIG. 6d, as a proof that the proposed value is safe.

Because the illustrative distributed computing system 10 contains only two malicious devices, and because, as shown in FIG. 6d, the leader 13 received as many as seventeen messages, such as messages 553-555, the leader has a collection of more than 2M+1 messages that the leader can forward with message 560. Furthermore, because at least fifteen of those messages contain the same prior vote messages, such as messages 551 and 552, the leader has a sufficiently large collection of messages, as explained above, to prove to the devices receiving message 560 that the prior vote messages were, in fact, sent. However, because of the large size of the quorum, and the relatively small number of malicious devices, the leader 13 has more than 3M+1 messages, each containing the same information, namely the prior vote messages. Therefore, even if all M of the malicious devices provided improper authentication of their messages, the leader 13 can know that at least 2M+1 properly authenticated messages will be received by the devices 11-24 to which the leader forwards the 3M+1 messages. This provides the devices 11-24 both a proof of that the prior vote messages were, in fact, sent, and a proof that each of the devices 11-23 can forward to another device and provide the proof to the forwarded device.

Figure 6I:
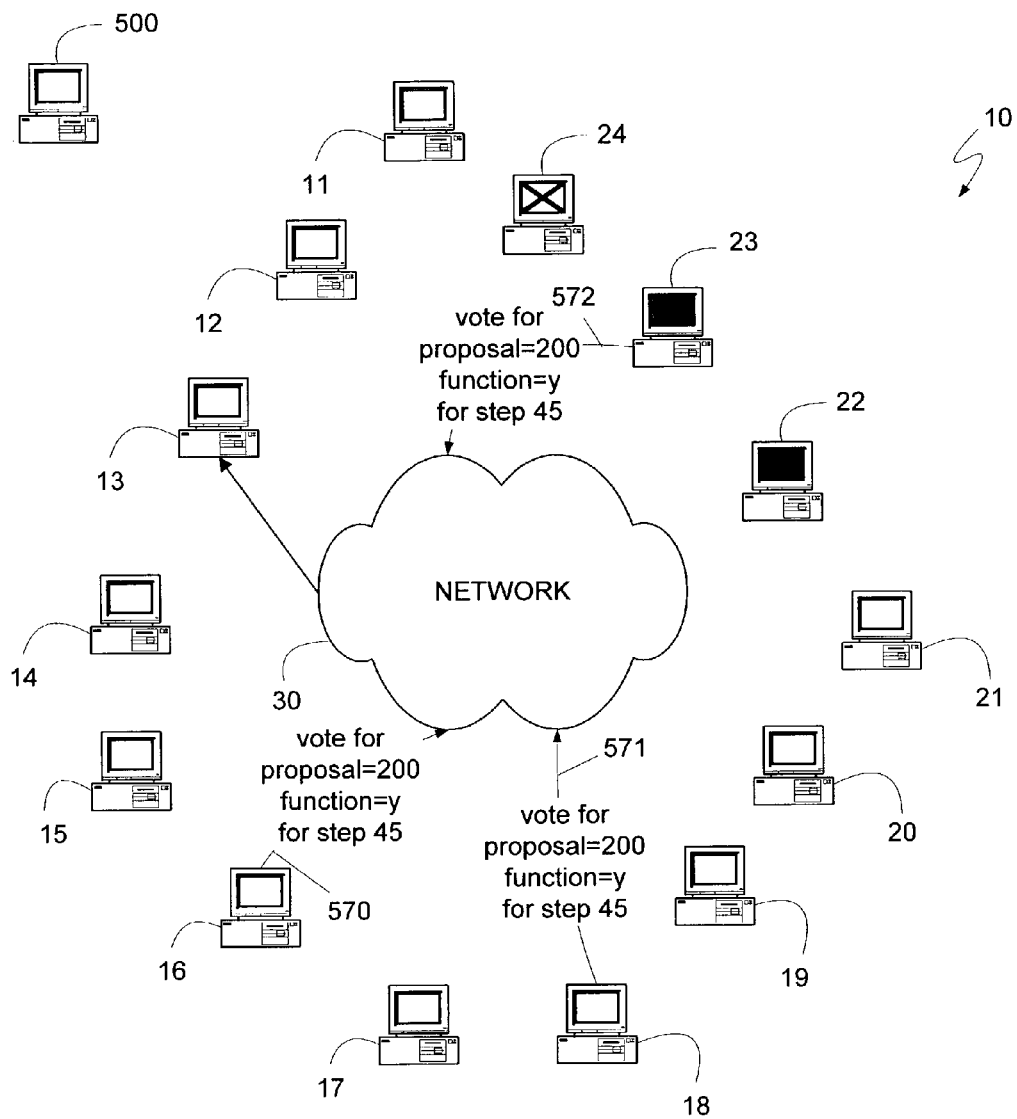

Upon receipt of a proposal, each of the recipient devices 11-23 can determine if the proposal is safe, based on the messages forwarded by the leader, and, if the proposal is safe and that device has not subsequently responded to another suggestion for a different proposal number, the device can vote for the proposal. Therefore, turning to FIG. 6i, if each of the devices 11-23 determine that they can vote for the proposal, each can transmit a vote message, such as messages 570-572, to the leader 13. As before, only three messages 570-572 are shown, though each of the devices can send a vote message. If the leader 13 receives at least a quorum of messages indicating a vote for the proposal, the leader can determine that the function proposed was selected and can instruct the devices 11-24 of the system 10 to execute the selected function. Therefore, even though malicious device 23 voted for a function "q", as long as at least a quorum of devices voted for the proposed function "y", the leader can determine that the proposed function was selected.

Furthermore, each of the devices can store the at least 2M+1 properly authenticated messages, such as messages 553-555, that were forwarded by the leader, and forward them when transmitting a prior vote message, such as messages 551 and 552 to another quorum of devices. Because each device will have at least 2M+1 properly authenticated messages, it will be able to prove to the devices receiving the prior vote message that its vote was for a safe proposal and was, therefore, proper.

Figure 6J:
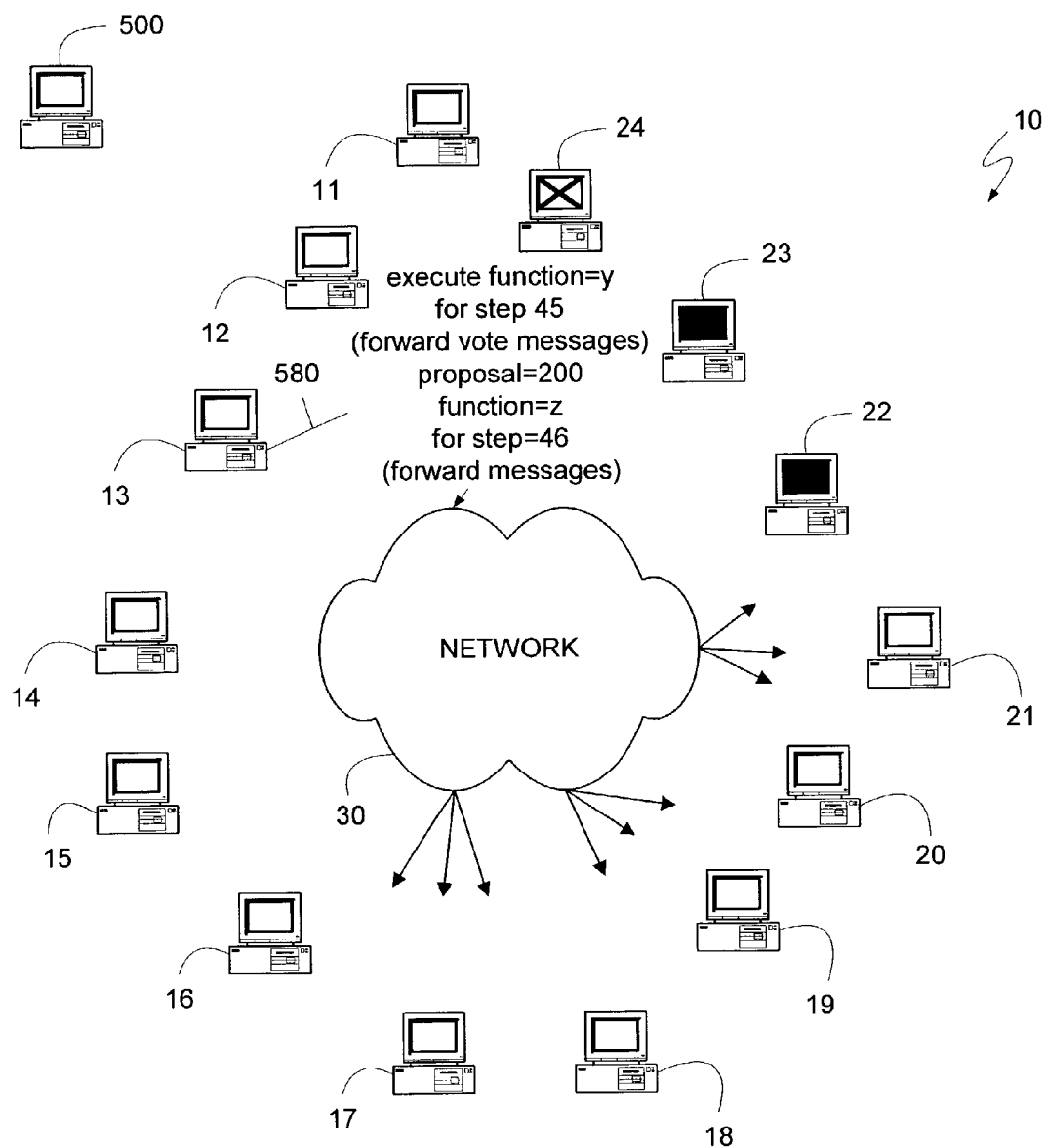

Turning to FIG. 6j, the leader 13 can send a message 580 containing an instruction to the devices 11-24 of the system 10 to execute function "y" for step 45 if the leader receives a quorum of messages indicating a vote for the proposal that proposed function "y". In addition, for added efficiency, the leader can simultaneously propose a function for the next step of the system, such as the client requested function "z" for step 46. The leader could have determined that function "z" was a safe function because none of the prior vote messages indicated that any device had previously voted for a proposal for step 46. Alternatively, the leader need not wait for the devices to respond with their votes for the proposal for step 45 before proposing a proposal for step 46. Thus, the leader could have proposed function "z" for step 46 immediately after the transmission of message 560.

Figure 6K:
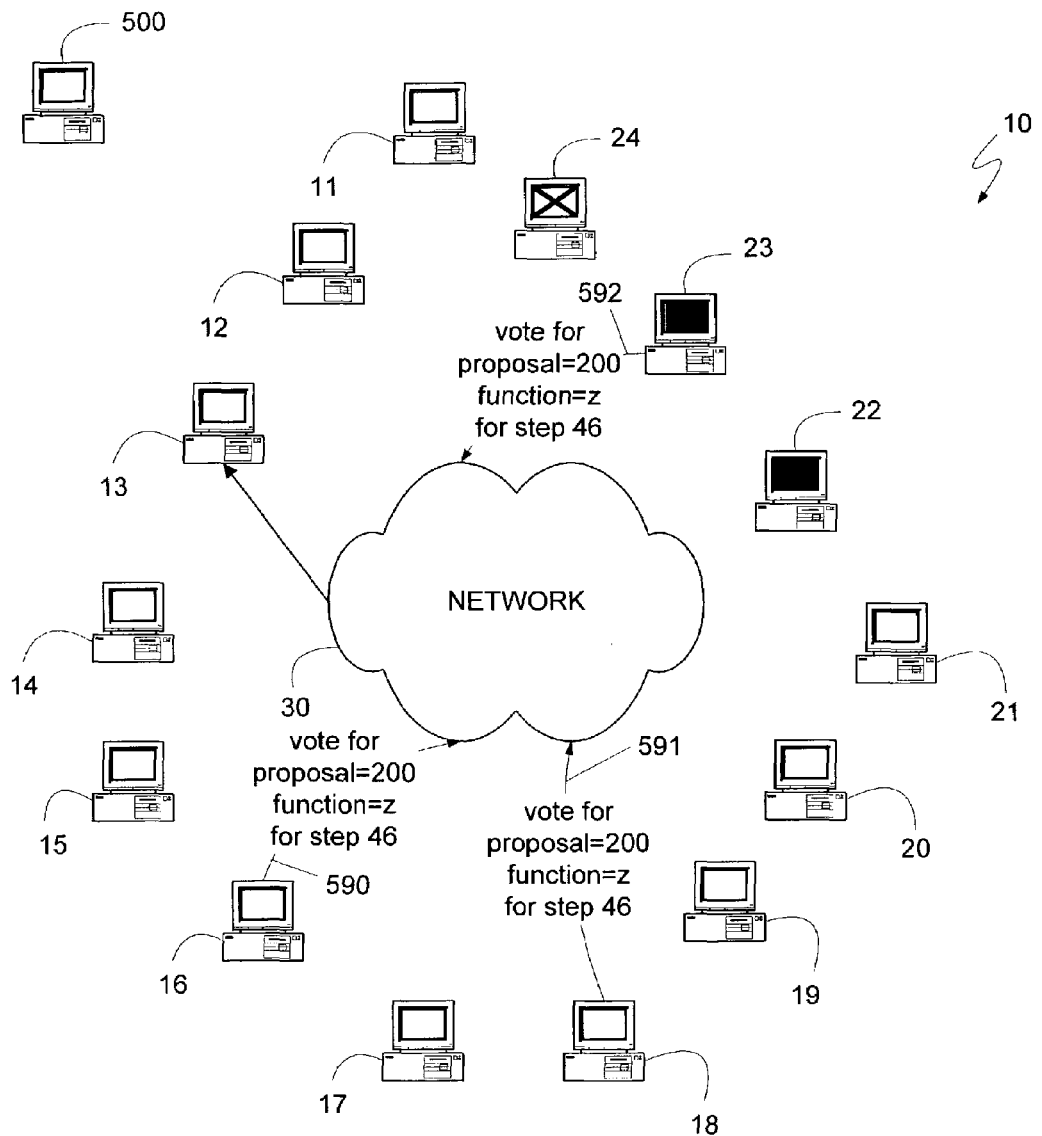
Figure 6I:
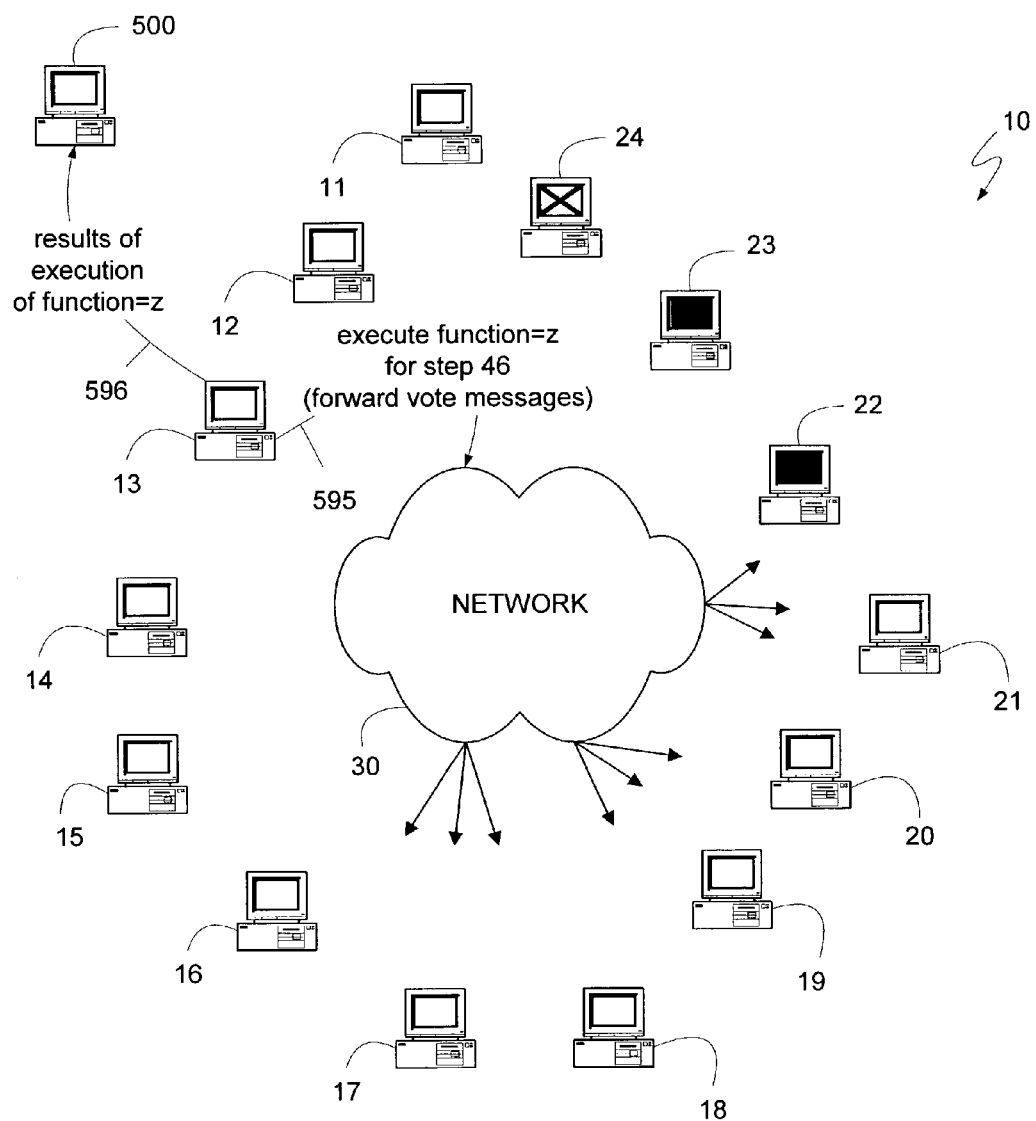

Because message 550 acted as a suggestion to use proposal number 200 for all steps greater than or equal to step 45, the leader 13 can propose the client requested function "z" for step 46 without suggesting a new proposal number. However, as before, the leader can forward, to the receiving devices, the prior vote messages proving the safety of the proposal. In the present example, such messages would indicate that no device had previously voted for any proposal for step 46, meaning that all proposals are safe. Therefore, in response to the proposal contained in message 580, each of the devices 11-23 can determine whether the proposal is safe, using the forwarded messages, and can determine if they have subsequently responded to another suggestion for a different proposal number, as described above. As shown in FIG. 6k, the devices 11-23 can respond with a vote for the proposed function "z" for step 46, using vote messages 590-592. As before, upon receiving the vote messages 590-592, the leader 13 can instruct the devices 11-24 to perform the function if it was selected by at least a quorum of devices. In addition to the instruction 595 to perform the function, shown in FIG. 6l, the leader 13 can transmit the results of the performance of the function "z" to the client 500 with message 596. Alternatively, if function "z" was not a function that provides a return value, such as an instruction to modify data, then message 596 could merely contain a confirmation that the function was executed by the system 10.

As can be seen, the present invention contemplates mechanisms that remove the need for an extra message delay introduced by messages, such as messages 440 and 441 illustrated in FIG. 5e. As explained above, the intention messages, such as messages 440 and 441, provided each device with a collection of at least 2M+1 messages that the device could forward to other devices with a prior vote message to prove the safety of that device's prior vote and allowed each device to determine that the leader was not maliciously proposing different proposals with the same proposal number to different devices. However, because the present invention contemplates a larger quorum of devices to select a function, the leader 13 can obtain a sufficiently large collection of messages, such as messages 553-555, that the leader can forward, to each device in the quorum, a sufficiently large collection of properly authenticated message that the device need not rely on the intention messages, such as messages 440 and 441, to provide proof of the safety of that device's vote. Furthermore, the present invention contemplates a sufficiently large quorum such that, even if a malicious leader proposes different proposals with the same proposal number to different devices, a previously selected function can still be uniquely identified.

As described above, the modified Paxos algorithm uses a quorum of devices that is sufficiently large to ensure that any two quorums share at least one non-malicious device. However, because as few as a single non-malicious device may be shared between two quorums, the modified Paxos algorithm ensures that only one proposed function is voted on for any given proposal number by including the transmission of intention messages, such as messages 440 and 441 shown in FIG. 5e, which each device can rely upon to determine whether to vote for a proposed function.

The present invention, on the other hand, does not require that only a single proposed function is voted on for any given proposal number because a quorum of devices can be sufficiently large such that any two quorums share a number of non-malicious devices equal to, or greater than, a majority of the devices in each quorum. Therefore, if a previous quorum selects a proposal, a subsequent quorum can uniquely identify that selected proposal because a majority of the subsequent quorum's devices will be non-malicious devices that voted for the proposal in the previous quorum. For example, if a malicious leader were to propose one function to a first quorum and a second function to a second quorum, using the same proposal number for each, and the first function was selected by the first quorum, a number of devices less than a majority of the second quorum would vote for the second function. The devices shared between both quorums would vote for only one of the proposals, since a device may not vote for two proposals having the same proposal number. A subsequent leader, learning of previous proposals from a quorum of devices selected by that subsequent leader, would receive prior vote messages from a majority of the devices indicating a vote for the selected first proposal and from some number of devices less than a majority indicating a prior vote for the second proposal. By recognizing the proposal previously voted for by a majority of the devices of any quorum it selects, a subsequent leader can uniquely identify a selected proposal, even if it receives prior vote messages for different proposals, each with the same proposal number. If at least a majority of the devices of the quorum selected by the subsequent leader do not indicate a vote for the same proposal, then any proposal can be safe, since no single proposal was selected by any previous quorum.

Because the present invention contemplates mechanisms which do not require intention messages, such as messages 440 and 441 shown in FIG. 5e, at least one message delay can be removed from the time required to return a result to a requesting client. For example, if the leader 13 of FIGS. 6a-6l had previously performed the functions illustrated in FIGS. 6b-6i, the leader could have sent a proposal, such as the proposal included with message 580, as soon as the leader received the client's request 510. As shown in FIG. 6j, the transmission of the proposal to the devices 11-24 can add one message delay and, as shown in FIG. 6k, the transmission of vote information from the devices 11-23 to the leader 13 can add a second message delay. Therefore, as shown by FIG. 6l, the leader 13 could reply to the client 500 within as few as two message delays.

As explained above, the present invention contemplates that the majority of the devices of any quorum are non-malicious devices that are shared by another quorum. As before, the number of operating, non-malicious devices can be represented as N–F, where N represents the total number of devices in the distributed computing system and F represents the maximum number of malicious and failed devices in the distributed computing system that can still allow for the proper operation of the system. Furthermore, as was also defined above, the number of functioning and failed non-malicious devices can be represented as N–M, where M represents the maximum number of malicious devices in the distributed computing system that can allow for the proper operation of the system. Additionally, as with the modified Paxos algorithm above, a quorum of devices can have only properly functioning, non-malicious devices in order for the system to make progress. A quorum, therefore, cannot be larger than N–F.

As will be known by those skilled in the art, given a set of n items, and two subsets of n–a items, where a is a number greater than zero and less than n, the number of items in the intersection of the two n–a subsets can be expressed as n–2a. Therefore, given the set of all of the devices, represented as N, two quorums of the maximum size of N–F devices can have an intersection of N–2F devices. Because there are, at most, M malicious devices in the system, there are at least N–2F–M non-malicious, properly functioning devices shared by two subsets of N–F devices. As explained above, the present invention contemplates that the shared N–2F–M devices can be at least a majority of the subset of N–F devices, resulting in the following equation: N–2F–M>(N–F)/2. Multiplying both sides by 2, and consolidating N to one side yields the result that N>3F+2M. As will be recognized by those skilled in the art, setting the quorum size to the maximum size of N–F devices provides for the smallest number of total devices in the system. Consequently, a system having a greater number of devices than the sum of three times the maximum number of failed or malicious devices and twice the maximum number of malicious devices can implement the message-delay-reducing algorithms contemplated by the present invention.

Turning to the exemplary distributed computing system 10 of FIGS. 6a-6l, a maximum number of two malicious devices and three failed or malicious devices are present in the system 10. However, because the system has more than thirteen devices, it can implement the message-delay-reducing algorithms contemplated by the present invention, as described in detail above. Additionally, as was shown above, the quorum needed to select a proposal can be N–F or eleven devices in the exemplary distributed computing system 10.

Reduced-Message-Delay Modified Paxos Algorithm Without A Leader

Generally, the Paxos algorithm described above relied on a leader device to select a singular, safe function to submit to the devices of the distributed computing system. However, as described above, the algorithms contemplated by the present invention can determine a previously selected proposal even if the leader was malicious and submitted different proposals to different devices using the same proposal number. Consequently, a leader device is not required to select singular functions, and a client can be allowed to submit its requests directly to the devices of the system. As will be shown, a leader can still be used to learn of prior proposals and provide a mechanism by which the system can advance to a step at which none of the devices have voted for prior proposals.

Figure 7A:
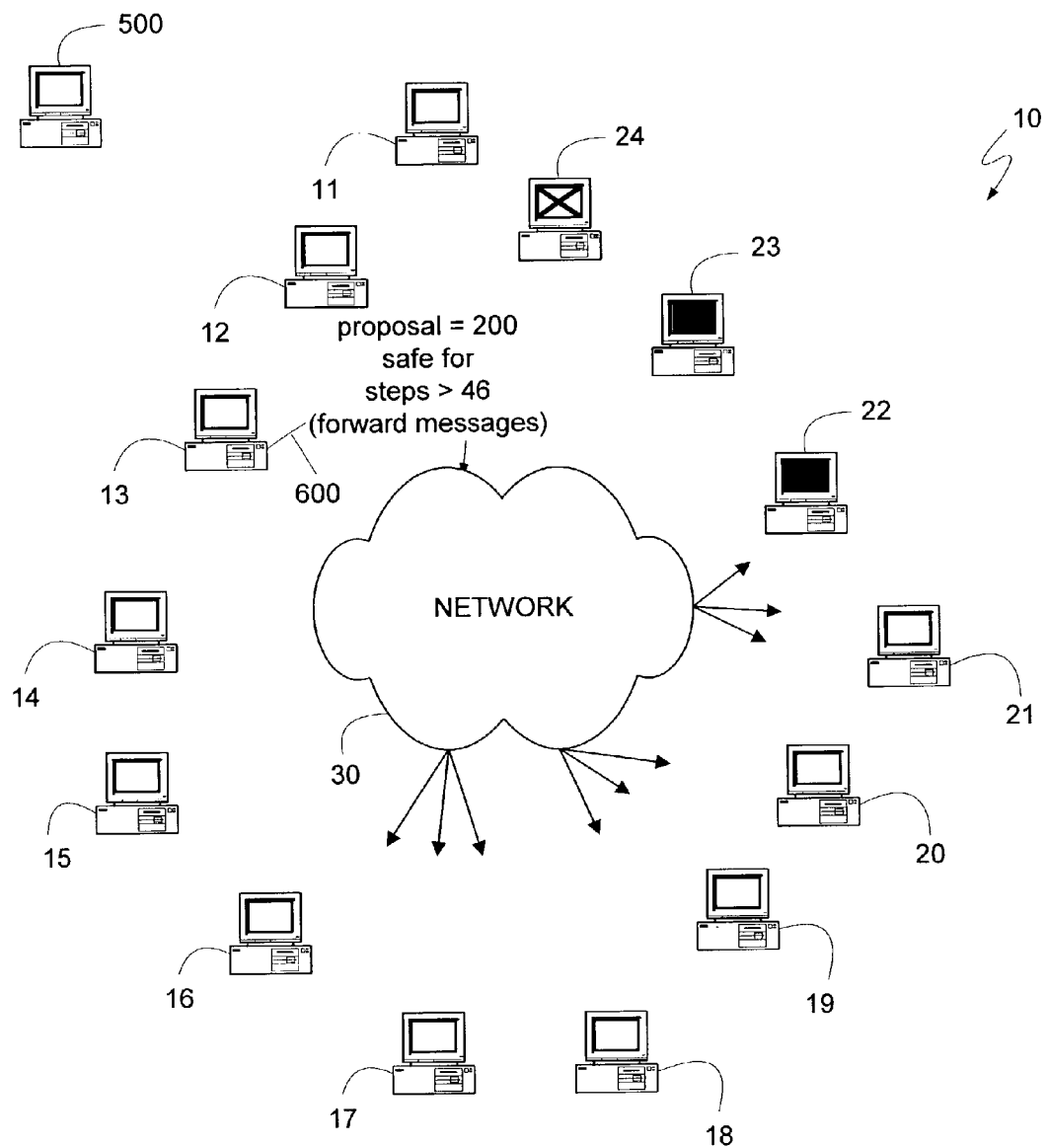
FIGS. 7*a-k* generally illustrate another aspect of the operation of a more efficient multi-step algorithm contemplated by the present invention.
Figure 7B:
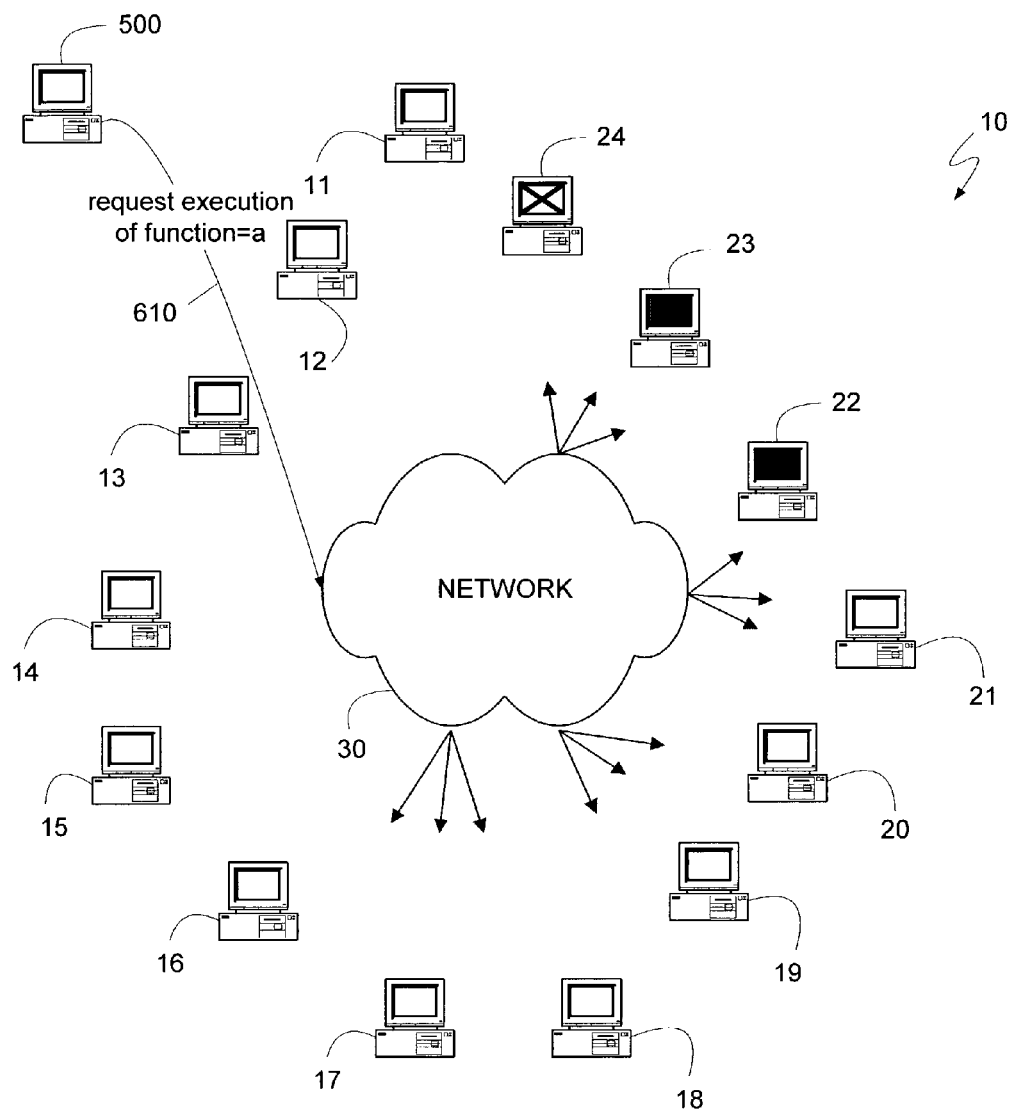

Turning to FIG. 7a, which is intended to illustrate system 10 after FIG. 6l, the leader 13 can transmit a message 600 indicating that proposal number 200 is safe for all steps of the system greater than step 46, which was determined as shown above. Additionally, the leader 13 can forward messages proving that no devices have previously voted for any proposals for steps greater than 46, in the manner described above. Upon receipt of the message 600, each of the devices 11-23 can accept requests directly from the clients of the system 10. Consequently, if client 500 were to send message 610, as shown in FIG. 7b, to all of the devices, requesting the execution of function "a", each of the devices could vote for the function, as will be shown. As before, while FIG. 7b illustrates message 610 as only being sent to the network 30, it is intended represent the delivery of message 610 to each of the clients 11-24.

Figure 7C:
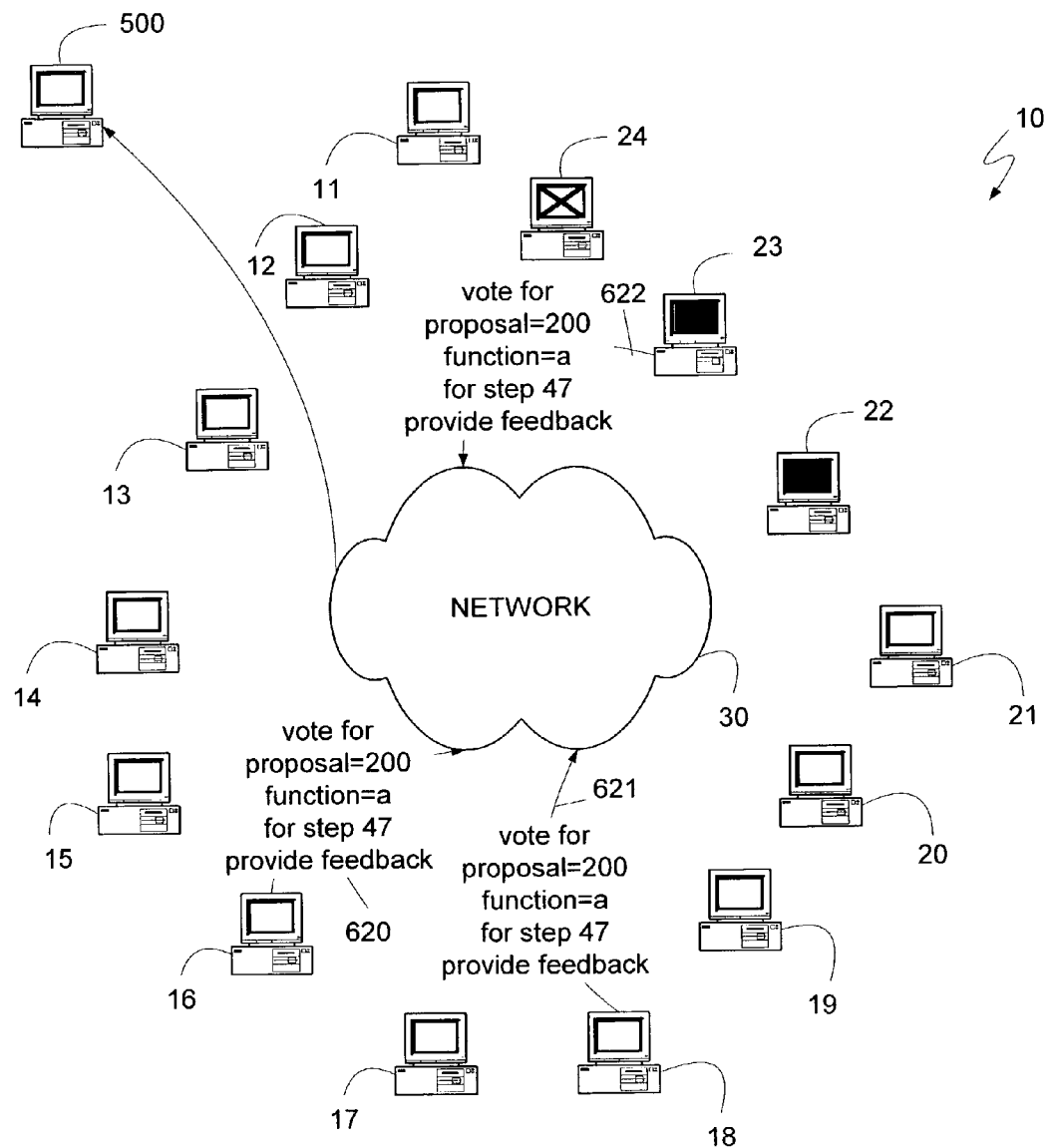

Turning to FIG. 7c, upon receipt of message 610, each of the devices 11-23 can treat the message 610 as a proposal for the next step, having a proposal number of 200 as indicated by message 600. Each device can then independently determine if it can vote for the proposal in the manner described above. As shown in FIG. 7c, each device that determines it can vote for the proposal can send a vote message, such as messages 620-622, directly to the requesting client 500. Again, while FIG. 7c illustrates only three such messages, each device that votes for the client's request can transmit a vote message to the client 500. In addition to providing an indication that it voted for the client's request, each device can execute the requested function and provide the client with the feedback of the executed function. As above, some functions may only allow the device to provide an acknowledgement that the function was executed. Alternatively, each device can only conditionally execute the requested function and provide feedback. In such a case, each device can transmit vote messages, such as messages 620-622, to all of the other devices. If a device receives a quorum of such messages, each indicating a vote for the same proposal, then it can execute the function fully, and not merely conditionally.

Figure 7D:
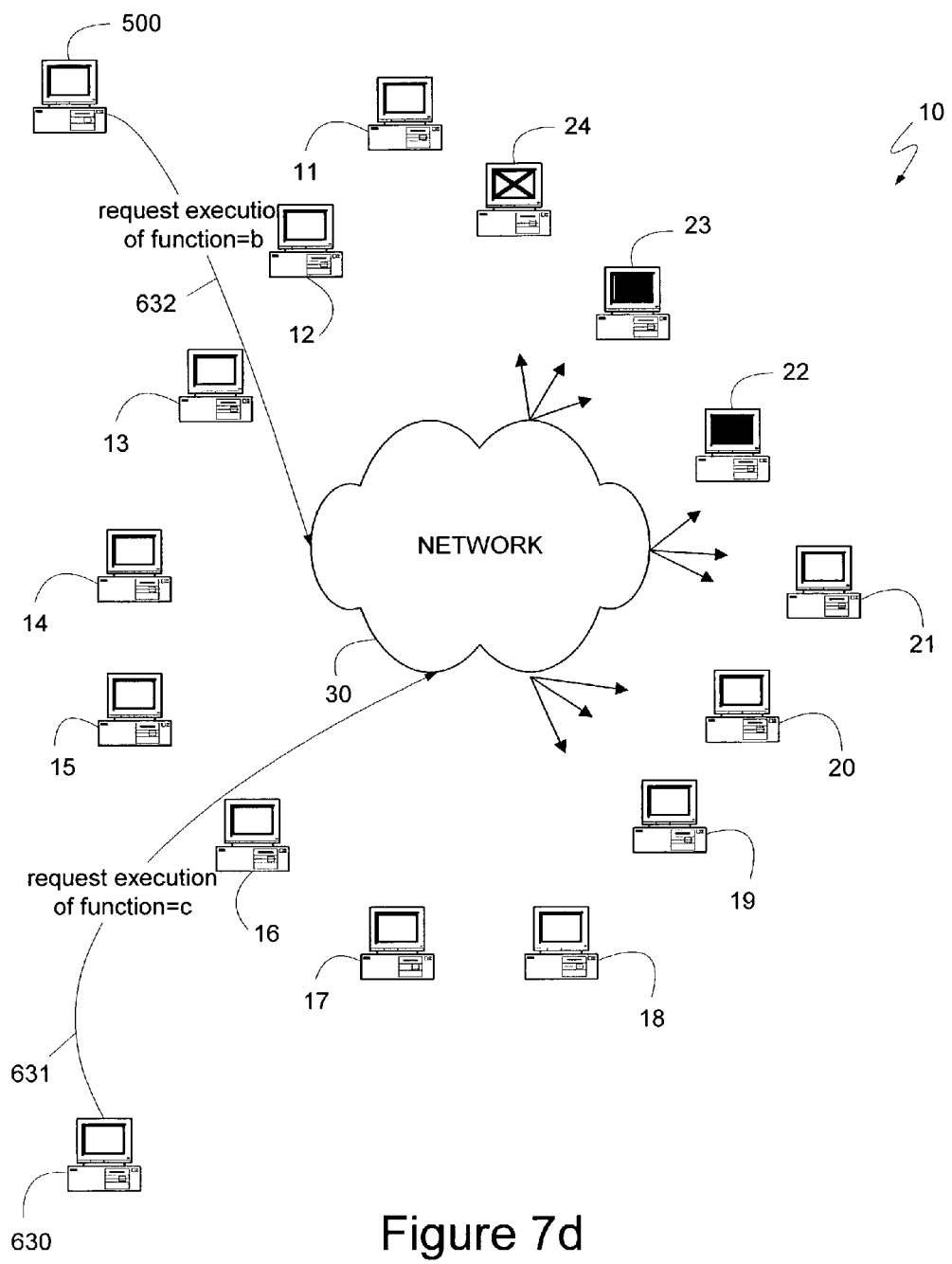

As can be seen, by allowing the clients of the system 10 to communicate directly with the devices 11-24, a client can receive a response to its requests with no intervening message delays. The two message delays introduced by communication between the leader and the devices can be eliminated. However, because individual clients may not be able to coordinate with one another, it is possible that two or more clients can nearly simultaneously requests different functions. For example, as shown in FIG. 7d, client 500 can request the execution of function "b" with message 632, while at approximately the same time a new client 630 can request the execution of function "c" with message 631.

As with a malicious leader that proposes two or more functions to different groups of devices using the same proposal number, each of the devices 11-23 can receive the messages 631 and 632 and determine whether to vote for either. A quorum of devices may vote for one of the proposals, or neither proposal may succeed in obtaining the votes of a quorum. However, as explained above, a subsequent leader can still determine whether a function was selected. Returning to FIG. 7d, the devices 11-23 can assign to the first request they receive a proposal number of 200 for the next step, such as step 48 in the example shown in FIG. 7d, and determine whether to vote for that proposal. Because a device can only vote for one proposal with a given proposal number, the device can simply ignore the second proposal it receives with that proposal number.

Figure 7E:
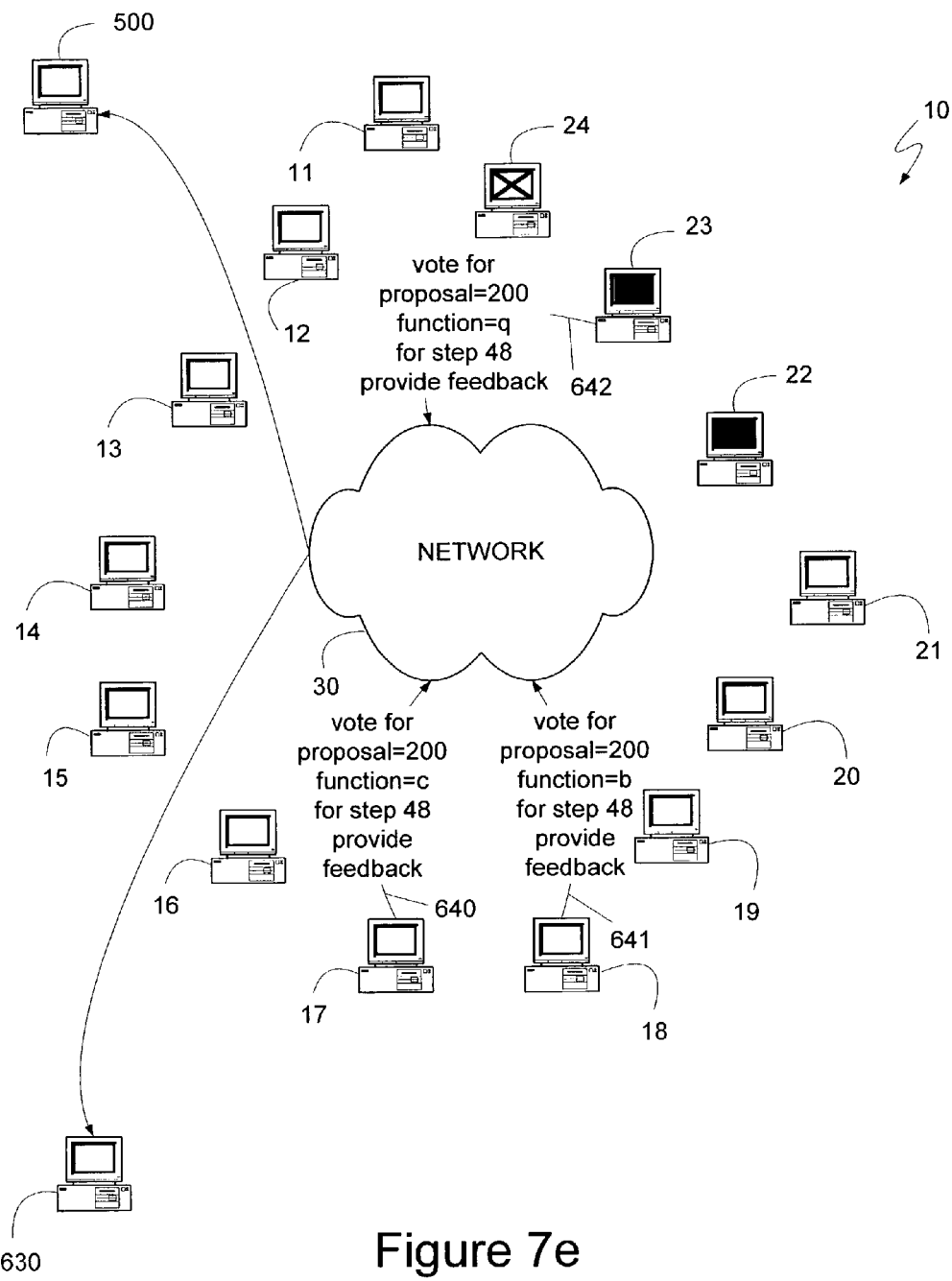

Turning to FIG. 7e, device 17 is shown voting for function "b" with message 640, while devices 18 is shown voting for function "c" with message 641. Furthermore, malicious device 23 is shown voting for a function that was not proposed with message 642. Each of the devices voting for either of the functions requested by the clients 500 and 630, can transmit their vote messages to the clients as described above. If one of the functions receives a quorums of votes, then the client can consider the function to have been executed However, if none of the functions requested by the clients receives a quorum of votes, the devices can recognize the failure, and can request that a leader device attempt to obtain the needed votes. Alternatively, another device that need not be part of the system 10 can monitor the system and request that a leader device attempt to obtain the needed votes.

Figure 7F:
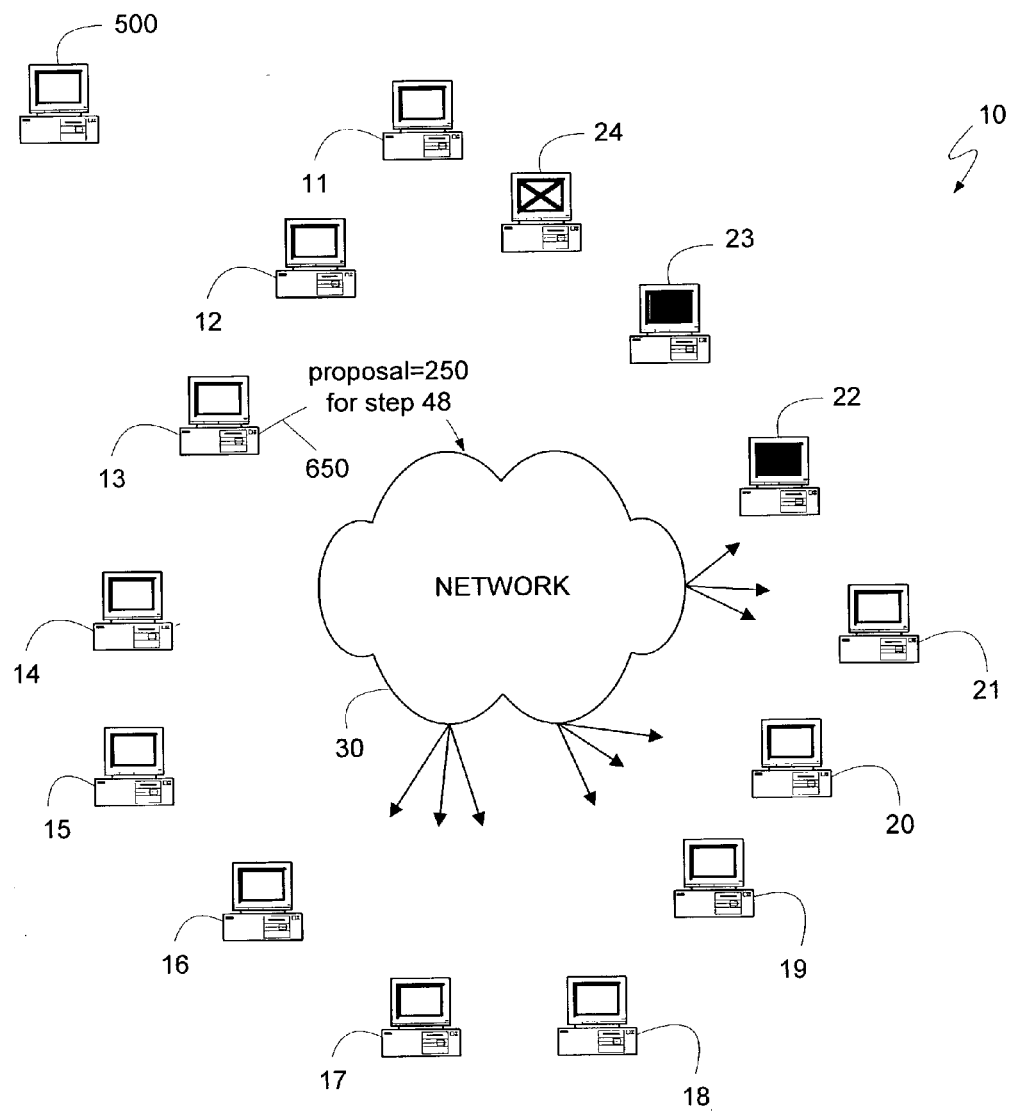
Figure 7G:
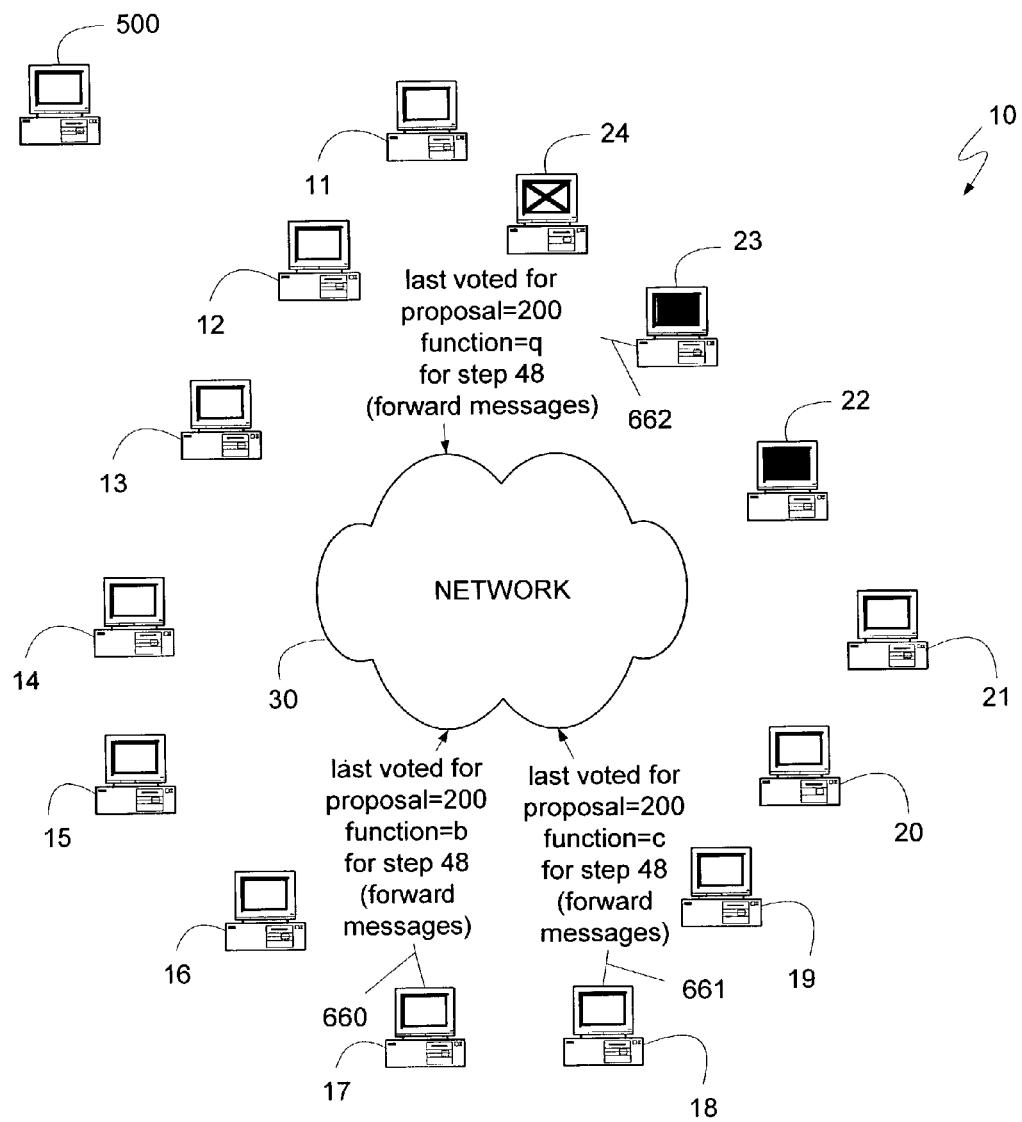
Figure 7H:
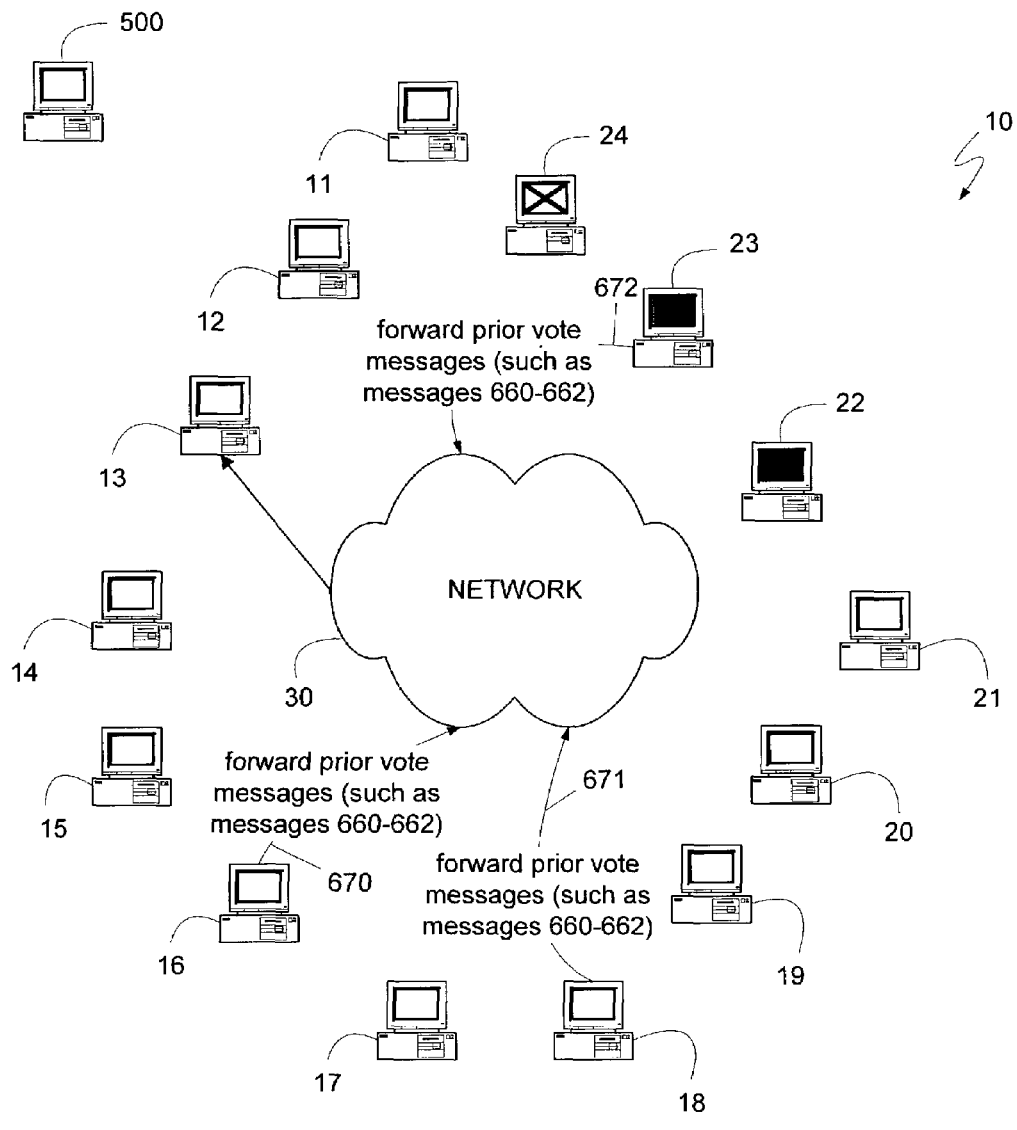
Figure 7I:
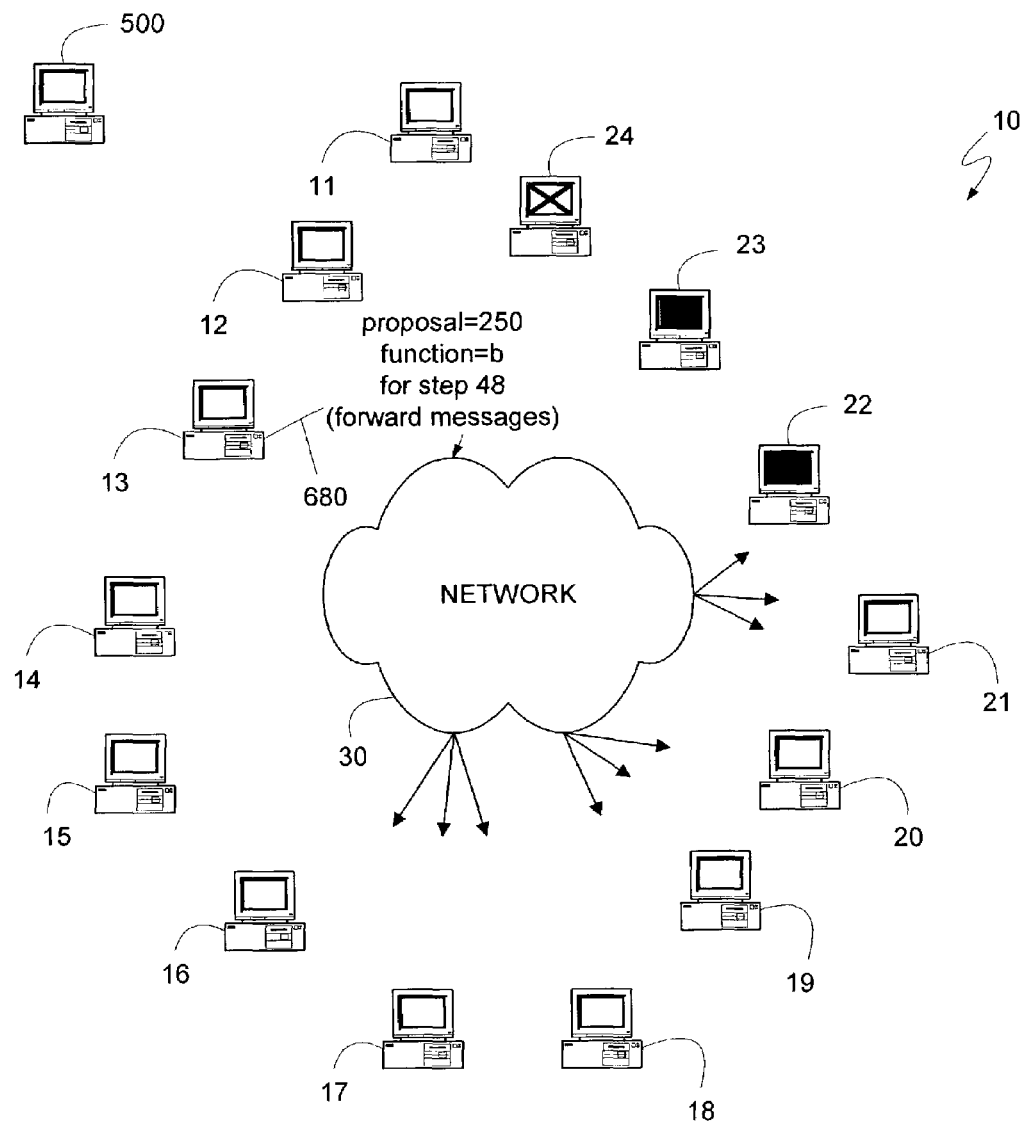
Figure 7I:
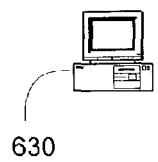
Figure 7J:
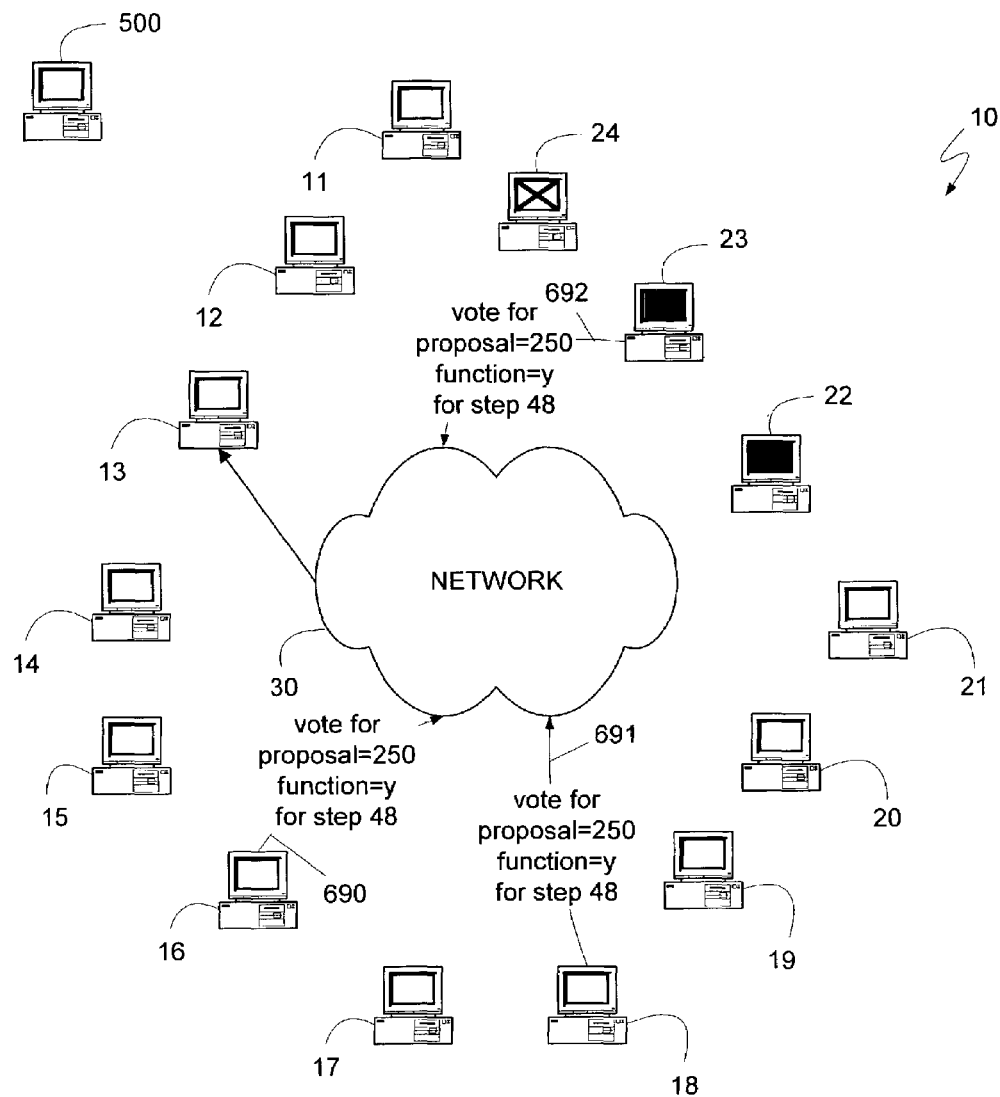
Figure 7J:
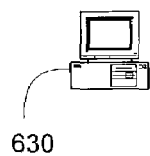
Figure 7K:
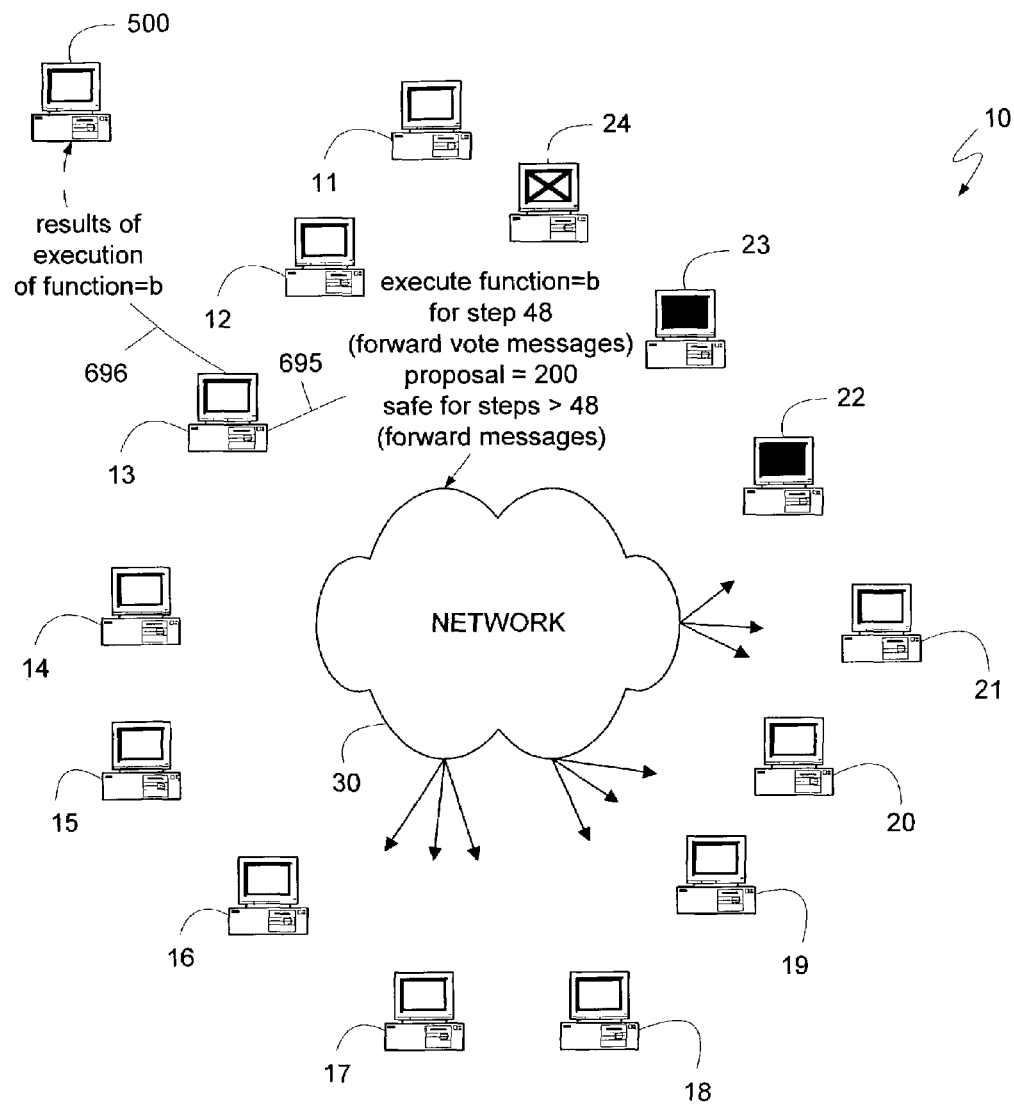
Figure 7K:
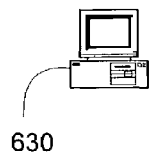

A leader, such as leader 13, can attempt to synchronize the system 10 and select a particular function, if none was selected, using the mechanisms described in detail above. Specifically, as shown in FIG. 7f, the leader 13 can send a suggestion message 650, suggesting a proposal number greater than the proposal number that was previously deemed safe for all values for all steps greater than step 46. In response to the suggestion message 650, the devices 11-23 can send prior vote messages 660-662, as shown in FIG. 7g, to all of the other devices in the quorum. Upon receipt of the prior vote messages, each of the devices can forward the received messages to the leader 13, using messages 670-672, as shown in FIG. 7h, and as also described in detail above. Based on the received messages 670-672, the leader 13 can determine if one of the client requested functions was previously selected by a quorum of devices. As described in detail above, if at least a majority of the current quorum indicates that they last voted for a particular proposal, then that proposal has been previously selected, otherwise, any proposal can be safe. If the leader determines that a proposal was previously selected by a quorum the leader can propose it again to synchronize the devices 11-24. Therefore, as shown in FIG. 7i, the leader can send a proposal message 680, which, in the particular example illustrated, proposes function "b", requested by client 500. As before, the devices 11-23 can determine whether they can vote for the proposal, and can indicate a vote for the proposal using vote messages, such as messages 690-692, shown in FIG. 7j. Upon receiving the vote messages, the leader 13 can instruct the devices 11-24 to perform the selected function, as shown by message 695 in FIG. 7k. The leader 13 can also indicate that the new proposal number is safe for all steps greater than the current step of 48. However, the previous proposal number remains safe for all steps greater than the current step, and it too can be indicated as safe. Message 695 is shown using this latter alternative, as such a method can prevent step numbers from increasing too rapidly. Additionally, as before, the leader 13 can inform device 500 of the results of the execution of the client requested function, as indicated by message 696. In such a manner the system 10 can resume a more efficient operation, described above, wherein the client requests can be received by the devices 11-24 directly.

The present invention also contemplates that if two or more clients had made requests, or a malicious leader had sent multiple proposals with the same proposal number, and none of the proposals achieved a quorum, a subsequent leader could attempt to determine if a particular request was selected and, if unable to find a majority of devices that all voted for the same proposal value, the leader could abort the proposal selection process. In such a case, if the reason for the multiple proposals with the same proposal number was due to two or more competing clients, the leader, or the individual devices, could transmit an indication to the requesting clients that they would need to resubmit their requests. Because it is unlikely that the requesting clients would again submit their requests nearly simultaneously, the system will likely be able to receive and select each client's requested function without conflict, providing an efficient solution to determining which function to next select if two or more functions are proposed with the same proposal number.

In addition, the present invention contemplates mechanisms for protection against malicious clients that can attempt to have the system 10 perform improper functions that can result in possible harm to the data maintained by the system. One mechanism for guarding against malicious clients is the authentication of the client prior to the performance of a function requested by the client. To protect the data of the system, the devices can vote for only those client proposals which are authenticated, and the requesting client has the necessary clearance to make the request. For example, each device can have access to a database indicating particular clients and their levels of access. A client that has properly authenticated itself to the distributed computing system can be granted a sufficient level of access to request modifications to the data stored by the system, while a client that has only guest access, and cannot properly authenticate itself, may only be allowed to retrieve information, but not change it.

By requiring client commands to be authenticated, the devices of the system can each independently determine the client making the request, and whether the request is allowed for that client. By performing the check independently, the devices can take advantage of the mechanisms described above to avoid collusion between a malicious client and malicious devices. Each client can, therefore, send an authenticator for each of the devices, when transmitting a request to the distributed computing system.

Returning to FIG. 6i, for example, prior to sending vote messages, such as messages 570-572, each device can verify, based on the messages forwarded by the leader, that the proposal is properly authenticated, and that the client submitting the proposal has the authority to request the function it has requested. If the messages forwarded by the leader indicate that a group having more devices than the number of malicious devices had previously voted for the proposal, then the devices receiving the leader's proposal need not verify the authentication of the client because such a verification was previously performed by at least one non-malicious device in order for that device to have voted for the proposal in the first place. If, however, the proposal submitted by the leader for a vote is proper because the prior vote messages did not specify any functions that were previously voted for, allowing the leader to select its own proposal, then the device can seek to verify that the proposal is a request from a client that is authorized to issue such requests because no such check had previously been made. Therefore, the devices can verify that the authenticator sent by the client with the client request is proper, and they can verify, based on the identity of the client, that the client has the authority to request the currently proposed function. If the authenticator is improper, or if the client has not been granted sufficient access, the device need not vote for the client's proposal.

The present invention can minimize the effects of a malicious leader or multiple clients sending nearly simultaneous requests through the algorithms described above. However, such a malicious leader or multiple clients can prevent progress by continually proposing functions that are not selected. As a result, the present invention contemplates the use of a timer, or similar algorithm, by which a client or a device can determine that a sufficient amount of time has passed without the distributed computing system executing a function, and initiate a new leader. In such a manner, the length of time by which the system can be delayed is limited.

Variable Reduced-Message-Delay Modified Paxos Algorithm

The above algorithms can also be implemented by a distributed computing system having fewer devices than the sum of three times the maximum number of failed or malicious devices and twice the maximum number of malicious devices, though such a system may not be able to operate properly if the maximum number of devices fail and, in such a case, may need to revert to the above described modified Paxos algorithm. Specifically, as described above, the present invention contemplates the use of a group of N−F devices as a quorum to select proposals. If a larger quorum of N−Q devices is used, where Q can be between 0 devices and F devices, and where all N−Q devices are operational devices, then a system with fewer devices can use the above algorithms so long as the number of failed and malicious devices does not exceed Q devices.

Figure 8A:
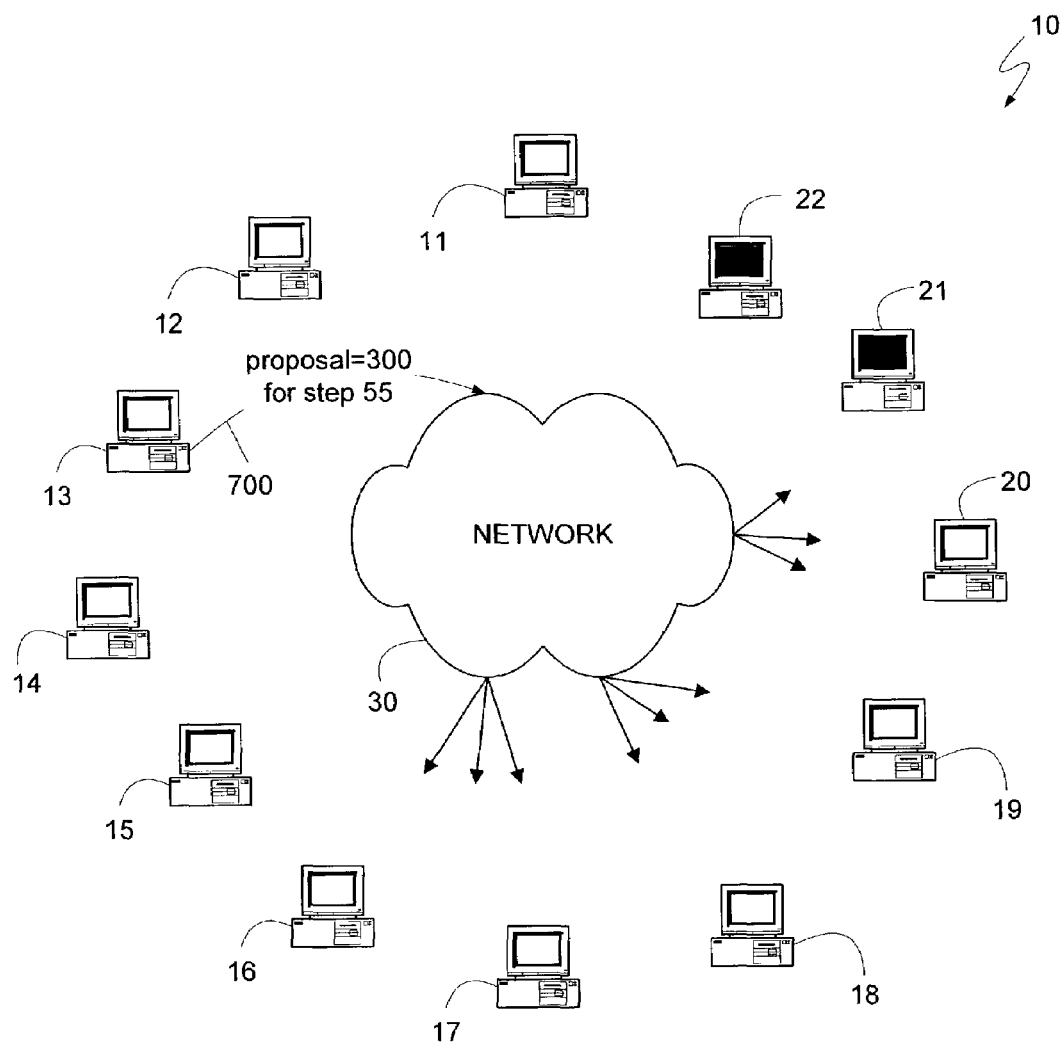
FIGS. 8*a-f* generally illustrate the operation of a more efficient multi-step algorithm requiring fewer devices contemplated by the present invention.

The exemplary distributed computing system 10 of FIG. 8a comprises twelve devices, rather than fourteen devices, as shown in FIGS. 6a-6l and 7a-7k. Nevertheless, the system of FIG. 8a, like the system illustrated in FIGS. 6a-6l and 7a-7k, can also accommodate as many as two malicious failures. FIG. 8a illustrates the system 10 with two devices indicated as experiencing a malicious failure, and no devices experiencing a non-malicious failure. In the same manner as described in detail above, a leader 13 can suggest a proposal number with message 700. Each device receiving message 700 can respond with prior vote messages, such as messages 710 and 711 shown in FIG. 8b. Again, as before, each of the devices can forward the prior vote messages to the leader as shown by the exemplary messages 720-722 in FIG. 8c.

Figure 8B:
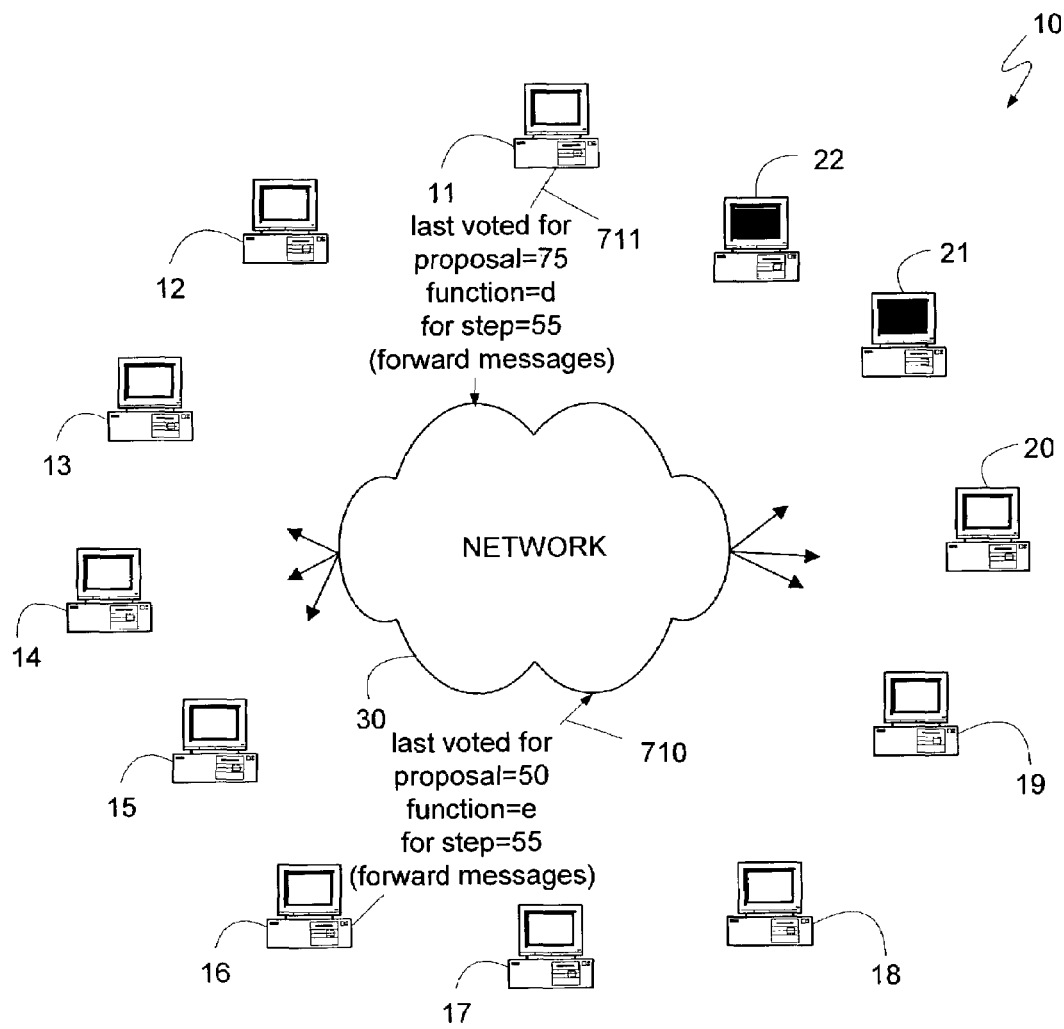
Figure 8C:
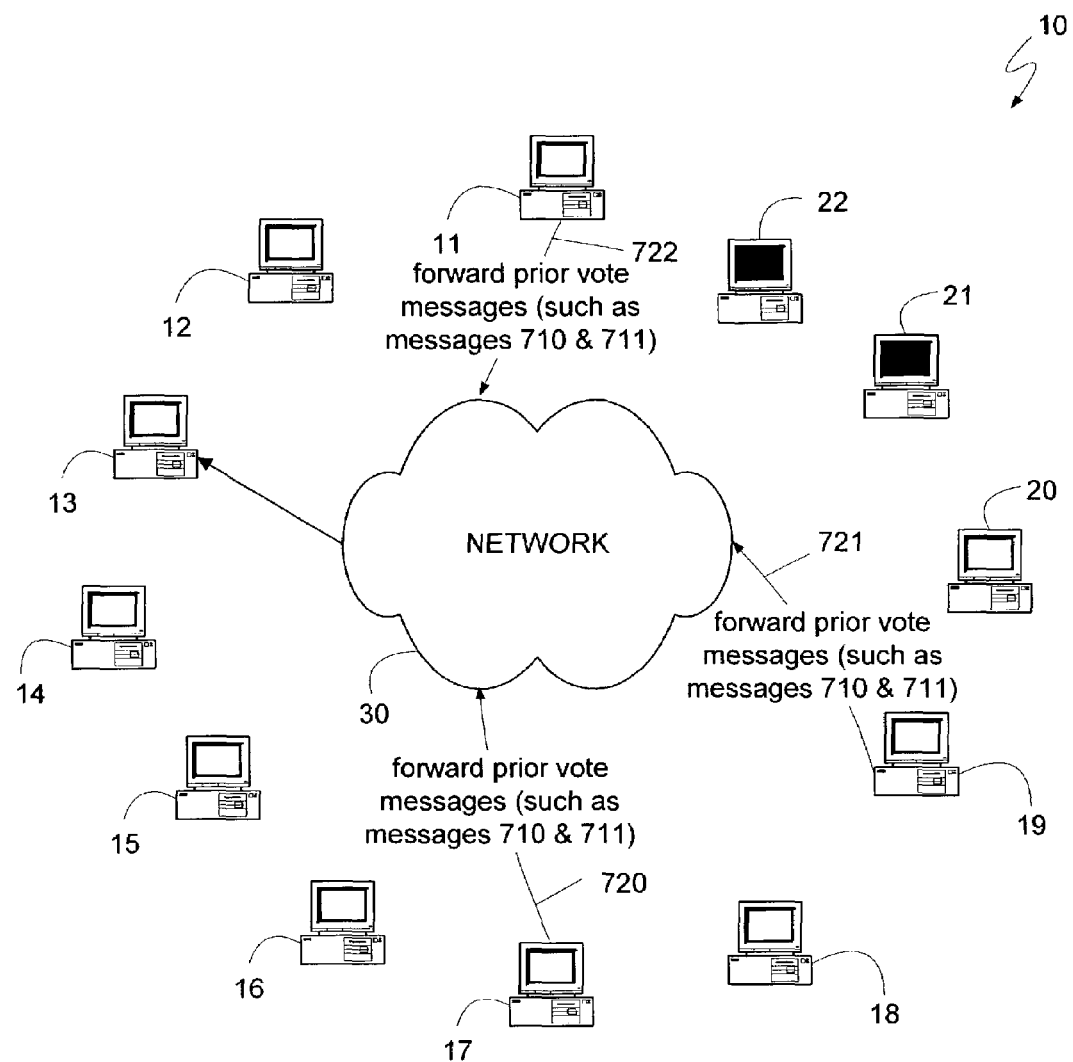

Because the system 10 of FIGS. 8a-8c can accommodate at least two malicious failures, the leader 13 still requires 3M+1 messages, as before, to be able to provide the devices with a sufficient collection of messages that the devices can prove the safety of their votes to another device. Therefore, if the leader 13 cannot obtain at least seven messages, such as messages 720-722, the message-delay-reducing algorithm contemplated by the present invention could not be used. However, as shown in FIG. 8c, the exemplary system 10 contains only at most two malicious devices, resulting in a collection of at least ten messages, which can be sufficient for the leader to provide the devices the proof of safety.

Figure 8D:
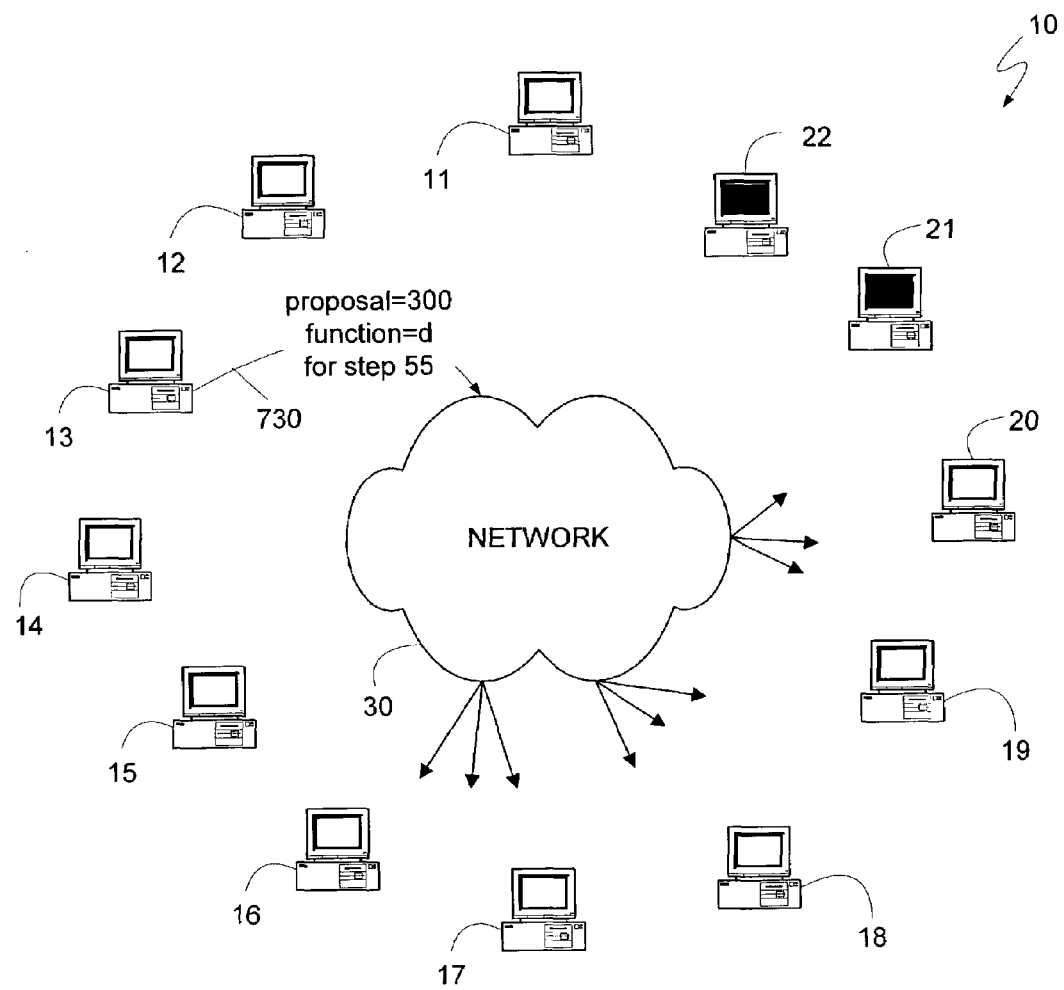
Figure 8E:
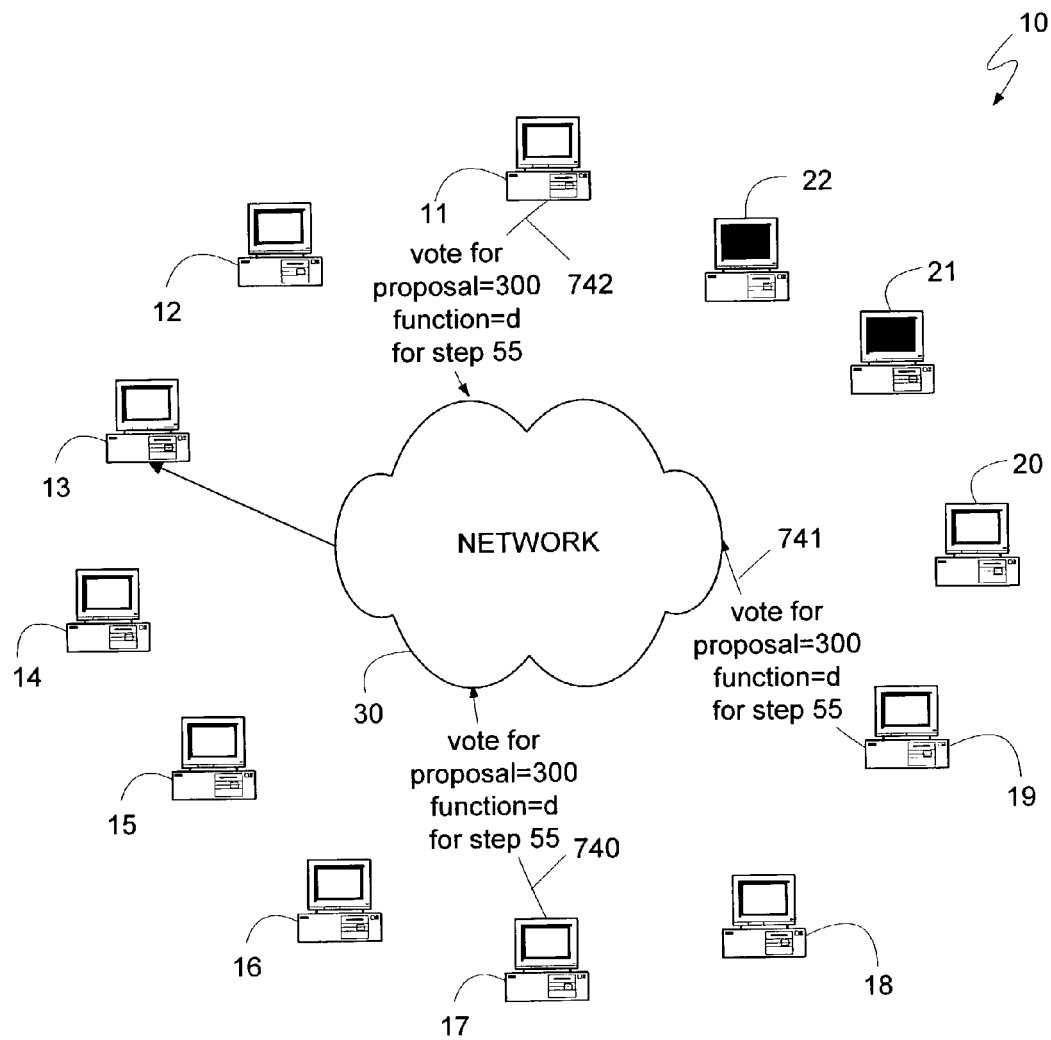

Turning to FIG. 8d, the leader 13 can proceed, as above, to propose a function in message 730. Upon receiving message 730, each of the devices 11-22 can determine whether to vote for the proposal and can transmit vote messages, such as messages 740-742, if appropriate, to the leader 13, as shown in FIG. 8e. As before, a quorum of devices can be required to select a proposal and, also as before, a quorum can be a sufficiently large collection of devices that any two quorums share a majority of their non-malicious devices. As will be shown, for the exemplary system 10 illustrated in FIGS. 8a-8e, a quorum can be ten devices. Consequently, because devices 11-22 can vote for the proposal, and only two devices may maliciously choose not to vote, or to vote inappropriately, the function proposed by message 730 can still be accepted by the remaining ten devices.

Figure 8F:
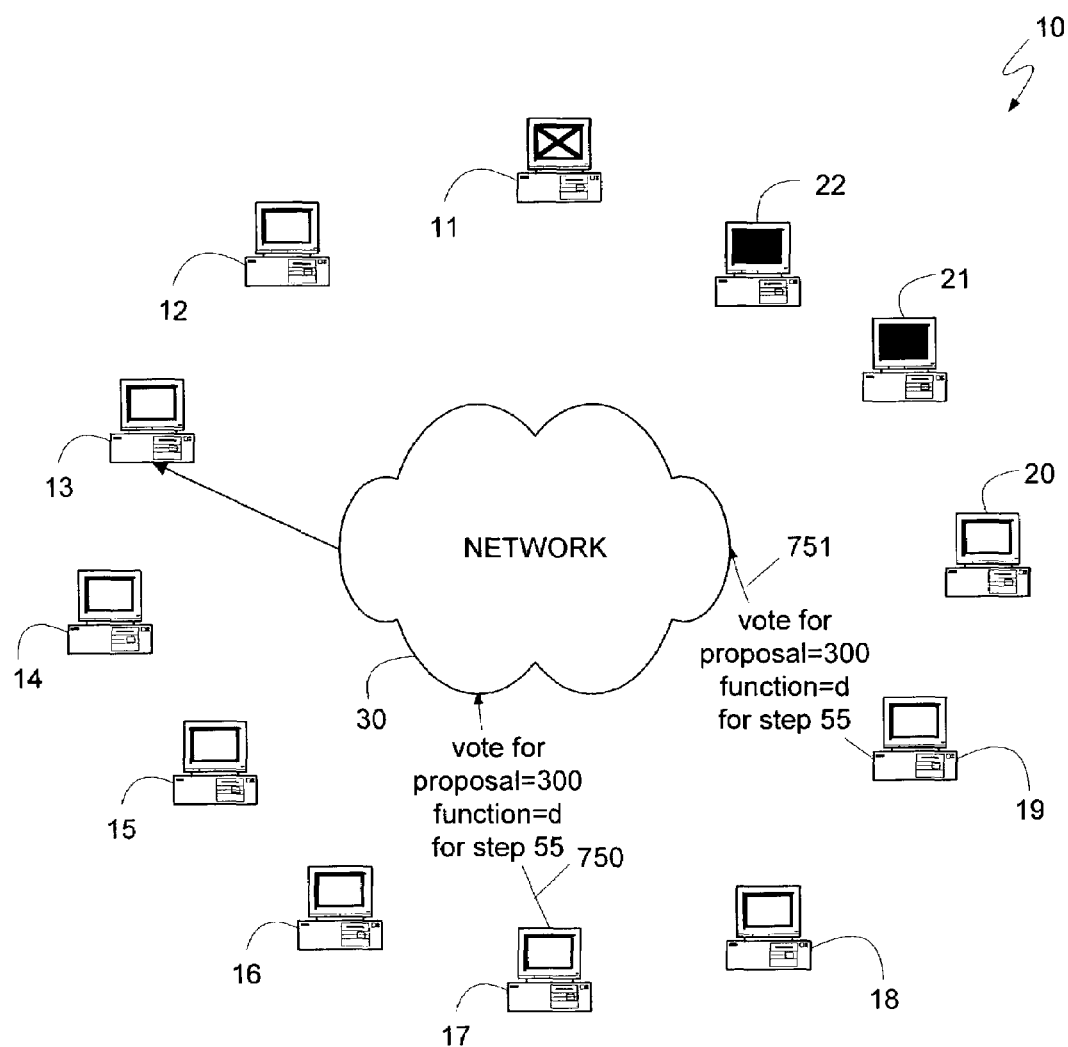

However, if another device were to fail, such as device 11, as shown in FIG. 8f, the leader 13 would not be able to obtain a quorum of votes, even if every operational device voted, causing the system to be unable to select any proposals. In such a case, the leader 13, or another device or mechanism, can recognize the inability of the system 10 to determine a function to execute, and can cause the leader to use the modified Paxos algorithm described above to attempt to have the system select functions to execute. For example, the leader 13 could detect the inability of the system to use the message-delay-reducing algorithm by the number of votes the leader receives. If the leader receives less than a quorum of votes, as required by the message-delay-reducing algorithm, the leader can instruct the devices to use the modified Paxos algorithm which, as described above, can operate with a quorum of only (N+M)/2 devices, or seven devices using the exemplary system 10 of FIGS. 8a-8f. Alternatively one or more of the devices 11-22 in the system 10, or a client of the system 10, could recognize the inability of the system to use the message-delay-reducing algorithm though a time-out function, such that the failure of the system to execute any function within a predetermined period of time can cause the device or client to request that the leader use the modified Paxos algorithm.

Returning to FIG. 8f, if a device, such as device 11 fails, the leader 13 can attempt to cause the system 10 to execute the function "d" through the use of the modified Paxos algorithm. However, as described above, the message-delay-reducing algorithm contemplated by the present invention provides a mechanism by which multiple proposals can be submitted using the same proposal number and still allow a subsequent leader to determine if any of those proposals was selected. Therefore, when switching to the modified Paxos algorithm, the leader 13 can still need to determine if any of multiple proposals having the same proposal number was, in fact, selected by a previous quorum while the system 10 was capable of using the message-delay-reducing algorithms. Consequently, a mechanism similar to that described above can be used, whereby a quorum of devices used with the message-delay-reducing algorithm can be sufficiently large that even if all of the devices that can fail and still allow for proper operation of the system 10 are devices that were members of that first quorum, the remaining devices from that quorum can constitute a majority of the remaining operational devices. In such a manner, similar to that described above, a leader can uniquely determine a previously selected proposal even if the devices indicate a last vote for different proposals, each with the same proposal number.

The operation of the system 10 can then proceed with the modified Paxos algorithm as described above. Specifically, the leader 13 can send a suggested proposal number to the devices 1'-22, and the devices 12-22 can transmit their prior vote messages to each other and then forward them to the leader 13, in a manner similar to that shown in FIGS. 5a-5c. The leader 13 can then find a safe proposal by determining if any proposal was previously voted for by a majority of the devices responding with prior vote messages, since such a proposal was selected by a previous quorum using the reduced-message-delay algorithm, as described above. The modified Paxos algorithm can proceed as above, with the leader 13 proposing a safe value, each of the receiving devices transmitting an intention message to the other devices, and the devices submitting their votes to the leader, in a manner similar to that shown in FIGS. 5d-5f. In such a manner the exemplary distributed computing system 10 of FIGS. 8a-8d, having a reduced number of devices, can still select and execute functions using the message-delay-reducing algorithms described, if a sufficient number of devices are operational, and can select and execute functions using the modified Paxos algorithms described if more devices fail or become malicious.

As described above, a system with a reduced number of devices can still use the message-delay-reducing algorithms contemplated by the present invention by using a quorum of N–Q devices, where "Q" is a number of devices between zero and F devices. Because F can represent the maximum number of devices that can fail, the quorum of N–Q devices can have no less than N–Q–F number of properly functioning devices. Therefore, if the remaining, N–Q–F properly functioning devices is greater than the majority of all of the properly functioning devices remaining in the system after the maximum of F devices fail, the system can implement the above message-delay-reducing algorithms. However, because a subsequent leader cannot determine which individual devices are malicious, it can only be certain that at least N–Q–F–M of the N–Q–F devices are not malicious. Therefore, if a subsequent leader finds that N–Q–F–M devices are still the majority of the remaining properly functioning devices, then it can perform the steps described above, and the system can implement the above message-delay-reducing algorithms. The preceding requirements can be expressed mathematically as $N-Q-F-M > (N-F)/2$. Multiplying both sides by two and solving for N yields: $N > 2Q+F+2M$, where, as before, F is the maximum number of devices that can fail or become malicious and still allow for the proper operation of the system, M is the maximum number of devices that can be malicious and still allow for the proper operation of the system, and Q can be the maximum number of devices that can fail or become malicious and still allow the system to use the message-delay-reducing algorithms described above. As can be seen, for values of Q less than F, the above formula allows for systems with a reduced number of devices to still implement the message-delay-reducing algorithms. If Q, which can represent the maximum number of devices that can fail or become malicious and still allow the system to use the message-delay-reducing algorithms described above, is set to be equal F, the maximum number of devices that can fail, then the system can always use the message-delay-reducing algorithms described above and the formula reduces to that provided above: $N > 3F+2M$.

As can be appreciated by those skilled in the art, the above described system with the reduced number of devices can take advantage of the message-delay-reducing algorithms to accept proposals directly from a client in the same manner as described above in conjunction with FIGS. 7a-k. Specifically, if the number of failed devices is fewer than the maximum number of devices that can fail, the system can continue to operate properly even if multiple proposals with the same proposal number are submitted to the devices for a vote. Consequently, the system need not require a single proposer, such as a leader device, and can receive the proposals directly from the system's clients.

However, an even greater reduction in the number of devices in a system that can still use above-described the message-delay-reducing algorithms can be achieved if the system receives proposals only from a leader device. As above, a quorum of N–Q devices can be used to select any given proposal, and of those N–Q devices, a maximum of F devices can fail. Furthermore, as before, because a subsequent leader cannot determine which individual devices are malicious, it can only be certain that at least N–Q–F–M of the N–Q–F devices are not malicious. Therefore, if a subsequent leader finds that N–Q–F–M devices are still the majority of the remaining properly functioning devices, then it can perform the steps described above, and the system can implement the above message-delay-reducing algorithms. However, if the system receives proposals only from a leader device, and the leader issues two proposals with the same proposal number, then the leader must be malicious. In such a case, when a subsequent leader detects that a sufficient number of different devices have voted for different proposals with the same proposal number, it can determine that the previous leader was malicious. Consequently, the subsequent leader need not assume that all M malicious devices could be in the N–Q–F properly functioning devices described above. Instead, the subsequent leader can be certain that at least N–Q–F–(M–1) devices are not malicious. Therefore, if the subsequent leader finds that N–Q–F–M+1 devices are still the majority of the remaining properly functioning devices, then it can perform the steps described above, and the system can implement the above message-delay-reducing algorithms.

As above, the requirement that N–Q–F–M+1 devices are still the majority of the remaining properly functioning devices can be expressed as: $N-Q-F-M+1 > (N-F)/2$. Solving for N yields: $N > 2Q+F+2M-2$, which is two devices smaller that the requirement for the minimum number of devices in the system derived above for a system that can still use the reduced-message-delay algorithms. However, for the subsequent leader to detect that a sufficient number of different devices have voted for different proposals with the same proposal number, the number of functioning non-malicious devices from a previous quorum, N−F−Q−M, can be larger than the number of malicious devices, M. Therefore, N−F−Q−M>M or N>F+Q+2M. A system having more devices than the larger of 2Q+F+2M−2 or F+Q+2M, in which the devices receive proposals from a leader device, can, therefore, use the reduced-message-delay algorithms described above, and can revert to the modified Paxos algorithm, also described above, if too many devices fail.

Those skilled in the art will also appreciate that the logic behind the above reduction in the number of devices needed for a system to implement the message-delay-reducing algorithms can also be applied to the system described above, requiring N>3F+2M, that need not revert to the modified Paxos algorithm. Specifically, setting Q, the maximum number of devices that can fail and still allow the system to use the message-delay-reducing algorithms, equal to F, the maximum number of failed devices that can be properly handled by the system, the above requirement of N>Maximum(2Q+F+2M−2, F+Q+2M) can be expressed as: N>Maximum(3F+2M−2, 2F+2M). Therefore, a system having more devices than the larger of 3F+2M−2 or 2F+2M, can use the reduced-message-delay algorithms described above if the devices receive proposals from a leader device.

As can be seen, the present invention provides for the proper operation of a distributed computing system in the face of malicious failures and malicious clients, while allowing a client's requests to be responded to with a minimum of delay. All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for selecting values in a distributed computing system having a maximum number of malicious devices, the method comprising:
    receiving a properly authenticated request;
    receiving a group of forwarded prior vote messages with authenticators comprising more copies of prior vote messages than three times the maximum number of malicious devices in the distributed computing system, of which more copies than twice the maximum number of malicious devices in the distributed computing system are properly authenticated, wherein the group of forwarded prior vote messages with authenticators indicate a set of safe values for a proposal number for current and future steps; and
    transmitting a vote message if the properly authenticated request is contained in the set of safe values and no other request with the proposal number for a current step was previously accepted.

2. The method of claim 1, wherein the properly authenticated request is received from a client, the group of forwarded prior vote messages with authenticators are received from a leader, and the vote message is transmitted to the client; the method further comprising assigning the properly authenticated request a safe proposal number and the current step, wherein the safe proposal number is the proposal number for which the set of safe values is all values.

3. The method of claim 2, further comprising:
    receiving, from the leader, a properly authenticated suggested next proposal number message comprising a suggested next proposal number;
    transmitting, to a first quorum of devices, in response to the suggested next proposal number message, a prior vote message with authenticator and a prior vote message proof of safety, wherein the prior vote message with authenticator comprises an indication of the properly authenticated request and the proposal number;
    receiving, from a second quorum of devices, a group of prior vote messages with authenticators, wherein each prior vote message in the group of prior vote messages with authenticators comprises an indication of a request previously voted for by the sending device and a sender prior vote proposal number corresponding to the request previously voted for by the sending device;
    transmitting, to the leader, the group of prior vote messages with authenticators received from the second quorum of devices;
    receiving, from the leader, a properly authenticated proposal and a proposal proof of safety, wherein the properly authenticated proposal comprises either the properly authenticated request or one of the requests previously voted for by the sending device indicated by the group of prior vote messages with authenticators; and
    transmitting, to the leader, a vote message for the proposal if no other suggested next proposal number message was received since the suggested next proposal number message was received from the leader.

4. The method of claim 1, wherein transmitting the vote message comprises transmitting the vote message if no suggested next proposal number message was received since a suggested next proposal number message was received from a leader, and further wherein the properly authenticated request and the group of forwarded prior vote messages with authenticators are received from the leader, and the vote message is transmitted to the leader, the properly authenticated request comprising an indication of a leader assigned proposal number and the current step, wherein the leader assigned proposal number is larger than a previously voted for proposal number if a request was previously voted for; the method further comprising:
    receiving, from the leader, the suggested next proposal number message comprising a suggested next proposal number;
    transmitting, to a first quorum of devices, in response to the suggested next proposal number message, a prior vote message with authenticator and a prior vote message proof of safety, wherein the prior vote message with authenticator comprises an indication of a previously voted for request and the previously voted for proposal number if a request was previously voted for;
    receiving, from a second quorum of devices, a group of prior vote messages with authenticators, wherein each prior vote message in the group of prior vote messages with authenticators comprises an indication of a request previously voted for by a sending device and a previously voted proposal number corresponding to the request previously voted for by the sending device; and
    transmitting, to the leader, the group of prior vote messages with authenticators received from the second quorum of devices.

5. A computer-readable storage medium having computer-executable instructions for selecting values in a distributed computing system having a maximum number of malicious devices, the computer-executable instructions performing steps comprising:
receiving a properly authenticated request;
receiving a group of forwarded prior vote messages with authenticators comprising more copies of prior vote messages than three times the maximum number of malicious devices in the distributed computing system, of which more copies than twice the maximum number of malicious devices in the distributed computing system are properly authenticated, wherein the group of forwarded prior vote messages with authenticators indicate a set of safe values for a proposal number for current and future steps; and
transmitting a vote message if the properly authenticated request is contained in the set of safe values and no other request with the proposal number for a current step was previously accepted.

6. The computer-readable storage medium of claim 5, wherein the properly authenticated request is received from a client, the group of forwarded prior vote messages with authenticators are received from a leader, and the vote message is transmitted to the client; the computer-readable medium having further computer-executable instructions for assigning the properly authenticated request a safe proposal number and the current step, wherein the safe proposal number is the proposal number for which the set of safe values is all values.

7. The computer-readable storage medium of claim 6, wherein transmitting the vote message further comprises transmitting the vote message if the client is authorized to make the properly authenticated request.

8. The computer-readable storage medium of claim 6, having further computer-executable instructions performing steps comprising:
receiving, from the leader, a properly authenticated suggested next proposal number message comprising a suggested next proposal number;
transmitting, to a first quorum of devices, in response to the suggested next proposal number message, a prior vote message with authenticator and a prior vote message proof of safety, wherein the prior vote message with authenticator comprises an indication of the properly authenticated request and the proposal number;
receiving, from a second quorum of devices, a group of prior vote messages with authenticators, wherein each prior vote message in the group of prior vote messages with authenticators comprises an indication of a request previously voted for by the sending device and a sender prior vote proposal number corresponding to the request previously voted for by the sending device;
transmitting, to the leader, the group of prior vote messages with authenticators received from the second quorum of devices;
receiving, from the leader, a properly authenticated proposal and a proposal proof of safety, wherein the properly authenticated proposal comprises either the properly authenticated request or one of the requests previously voted for by the sending device indicated by the group of prior vote messages with authenticators; and
transmitting, to the leader, a vote message for the proposal if no other suggested next proposal number message was received since the suggested next proposal number message was received from the leader.

9. The computer-readable storage medium of claim 8, wherein the proposal proof of safety comprises a second group of forwarded prior vote messages with authenticators, the second group of forwarded prior vote messages with authenticators indicating that the proposal is safe; the second group of forwarded prior vote messages with authenticators comprising more properly authenticated copies of prior vote messages than twice the maximum number of malicious devices in the distributed computing system.

10. The computer-readable storage medium of claim 5, wherein transmitting the vote message comprises transmitting the vote message if no suggested next proposal number message was received since a suggested next proposal number message was received from a leader, and further wherein the properly authenticated request and the group of forwarded prior vote messages with authenticators are received from the leader, and the vote message is transmitted to the leader, the properly authenticated request comprising an indication of a leader assigned proposal number and the current step, wherein the leader assigned proposal number is larger than a previously voted for proposal number if a request was previously voted for; the computer-readable medium having further computer-executable instructions performing steps comprising:
receiving, from the leader, the suggested next proposal number message comprising a suggested next proposal number;
transmitting, to a first quorum of devices, in response to the suggested next proposal number message, a prior vote message with authenticator and a prior vote message proof of safety, wherein the prior vote message with authenticator comprises an indication of a previously voted for request and the previously voted for proposal number if a request was previously voted for;
receiving, from a second quorum of devices, a group of prior vote messages with authenticators, wherein each prior vote message in the group of prior vote messages with authenticators comprises an indication of a request previously voted for by a sending device and a previously voted proposal number corresponding to the request previously voted for by the sending device; and
transmitting, to the leader, the group of prior vote messages with authenticators received from the second quorum of devices.

11. The computer-readable storage medium of claim 10 wherein the prior vote message proof of safety comprises a previously received group of forwarded prior vote messages with authenticators, the previously received group of forwarded prior vote messages with authenticators indicating that the previously voted for request was safe; the previously received group of forwarded prior vote messages with authenticators comprising more properly authenticated copies of previously received prior vote messages than twice the maximum number of malicious devices in the distributed computing system.

12. The computer-readable storage medium of claim 10 wherein the transmitting, to the leader, the group of prior vote messages with authenticators comprises determining the set of safe values and transmitting the set of safe values to the leader, wherein the set of safe values is a majority previously voted for request indicated by at least a majority of prior vote messages with authenticators in the group of prior vote messages with authenticators.

13. A distributed computing system, wherein at least a quorum of devices in the distributed computing system comprise computer-readable storage media having computer-executable instructions for performing steps comprising:

receiving a properly authenticated request;

receiving a group of forwarded prior vote messages with authenticators comprising more copies of prior vote messages than three times a maximum number of malicious devices in the distributed computing system, of which more copies than twice the maximum number of malicious devices in the distributed computing system are properly authenticated, wherein the group of forwarded prior vote messages with authenticators indicate a set of safe values for a proposal number for current and future steps; and if a sufficient number of devices operate: transmitting a vote message if the properly authenticated request is contained in the set of safe values and no other request with the proposal number for a current step was previously accepted; otherwise: transmitting, to a first quorum of devices in the distributed computing system, an exclusivity message, wherein the exclusivity message indicates a unique proposed value for the proposal number for which a vote can be cast, and wherein the exclusivity message is authenticated for the first quorum of devices;

receiving, from a second quorum of devices in the distributed computing system, a quorum of exclusivity messages authenticated from the second quorum of devices; and transmitting a vote message if the received quorum of exclusivity messages indicated the properly authenticated request as the unique proposed value and no suggested next proposal number message was responded to;

the distributed computing system comprising a minimum number of devices, wherein the minimum number of devices is greater than: a sum of a maximum number of failed devices and the maximum number of malicious devices plus twice the maximum number of malicious devices plus twice a maximum number of failed and malicious devices that can be accommodated, wherein the sufficient number of operating devices is at least the minimum number of devices minus the maximum number of failed and malicious devices that can be accommodated.

14. The distributed computing system of claim 13, wherein the quorum of devices comprises at least as many devices as the minimum number of devices in the distributed computing system minus the maximum number of failed and malicious devices that can be accommodated.

15. The distributed computing system of claim 13, wherein if the properly authenticated request and the group of forwarded prior vote messages with authenticators are only received from a leader device, then the distributed computing system comprises a new minimum number of devices, wherein the new minimum number of devices is two devices less than the minimum number of devices.

* * * * *